United States Patent
Cho et al.

(10) Patent No.: US 10,415,990 B2
(45) Date of Patent: Sep. 17, 2019

(54) SYSTEM FOR PROVIDING PERSONALIZED INFORMATION AND METHOD OF PROVIDING THE PERSONALIZED INFORMATION

(71) Applicant: SAMSUNG ELECTRONICS CO., LTD., Suwon-si (KR)

(72) Inventors: Ho-sik Cho, Seoul (KR); Jeong-jin Song, Seoul (KR); Il-kang Na, Seoul (KR); Sun-eung Park, Suwon-si (KR); Hyun-cheol Park, Suwon-si (KR); Tae-kwang Um, Suwon-si (KR); Cheol-ju Hwang, Yongin-si (KR); Ji-won Yang, Seoul (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 69 days.

(21) Appl. No.: 15/475,601

(22) Filed: Mar. 31, 2017

(65) Prior Publication Data
US 2017/0205244 A1      Jul. 20, 2017

Related U.S. Application Data

(63) Continuation of application No. 14/713,109, filed on May 15, 2015, now Pat. No. 9,631,944.

(30) Foreign Application Priority Data

Sep. 23, 2014  (KR) ........................ 10-2014-0127184
Jan. 2, 2015   (KR) ........................ 10-2015-0000288

(51) Int. Cl.
*G01C 21/36* (2006.01)
*H04W 4/02* (2018.01)
(Continued)

(52) U.S. Cl.
CPC ..... *G01C 21/3664* (2013.01); *G01C 21/3484* (2013.01); *G01C 21/3611* (2013.01);
(Continued)

(58) Field of Classification Search
CPC ............ G01C 21/3664; G01C 21/3484; G01C 21/3611; G01C 21/3676; G01C 21/3641;
(Continued)

(56) References Cited

U.S. PATENT DOCUMENTS 7,327,258 B2   2/2008   Fast
8,362,949 B2   1/2013   Yang et al.
(Continued)

FOREIGN PATENT DOCUMENTS

CN    103631954 A      3/2014
JP    2002365059 A  *  12/2002
(Continued)

OTHER PUBLICATIONS

Communication dated Oct. 2, 2017, issued by the European Patent Office in counterpart European application No. 15792234.5.
(Continued)

*Primary Examiner* — Rodney A Butler
(74) *Attorney, Agent, or Firm* — Sughrue Mion, PLLC

(57) ABSTRACT

A system and method for providing location-based personalized information by using user location history information, whereby battery consumption of a computing device is reduced. The computing device includes: a location finder configured to obtain user location information of a user of the computing device; a display configured to display information indicating a route of the user of the computing device; and a controller configured to track a location of the user by controlling the location finder as the controller senses a change in the location of the user based on the obtained user location information, obtain information cor-
(Continued)

responding to an initial route of the user based on the tracked location of the user, detect a predicted route of the user from user location history information based on the information corresponding to the initial route of the user, and display on the display unit the predicted route.

20 Claims, 48 Drawing Sheets

Related U.S. Application Data

(60) Provisional application No. 61/993,445, filed on May 15, 2014.

(51) Int. Cl.
  *G01C 21/34* (2006.01)
  *H04W 4/029* (2018.01)
  *H04W 4/70* (2018.01)
  *H04W 4/80* (2018.01)

(52) U.S. Cl.
  CPC ..... *G01C 21/3641* (2013.01); *G01C 21/3644* (2013.01); *G01C 21/3676* (2013.01); *G01C 21/3679* (2013.01); *H04W 4/02* (2013.01); *H04W 4/029* (2018.02); *H04W 4/027* (2013.01); *H04W 4/70* (2018.02); *H04W 4/80* (2018.02); *Y02D 70/20* (2018.01)

(58) Field of Classification Search
  CPC ........................ G01C 21/3679; G01C 21/3644; Y02D 70/20; H04W 4/02; H04W 4/80; H04W 4/029; H04W 4/70; H04W 4/027
  See application file for complete search history.

(56) References Cited

U.S. PATENT DOCUMENTS

| | | | |
|---|---|---|---|
| 8,554,873 | B1 | 10/2013 | Ganesh |
| 9,134,137 | B2 | 9/2015 | Brush |
| 2008/0228390 | A1 | 9/2008 | Geelen |
| 2008/0318598 | A1 | 12/2008 | Fry |
| 2009/0012955 | A1 | 1/2009 | Chu et al. |
| 2009/0227266 | A1 | 9/2009 | Baik et al. |
| 2010/0106603 | A1 | 4/2010 | Dey et al. |
| 2010/0131187 | A1 | 5/2010 | Lai et al. |
| 2010/0179757 | A1 | 7/2010 | Iketani et al. |
| 2011/0106436 | A1 | 5/2011 | Bill |
| 2012/0158289 | A1 | 6/2012 | Bernheim Brush et al. |
| 2014/0045535 | A1 | 2/2014 | Dai et al. |
| 2014/0062790 | A1 | 3/2014 | Letz et al. |
| 2015/0112587 | A1 | 4/2015 | Kim |
| 2015/0268348 | A1 | 9/2015 | Fry |
| 2015/0327015 | A1 | 11/2015 | So |
| 2016/0116299 | A1 | 4/2016 | Kim |
| 2016/0323711 | A1* | 11/2016 | Spears ................. H04W 4/029 |

FOREIGN PATENT DOCUMENTS

| | | |
|---|---|---|
| JP | 2002365059 A | 12/2002 |
| JP | 2008-058617 A | 3/2008 |
| KR | 10-2010-0053336 A | 5/2010 |
| KR | 10-1104591 B1 | 1/2012 |
| WO | 2011/072745 A1 | 6/2011 |

OTHER PUBLICATIONS

Choon-Oh Lee et al., "Energy-efficient Location Logging for Mobile Device", 2010 10th Annual International Symposium on Applications and the Internet, 2010, 7 pgs. total.

Hosik Cho et al., "Deterministic indoor detection from dispersions of GPS satellites on the celestial sphere", Software R&D Center, Samsung Electronics, 9 pgs. total.

Lei Zhang et al., "SensTrack: Energy-Efficient Location Tracking With Smartphone Sensors", IEEE Sensors Journal, 2013, 22 pgs. total.

Mikkel Baun Kjærgaard et al., "Energy-efficient Trajectory Tracking for Mobile Devices", MobiSys, Jun.-Jul. 2011, 14 pgs. total.

Pengfei Zhou et al., "IODetector: A Generic Service for Indoor Outdoor Detection", SneSys, Nov. 2012, 14 pgs. total.

Search Report dated Aug. 25, 2015, issued by the International Searching Authority in counterpart International Application No. PCT/KR2015/004860 (PCT/ISA/210).

Thomas Graf "Power-efficient Positioning Technologies for Mobile Devices", Berlin University of Technology, SNET2 Seminar, 2011, 11 pgs. total.

Written Opinion dated Aug. 25, 2015, issued by the International Searching Authority in counterpart International Application No. PCT/KR2015/004860 (PCT/ISA/237).

Chinese Office Action corresponding to Chinese Patent Application No. 201580025964.4, dated Jun. 26, 2019.

\* cited by examiner

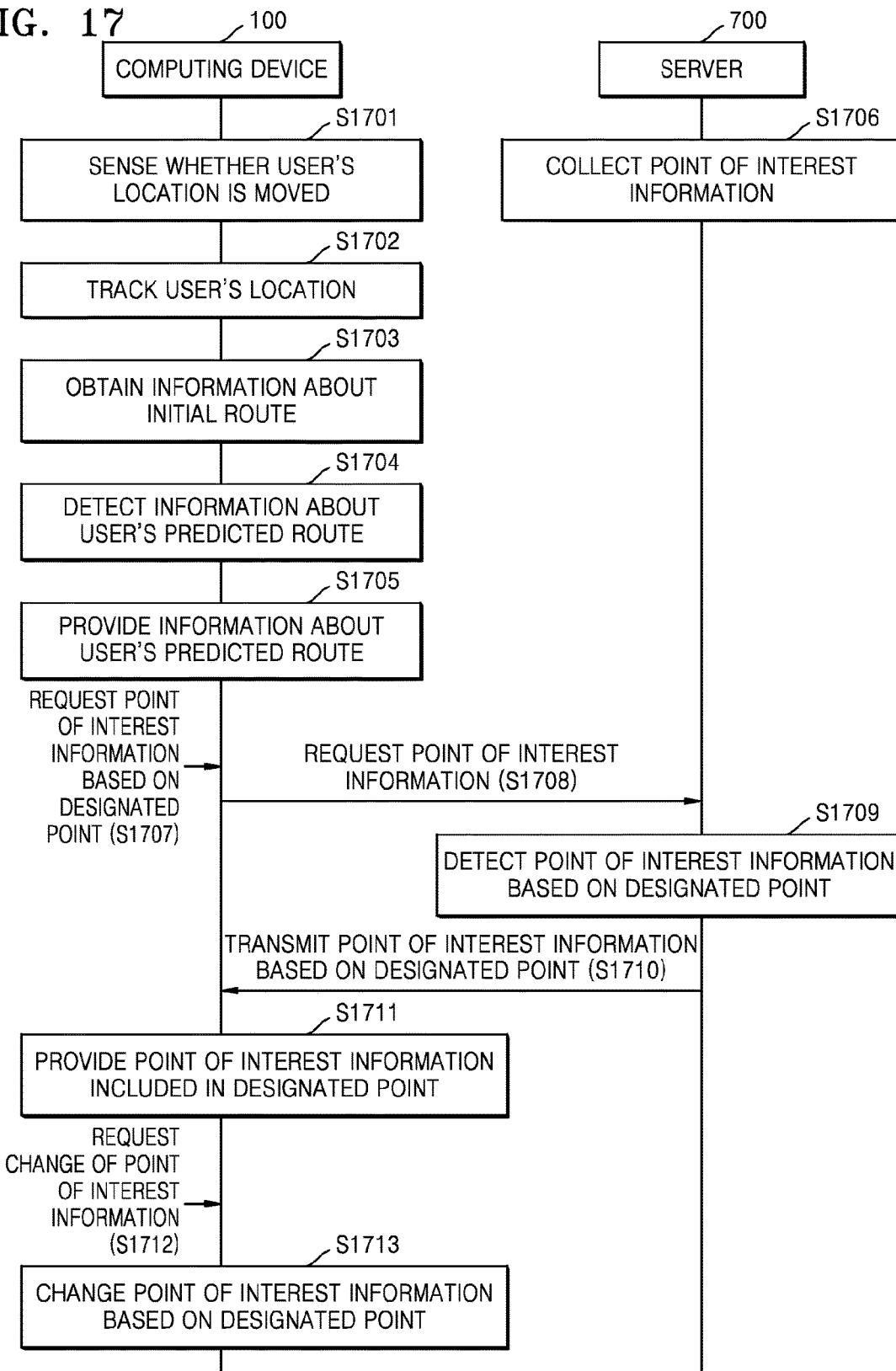

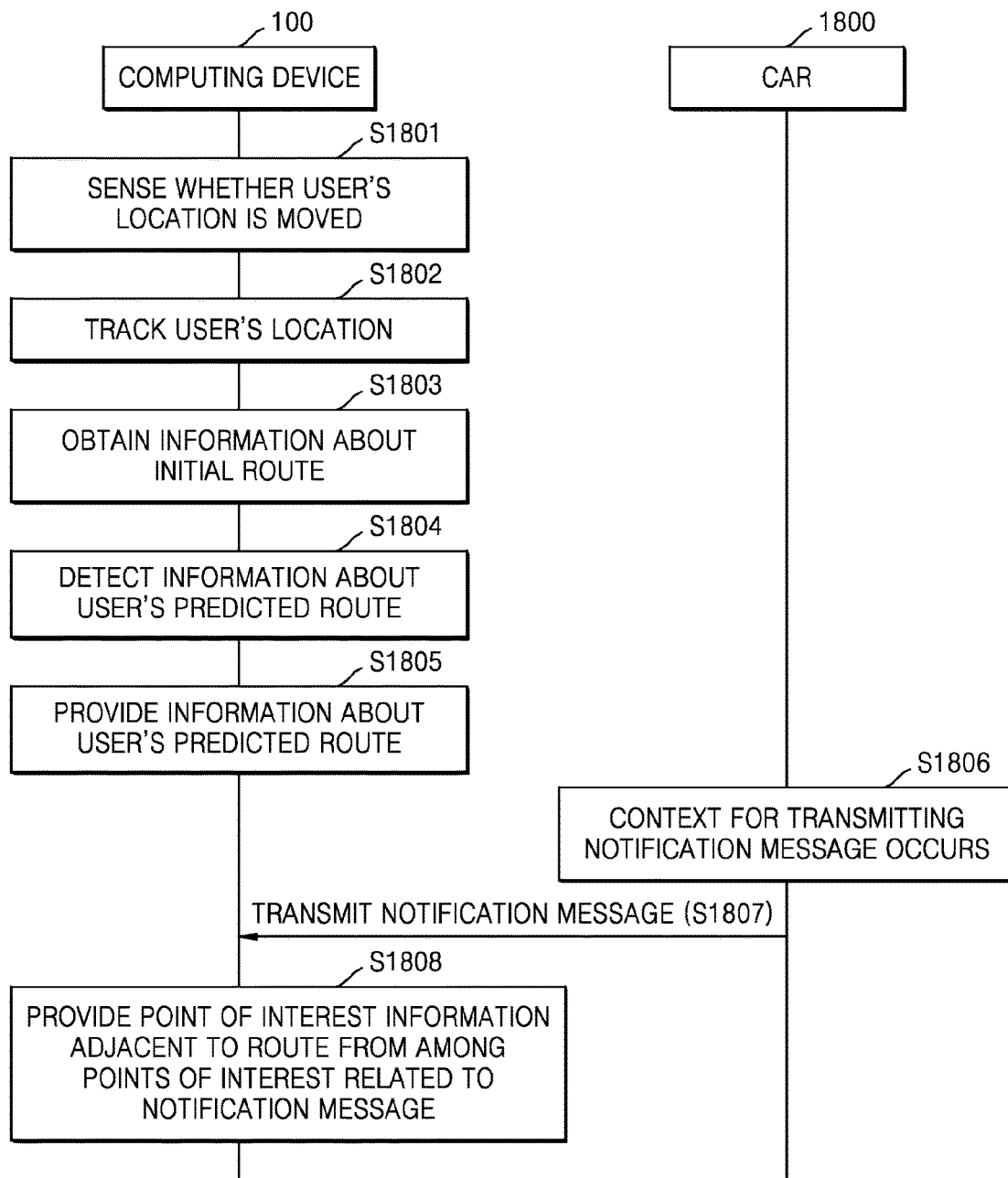

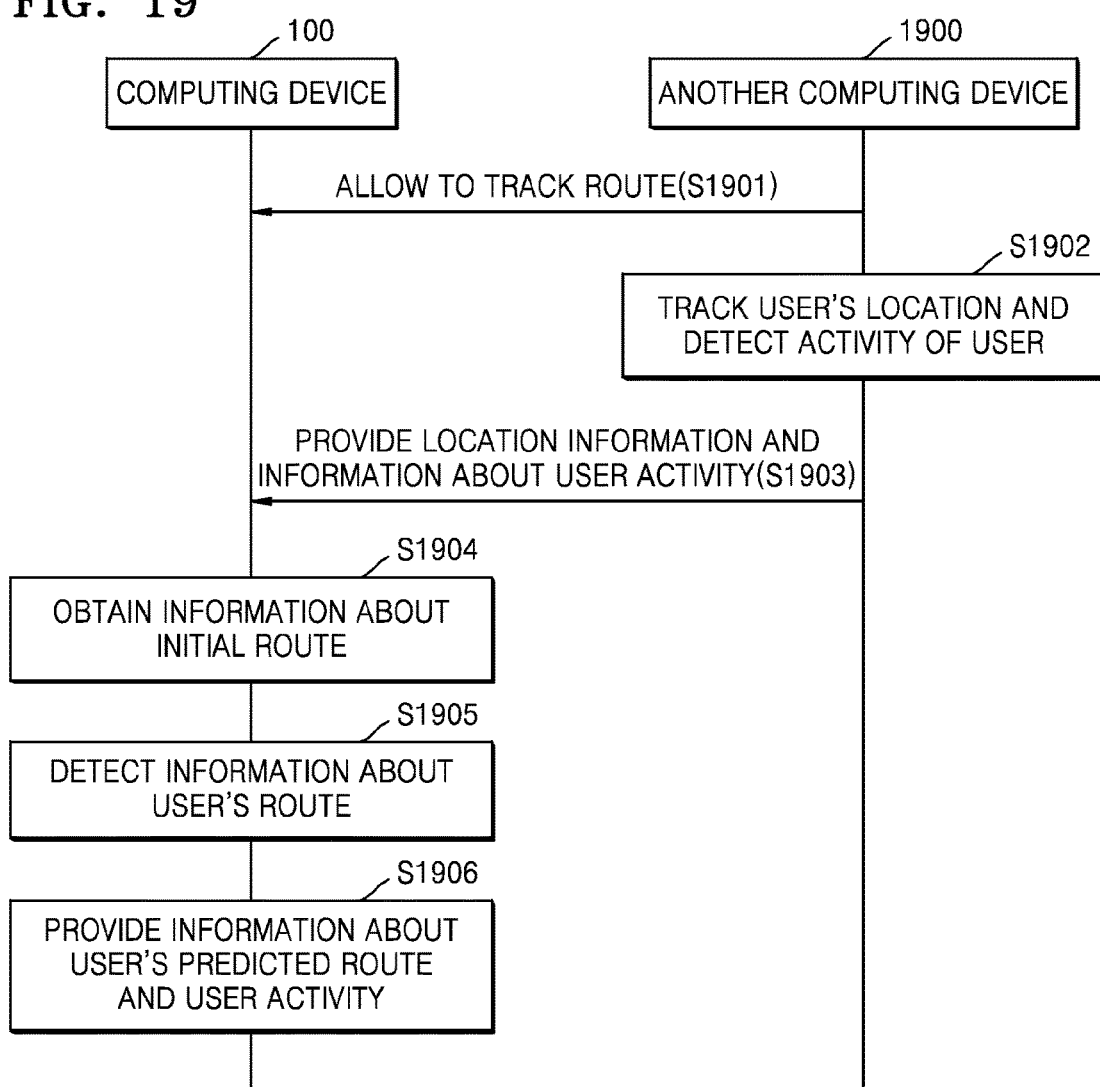

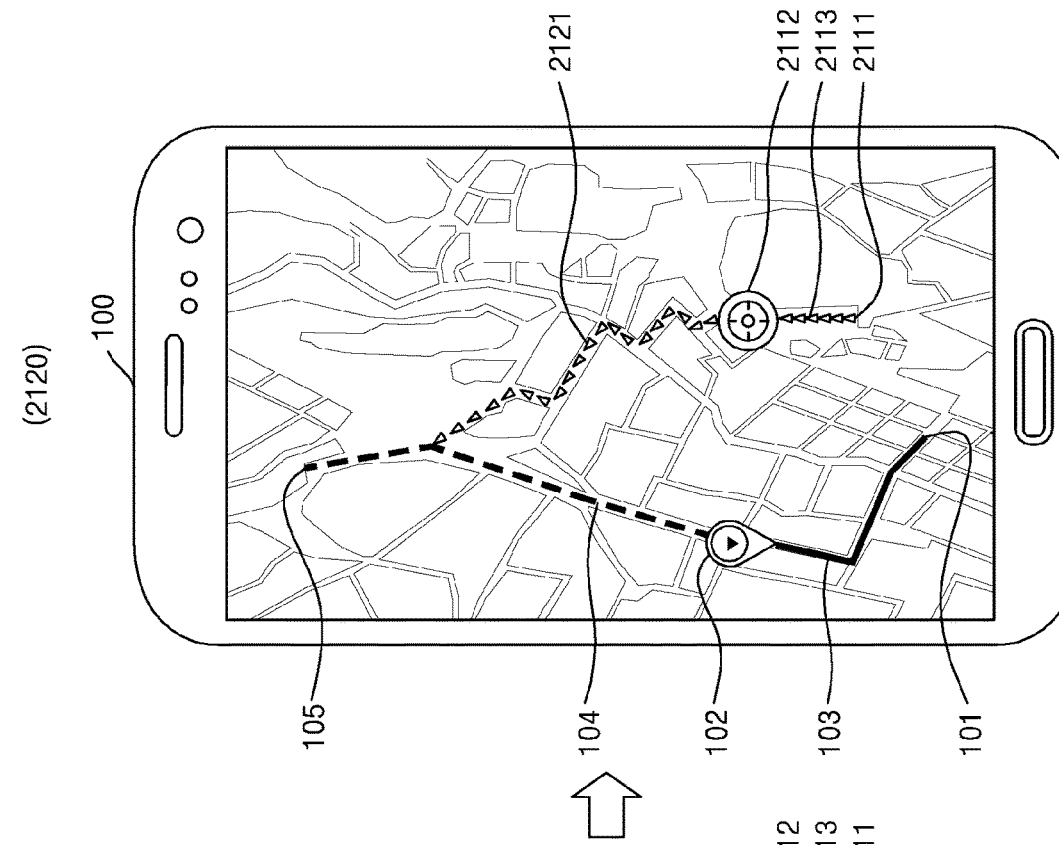
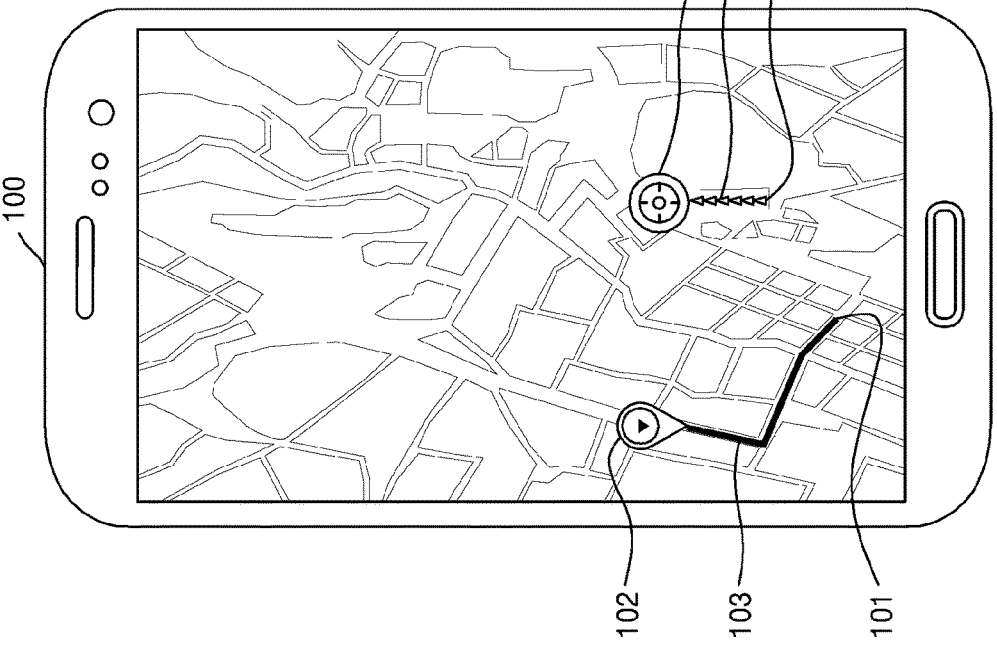
FIG. 21

SYSTEM FOR PROVIDING PERSONALIZED INFORMATION AND METHOD OF PROVIDING THE PERSONALIZED INFORMATION

CROSS-REFERENCE TO RELATED APPLICATIONS

This is a Continuation application of U.S. patent application Ser. No. 14/713,109, filed on May 15, 2015, which claims the benefit of U.S. Provisional Application No. 61/993,445, filed on May 15, 2014, and claims priority from Korean Patent Application No. 10-2014-0127184, filed on Sep. 23, 2014, and Korean Patent Application No. 10-2015-0000288, filed on Jan. 2, 2015, in the Korean Intellectual Property Office. The entire disclosures of the prior applications are considered part of the disclosure of the accompanying Continuation Application, and are hereby incorporated by reference.

BACKGROUND

1. Field

One or more exemplary embodiments relate to a system for providing personalized information and a method of providing the personalized information, and more particularly, to a system for providing location-based personalized information and a method thereof.

2. Description of the Related Art

With the development of communication techniques based on smart computing devices, location-based services for providing information based on a location of a computing device are becoming popular.

Most of the current location-based services provide information based on a present location of a computing device. For example, if user A and user B both execute a map application using their respective computing devices at the same location and the same time, the map application provides identical local information (e.g., famous places, information about events such as concerts, or coupon information).

However, location-based services according to the related art consume a large amount of battery power of a computing device, and thus it may be difficult to use the services continuously.

SUMMARY

One or more exemplary embodiments include a system for providing location-based personalized information by using user location history information, whereby battery power consumption of a computing device is reduced, and a method of providing the location-based personalized information.

Additional aspects will be set forth in the description which follows and will be apparent from the description or may be learned by practice of exemplary embodiments.

According to an aspect of an exemplary embodiment, there is provided a computing device including: a location finder configured to obtain location information of a user of the computing device; a display configured to display information indicating a route of the user of the computing device; and a controller configured to: track a location of the user by sensing a change in the location of the user based on the obtained location information of the user, obtain information corresponding to an initial route of the user based on the tracked location of the user, determine a predicted route of the user based on the information corresponding to the initial route of the user and past location information of the user, and display the predicted route on the display.

After displaying the predicted route on the display, the controller may be further configured to: control the location finder to track a route of the user by varying an interval of measuring the location of the user based on at least one of a moving speed of the user, surrounding environment information of the user, and the predicted route, and update the past location information of the user based on the tracked route of the user.

The controller may be further configured to control the location finder to obtain the initial route by varying an interval of measuring the location of the user based on at least one of a moving speed of the user and surrounding environment information of the user.

If the predicted route is not determined from the past location information of the user based on the initial route, the controller may be further configured to control the location finder to track the route of the user by varying an interval of measuring the location of the user based on at least one of a moving speed and surrounding environment information of the user, and update the past location information of the user based on the tracked route of the user.

The controller may be further configured to display personalized information about the user on the display based on the predicted route and profile information of the user.

The controller may be further configured to display recommendation information on the display including at least one item of recommended content based on profile information of a place adjacent to the predicted route and the profile information of the user.

The recommended content may include a theme item.

The controller may be further configured to provide the recommended content in a form of a map or a notification.

The controller may be further configured to detect regional information about a region adjacent to the predicted route, wherein the regional information includes information about where a group of people is active at a current time, and display the detected regional information on the display.

The controller may be further configured to detect a usage count of the user on the predicted route from the past location information of the user, and display on the display the personalized information according to the detected usage count.

According to an aspect of another exemplary embodiment, there is provided a method of providing personalized information, performed by a computing device, the method including: obtaining information about an initial route of a user by tracking a location of the user by sensing a change in the location of the user; determining a predicted route of the user based on the information corresponding to the initial route of the user and past location information of the user; and displaying the predicted route on a display of the computing device.

The method may further include, after displaying the predicted route on the display, tracking a route of the user by varying an interval of measuring the location of the user based on at least one of a moving speed of the user, surrounding environment information of the user, and the predicted route; and updating the past location information of the user based on the tracked route of the user.

The obtaining information about the initial route of the user may include obtaining information about the initial route of the user while varying an interval of measuring the location of the user based on at least one of a moving speed of the user and surrounding environment information of the user.

If the predicted route is not determined from the past location information of the user based on the initial route of the user, the method may include: tracking the route of the user by varying an interval of measuring the location of the user based on at least one of a moving speed of the user and surrounding environment information of the user; and updating the past location information of the user based on the tracked route of the user.

The method may further include providing personalized information about the user based on the predicted route and profile information of the user.

The providing of personalized information about the user may include providing recommendation information including at least one item of recommended content based on profile information of a place adjacent to the predicted route and the profile information of the user.

The recommended content may include a theme item.

The method may further include providing the recommended content in a form of a map or a notification.

The providing of personalized information about the user may include: detecting regional information about a region adjacent to the predicted route wherein the regional information includes information about where a group of people is active at a current time; and providing the detected regional information.

The method may further include detecting a usage count of the user on the predicted route from the past location information of the user, and providing the personalized information according to the detected usage count.

According to an aspect of another exemplary embodiment, there is provided a computing device including: a location tracker configured to track a location of the computing device; a memory configured to store a location history of the computing device according to the tracked locations; a controller configured to determine an initial route of the computing device by comparing a current location of the computing device to a previous location of the computing device, and determine a predicted route of the computing device based on the initial route and the location history of the computing device.

The controller may be further configured to detect information corresponding to a point of interest based on a point on the predicted route of the computing device, and display the information corresponding to the point of interest on a display of the computing device.

The location tracker may include a sensor.

The controller may be further configured to control a display to provide a menu of theme items to a user, and receive an input from the user for selecting a preferred theme item.

The controller may be further configured to determine a recommended theme item based on a point of interest near the predicted route of the computing device and the preferred theme of the user.

According to an aspect of another exemplary embodiment, there is provided a non-transitory computer readable recording medium storing one or more programs includes commands for executing a method of providing personalized information, wherein the method is performed in the same way as the above-described method of providing personalized information is performed.

BRIEF DESCRIPTION OF THE DRAWINGS

These and/or other aspects will become apparent and more readily appreciated from the following description of exemplary embodiments, taken in conjunction with the accompanying drawings in which:

FIG. 17 is an operational flowchart of a method of providing personalized information according to another exemplary embodiment;

FIG. 18 is an operational flowchart of a method of providing personalized information according to another exemplary embodiment;

FIG. 19 is an operational flowchart of a method of providing personalized information according to another exemplary embodiment;

FIG. 21 illustrates examples of screens that may be provided according to an exemplary flowchart of FIG. 20;

DETAILED DESCRIPTION

Figure 1:
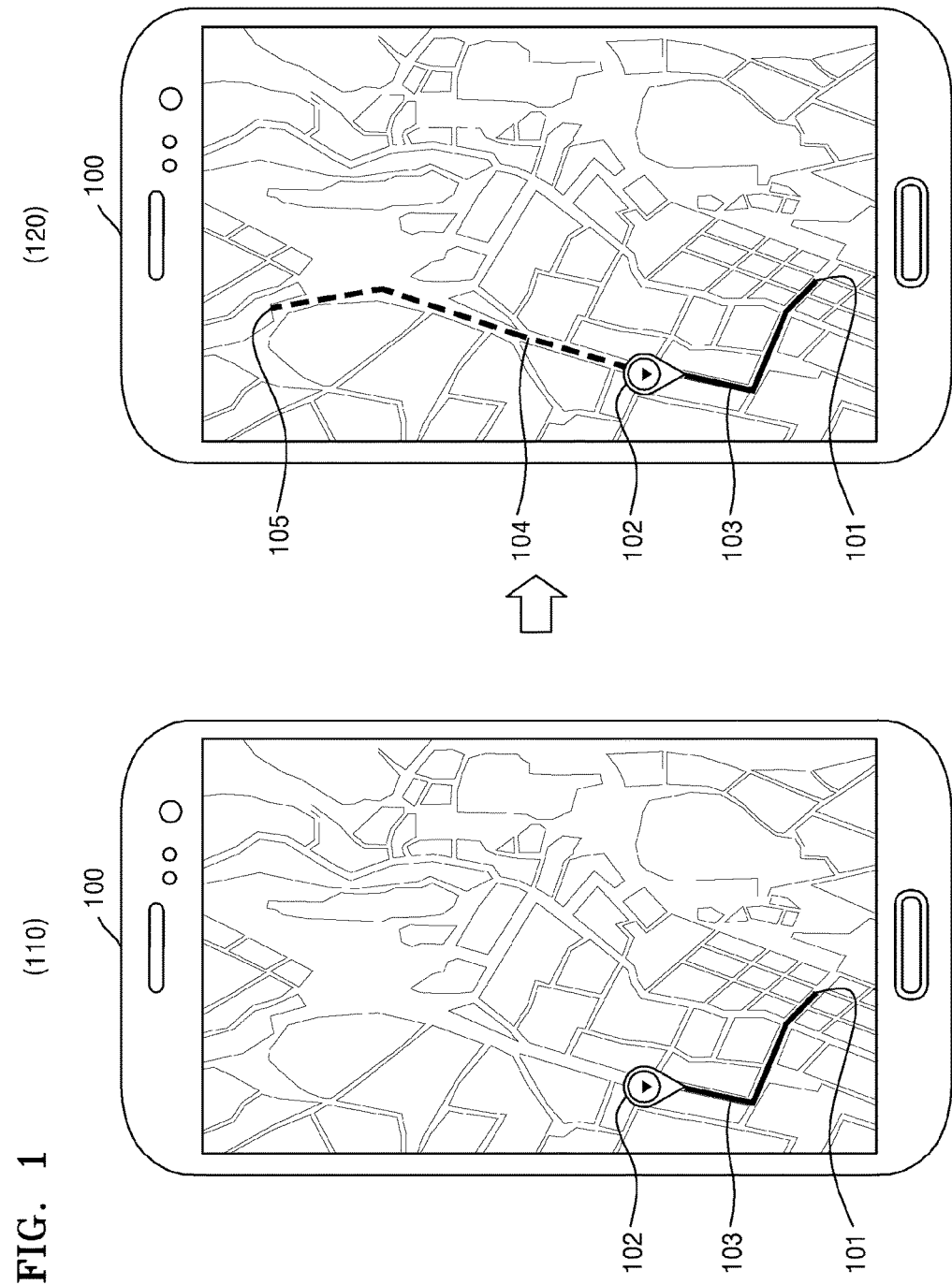
FIG. 1 is a view illustrating an example of personalized information provided according to an exemplary embodiment.

Reference will now be made in detail to one or more exemplary embodiments, examples of which are illustrated in the accompanying drawings, wherein like reference numerals refer to like elements throughout. In this regard, exemplary embodiments may have different forms and should not be construed as being limited to the descriptions set forth herein. Accordingly, exemplary embodiments are merely described below, by referring to the figures, to explain aspects of the disclosure. As used herein, the term "and/or" includes any and all combinations of one or more of the associated listed items. Expressions such as "at least one of," when preceding a list of elements, modify the entire list of elements and do not modify the individual elements of the list, unless specifically stated otherwise.

However, the disclosure is not limited to particular modes of practice, and it is to be appreciated that all changes, equivalents, and substitutes that do not depart from the spirit and technical scope of inventive concepts are encompassed in the disclosure. In the description of inventive concepts, certain detailed explanations of related art may be omitted if it is deemed that they may unnecessarily obscure the essence of inventive concepts.

While such terms as "first," "second," etc., may be used to describe various components, such components are not limited to the above terms. The above terms are used only to distinguish one component from another.

The terms used in this disclosure may be general terms widely used in the art in consideration of functions in regard to inventive concepts, but the terms may vary according to the intention of those of ordinary skill in the art, precedents, or new technology in the art. Also, specified terms may be selected by the applicant, and in this case, the detailed meaning thereof will be described in the disclosure. Thus, the terms used in the specification should be understood not as simple names but based on the meaning of the terms and the overall disclosure.

An expression used in the singular encompasses the expression of the plural, unless it has a clearly different meaning in the context. In the present specification, it is to be understood that the terms such as "including," "comprising," or "having," etc., are intended to indicate the existence of the features, numbers, steps, actions, components, parts, or combinations thereof disclosed in the specification, and are not intended to preclude the possibility that one or more other features, numbers, steps, actions, components, parts, or combinations thereof may exist or may be added.

The term user location history information in the specification may refer to cumulative information about points and places where a user has been, beginning from a particular time, (e.g., a time a user agreed to the terms of a service via a computing device) until a present time. A service may refer to a service for collecting location information of a user or a service of providing personalized information according to an exemplary embodiment.

The service may be continuously executed while power is supplied to a computing device, and the service may be executed regardless of whether the computing device is being used. However, the service is not limited thereto. For example, the service may be executed according to an environmental condition set by a user. The environmental condition may be set according to a location and/or time. For example, the environmental condition may be set such that a service is executed when the computing device is in a location other than a home or office of a user. The environmental condition may be set such that execution of a service is stopped according to a user's request for stopping the service.

The user location history information may include, without limitation, at least one of a user mode (e.g., Stay, Walk, or Ride), an indoor/outdoor mode (e.g., Indoor, or Outdoor), a location information providing mode (e.g., Network_Provider, Global Positioning System (GPS)_Provider, or sensor), a latitude value, a longitude value, altitude value, a bearing value, accuracy, and a time.

If a latitude value or a longitude value included in the user location history information is a filtered value, the user location history information may further include an original latitude value and an original longitude value. The original latitude value and the original longitude value are unfiltered values. Filtering with respect to a latitude value and a longitude value may be performed using a Kalman filter, i.e., linear quadratic estimation (LQE), but is not limited thereto.

The user location history information may further include information about content (e.g., a picture, a memo, a video, a theme item, and/or a recommendation message).

The network provider included in the location information providing mode may include at least one of a Wi-Fi communication, a cell ID communication, a near field communication (NFC), and a Bluetooth beacon communication, but is not limited thereto. The sensor included in the location information providing mode may include a light emitting diode (LED) sensor, a geomagnetic sensor, an accelerometer sensor, and/or a gyroscope sensor, but is not limited thereto.

"Ride" included in the user mode may be expressed as a transportation means such as an automobile, a bicycle, a bus, a train, an air plane, a ship, or a helicopter. The user mode may be expressed as a user activity. The user activity represents a particular action of a user. For example, the user activity may include, without limitation, at least one of strolling, walking, running, exercising, cooking, cleaning, sleeping, meeting friend, having a meal, going to work, and/or coming home from work.

The user activity may be expressed as one of an icon, a text, an image, and a multimedia. The user activity may be classified as Life, Eat, Drink, Entertainment, Sports, and/or Work, but classification standards of the user activity are not limited thereto.

A user activity item included in "Life" may include, for example, without limitation, cooking, cleaning, resting, strolling, walking, gathering, talking, shopping, beauty, dating, driving, pet, birthday, wedding, and/or event.

A user activity item included in "Eat" may include, for example, without limitation, Korean food, Western food, Chinese food, Japanese food, Thai food, Italian food, Indian food, snack, fast food, bread, fruit, and/or vegetables.

A user activity item included in "Drink" may include, for example, without limitation, water, dairy drink, coffee, tea, juice, soda, alcohol, hot drink, cold drink, and/or functional drink.

A user activity item included in "Entertainment" may include, for example, without limitation, at least one of reading, writing (or memo), game, watching a movie, listening to music, singing, dancing, TV, exhibition, show, festival, picnic, camping, photography, gardening, fishing, meditation, and/or volunteering.

A user activity item included in "Sports" may include, for example, without limitation, at least one of running, biking, hiking, baseball, basketball, football, soccer, martial arts, extreme sports, yoga, fitness, leisure, swimming, scuba diving, skiing, snowboarding, and/or skating.

A user activity item included in "Work" may include, for example, without limitation, at least one of meeting, presentation, teleconference, seminar, education, workshop, conference, promotion, business trip, and/or work outside.

Information (e.g., profile) about a user's past route (e.g., trajectory) may be generated based on machine learning about user location history information. User's past route may refer to a route based on a user's movement generated before a movement of a user related to a current location of a computing device, after agreeing to a service by using the computing device.

Information about user's past route may include, without limitation, information about at least one of a starting point, a destination point, a point and/or place where a user has stayed, a tracked user's location, a time that a user's location is tracked, a time of starting movement, a time of ending movement, a total movement time, a movement time for respective user modes, a movement speed for respective user modes, a number of times of using a route, a number of times of visiting a destination point, and/or information about content.

Information (or profile) about a user's major route, or main route, may be generated through machine learning about user location history information. A user's main route may refer to at least one route that is traveled the most number of times, from among a user's routes, generated before a user's route related to a present location of a computing device, after agreeing to a service by using the computing device.

Information about a user's main route may include, without limitation, information about at least one of a starting point, a destination point, a point and/or place where a user has stayed, a tracked user's position (or user's location), a time that a user's position is tracked, a time of starting movement, a time of ending movement, a total movement time, a movement time for respective user modes, a movement speed for respective user modes, the number of times of using a route, the number of times of visiting a destination point, and/or information about content.

Information (or profile) about a region where a user has usually stayed and about an activity of the user at the region where the user has usually stayed may be generated through machine learning about user location history information. The region where the user has usually stayed may include, without limitation, a home, an office, a school, and/or an educational institution.

Machine learning about user location history information may be performed by using a device that stores the user location history information.

User location history information may be stored in at least one of a computing device, a device designated as a personal cloud of a user (e.g., a home sync, a device based on an Internet of Things (IoT) network (for example, a smart TV), a wearable device, another computing device, and a server, etc.), and/or a device within an area where a user may directly control the device. User location history information may be stored in a service provider server with the consent of the user.

When machine learning about user location history information is unsupervised learning, user location history information may be clustered to automatically extract distribution characteristics (or properties such as time) contained in the user location history information, and not only information described above but also a personalized profile or model based on a location of the user may be generated based on the extracted distribution characteristics. Machine learning about user location history information may be performed as unsupervised learning or supervised learning, but is not limited thereto.

User location history information may be collected at predetermined intervals, e.g., fixed period. For example, user location history information may be collected once every minute, for a total of 1440 entries. The 1440 entries may include, without limitation, at least one of a user mode, an indoor/outdoor mode, a location information providing mode, a latitude value, a longitude value, an altitude value, a bearing value, an accuracy value, and/or time described above.

User location history information may be collected by a variable period according to at least one of a movement speed of a user, information about a surrounding environment of the user, and/or a user's past route. When user location history information is collected by a variable period, the number of entries included in user location history information collected a day may be random. Information included in entries of user location history information collected by a variable period may be the same as information included in entries of user location history information collected by a fixed period described above.

A user described throughout the specification may refer to a person who has a computing device. Thus, movement of the user may represent movement of the computing device. A route of the user may represent a route of the computing device. Tracking a position of the user may refer to tracking a position of the computing device. A user's initial route may represent an initial route of the computing device. A user's predicted route may represent a predicted route of the computing device. Surrounding environment information of the user may represent surrounding environment information of the computing device.

Context information described throughout the specification may include, without limitation, at least one of user-based context information and/or geographical location-based context information.

User-based context information may include information regarding a user mode, a movement speed of a user, a movement time of the user, a distance that a user has moved, and/or a location to which the user has moved, described above.

A movement speed of a user may be continuously measured after the start of using a computing device, but is not limited thereto. For example, a movement speed may be continuously measured from when movement of the user has started to when the movement of the user is stopped. A movement speed may be measured at a previously set time interval and/or a previously set distance interval.

Movement time of a user may include the total movement time that a user moves per day, but is not limited thereto. For example, movement time of a user may include the times that the user starts and stops moving. Movement time of a user may include a total movement time for respective user modes. Movement time of the user may include the times that the user starts and stops moving for respective user modes.

Movement distance of a user may include the total movement distance that the user travels per day, but is not limited thereto. For example, movement distance of a user may include total movement distance for respective user modes.

Information indicating a location to which a user has moved may include latitude and longitude, but is not limited thereto. The information indicating a location to which a user has moved may further include an indoor/outdoor mode, a location information providing mode, an altitude value, a bearing value, and an accuracy value. The information indicating a location to which the user has moved may further include a name of a place. The accuracy value may represent as a range of error regarding a present location of the user.

User-based context information may include information about a current location of a user and time related to the current location of the user. The information about the current location of the user may include a latitude value and a longitude value, but is not limited thereto. For example, the information about the current location of the user may further include an indoor/outdoor mode, a location information providing mode, an altitude value, a bearing value, and/or an accuracy value. The information about the current location of the user may further include a name of a place. A name of a place may be expressed as, for example, home, office, restaurant, store, company, school, educational institution, and/or park, but is not limited thereto. The time related to the current location of the user may include a current time, but is not limited thereto. For example, if a user mode is Stay, the time related to a current location may include the duration (for example, start time and end time) for which the user stays in one location.

User-based context information may include information about a user. The information about the user may include, without limitation, at least one of user profile information, user health information (e.g., heart rate, blood flow, respiration speed, and/or skin temperature), user emotion information (e.g., joy, sorrow, fear, anger, surprise, gratitude, and hate), and user schedule information (e.g., wedding, meeting, and gathering).

The information about the user may include information about content generated by a user at a place. The information about content generated by the user may include, without limitation, content generated by the user at store B in train station A, a type of the generated content (e.g., a document, a picture, an audio or a video), a theme item of the generated content, and/or the number of contents generated for each theme item. The information about content generated by the user may be included in content history information. When content generated by a user is posted on social media, the information about content generated by the user may be included in a social network service history.

The information about the user may include information about a theme item preferred by a user.

The information about the user may include, without limitation, at least one of a search history, a mail history, a message history (e.g., a short text message history, a multi-message history, and/or a voice message history), a browsing history, and a social network service history.

The search history, the mail history, the message history, the browsing history, and the social network service history or the like may respectively include, without limitation, information generated by an interaction between a user and a computing device while at least one of a search application, a mail application, a message application, a browsing application, and a social network service application, or the like, installed in the computing device are executed. The information generated by the interaction between the user and the computing device may include, for example, a list of search key words, a list of transmitted and received mails, a list of transmitted or received messages, a list of uniform resource locators (URL), and/or information about a result of input and output data analysis.

A search history, a mail history, a message history, a browsing history, and a social network service history may be based on, without limitation, detection of at least one of a keyword, a picture, a place, a time, and an event (e.g., a baseball game, a soccer game, a concert, or a play, etc.) through at least one of context analysis, vocabulary analysis, image analysis, and/or tag analysis.

The information about the user may include, without limitation, at least one of information about at least one person who shares a social connection with the user (e.g., a friend on Facebook), at least one person registered to a phone book of the user, and content generated by the at least one person, information about a theme item preferred by the at least one person, information about a profile of the at least one person, information about a profile of at least one person who is with the user, information about content generated by at least one person who is with the user, information, information about a theme item preferred by at least one person who is with the user, information about at least one person who shares a destination point with the user, an activity of the at least one person, and/or a theme item of the at least one person. The activity of the at least one person may be similarly expressed as the activity of the user described above.

The user profile information may include, without limitation, information about the gender, age, interest, a point of interest (POI), a preferred POI, preference, hobby, current residential area, birth place, job, and/or a location of the office. For example, user profile information may include social media profile information on social media (e.g., Facebook, Twitter, blog, YouTube, or LinkedIn).

The social media profile information may be configured by detecting at least one of a keyword, a picture, a place, a time, and an event by analyzing at least one of a text, a word, an image, and/or a tag posted by a user, but is not limited thereto. Profile information of at least one person related to a user may be configured like the user profile information described above.

The information about a user may include at least one of personal information management software (PIMS) information and/or life log information.

The information about a user may include surrounding environment information of the user. The surrounding environment information may include an indoor/outdoor mode, Wi-Fi access point information (e.g., a fingerprint of a Wi-Fi access point), illuminance, and/or a cell ID, but is not limited thereto. The surrounding environment information may include information used to determine whether a user in indoors or outdoors. The surrounding environment information may include values sensed by an IoT network-based sensor (hereinafter, it will be referred to as an IoT sensor) which is located around a computing device. The IoT sensor may include, without limitation, at least one of a temperature sensor, a humidity sensor, an atmospheric sensor, a sunlight amount sensor, an ozone sensor, a yellow sand sensor, a dust sensor, a carbon dioxide sensor, a gas sensor, and/or a fire sensor.

The information about a user may be obtained by using a computing device based on data that is generated or input or output through interaction between a computing device and a user. The information about a user may be directly input, edited, revised or deleted by a user. The information about a user may be provided by an external device of a computing device. The external device may include, for example, a wearable device such as a smart watch, glasses, an appcessory, and/or a server (e.g., a social network service server).

The geographical location-based context information may be expressed as geographical location-based information. The geographical location-based context information may include place profile information, but is not limited thereto. The place profile information may include, without limitation, at least one of a name of a place (e.g., Gwanghwamun), an address of a place, a shop name (e.g., Seoul Bibimbap), information about content generated at the place, an event occurring at the place (e.g., a concert, a show, a photo exhibition, an art exhibition, advertisement, and/or discount coupons), weather, season, time, day, visitor information, the number of times of visiting the place by user, and/or floating population information of the place.

The place profile information may be collected by a place profile information providing server (e.g., a map server or a POI server) and provided to a computing device, but is not limited thereto. For example, the place profile information may be provided by a place profile information providing application installed in a computing device.

The place profile information providing application may collect information about places while communicating with the place profile information providing server, but is not limited thereto. For example, the place profile information providing application may collect information about places from an external device of a computing device. The place profile information providing application may be updated by the place profile information providing server. The place profile information providing application may collect information about places by interaction with a user of the computing device.

The place profile information may be different according to at least one of a day the week, time, weather, and/or season. For example, information about content registered at place A (e.g., a content type, a theme item, or a content recommendation message) may be different according to at least one of a day of the week, time, weather, and/or season. Information about content registered at place A on Monday may be different from information about content registered at place A on Tuesday. Information about content registered at place A at 7 p.m. may be different from information about content registered at place A at 1 p.m. Information about content registered at place A on a rainy day may be different from information about content registered at place A on a clear day. Information about content registered at place A in spring may be different from information about content registered at place A in winter.

Information about content registered at place A may be different according to a condition of combining a day of the week and weather. The information about content registered at place A may be different according to a condition of combining a day of the week and time. The information about content registered at place A may be different according to a condition of combining a day of the week and season. The information about content registered at place A may be different according to a condition of combining a day of the week, weather, and/or time. The information about content registered at place A may be different according to a condition of combining a day of the week, weather, and/or season. The information about content registered at place A may be different according to a condition of combining weather, time, and/or season.

The information about content may be differently registered according to conditions other than those described above. For example, the information about content may be different according to persons. That is, information about content registered by user A at place A may be different from information about content registered by user B at place A.

The information about content described throughout the specification may include, without limitation, a content type, content, a theme item corresponding to the content, the number of pieces of contents generated for each theme item, and a recommendation message based on the contents.

The theme item may indicate a representative activity of a user included in content to be generated. For example, the theme item may include at least one of, for example, without limitation, coffee, biking, a meeting, dating, a movie (or watching a movie), driving, sports, shopping, a hospital visit (or a hospital), reading, study, beauty care, eating, a game, a gathering, hiking, an all-nighter, killing time, a tasty food restaurant, talking, well-being, travel, self-development, cooking, rest, cleaning, a stroll, a pet, a birthday, a show, and/or a business trip.

The theme item may be set based on a user input. The theme item may be set when manufacturing a computing device. The theme item may be directly input, edited, revised, deleted, or added by a user. The theme item may be provided in the form of at least one of an icon, a text, an image, and multimedia, but is not limited thereto. For example, the theme item may be expressed as an icon or a combination of an icon and a text.

The theme item may be used when filtering a point of interest with respect to a user. The point of interest with respect to a user may indicate a place that is personalized for the user (e.g., a café, a tasty food restaurant, a park, or a promenade).

Hereinafter, exemplary embodiments will be described below in more detail with reference to the accompanying drawings. Components that are the same are given the same reference numeral, and redundant explanations may be omitted.

FIG. 1 is a view illustrating an example of personalized information provided according to an exemplary embodiment. FIG. 1 illustrates an example of providing information about a user's predicted route (or a user's predicted trajectory) based on information about an initial route (or an initial trajectory) of the user tracked by using a computing device 100.

Referring to FIG. 1, when a movement of the user is sensed by the computing device 100 at a point 101 illustrated on a screen 110, the computing device 100 tracks a location of the user up to a current point 102 to obtain information about an initial route 103 of the user. The current point 102 may indicate a current location of the user who has the computing device 100. Hereinafter, the point 101 will be referred to as a starting point 101.

Information about the initial route 103 may include user location information measured between the starting point 101 and the current point 102 (for example, coordinate information expressed by a latitude value and a longitude value) and a time when a location of the user is measured, but is not limited thereto. For example, information about the initial route 103 may further include information about a user mode and/or information about content generated by the user.

When the location of the user is measured ten times between the starting point 101 and the current point 102, information about the initial route 103 obtained by using the computing device 100 may include ten entries. Each entry includes information about a point where a location of the user is measured.

The information about the point where the user's location is measured may include information about the user's location that is measured and/or time when the user's location is measured. The information about the point where the user's location is measured may further include information about a user mode and information about content generated by the user. The computing device 100 may generate one entry for each time when the user's location is measured.

The current point 102 may be determined based on a previously set movement distance and/or a previously set movement time, but is not limited thereto. For example, the current point 102 may be set according to a user input. The user input may include, for example, a user input indicating a request for personalized information (request for a predicted route), but is not limited thereto. The user input may include, without limitation, at least one of a touch-based input, a user voice-based input, and a user gesture-based input.

When information about the initial route 103 is obtained, the computing device 100 detects information about a user's predicted route from user location history information based on the information about the initial route 103. The user location history information may be expressed as a profile of user's locations.

The profile of user's locations may be generated by machine learning about collected user location history information. The profile about user's locations may be generated by using a device that stores the user location history information. The user location history information may be stored in the computing device 100, but is not limited thereto. For example, the user location history information may be stored in an external device designated by a user in advance, such as a home sync.

The external device may be located outside the computing device 100. The external device may be a device designated as a personal cloud of the user (e.g., a home sync, an IoT network-based device (for example, a smart TV, hereinafter, it will be referred to as an IoT device), a wearable device, another computing device, or a server), and/or a device within an area to be directly controlled by the user.

The external device storing the user location history information may collect user location history information during a predetermined period of time by using the computing device 100. For example, a home sync may collect user location history information by using the computing device 100. The user location history information may be collected during a predetermined period of time by using the computing device 100.

When collecting the user location history information, the computing device 100 or the external device may measure a user's location by using a user location tracking method performed in operation S202 of FIG. 2 which will be described later, but is not limited thereto.

For example, the computing device 100 detects a similar route to a current route from cumulative route information or past route information. The computing device 100 may measure a user's location by determining a next location measurement point based on the detected similar route. The next location measurement point of a user may be determined based on the similar route by considering deviation of the user to another route. For example, the computing device 100 may determine a point of measuring a user's location by considering a point where a route is branched out, such as a forked road, an intersection, or a crossing.

When the user location history information is stored in the external device, the computing device 100 may detect information about a user's predicted route by reading the user location history information from the external device, but is not limited thereto. For example, the computing device 100 may provide the external device with information about the initial route 103, and request information indicating the predicted route of the user from the external device and receive the same from the external device The computing device 100 may provide a user with information indicating the predicted route of the user. For example, as illustrated on a screen 120 of FIG. 1, the computing device 100 may provide a user with information about a predicted route 104 of the user.

The computing device 100 may display the initial route 103 and the predicted route 104 of the user differently so that the user may intuitively distinguish the two. For example, as illustrated on the screen 120 of FIG. 1, the computing device 100 may display the initial route 103 with a solid line, and the predicted route 104 of the user with a dotted line, but the display of the initial route 103 and the predicted route 104 of the user is not limited to an exemplary embodiment of FIG. 1.

The computing device 100 may include, without limitation, for example, a portable device, a wearable device, a home internet appliance, or a mobile device.

Example of the portable device may include, without limitation, a smart phone, a notebook, a smart board, a tablet personal computer (PC), a handheld device, a handheld computer, a media player, an e-book device, or a personal digital assistant (PDA).

Example of the wearable device may include, without limitation, smart glasses, a smart watch, a smart band (e.g., smart waist band or smart hair band), various smart accessories (e.g., smart ring, smart bracelet, smart anklet, smart hair pin, smart clip, and smart necklace), various smart body protection pads (e.g., smart knee pads, smart elbow protection pads), smart shoes, smart gloves, smart clothing, smart hats, a smart artificial leg, or a smart artificial hand.

Example of the home internet appliance may include, without limitation, a smart TV, a smart player, a smart frame, a smart oven, a desktop PC, a smart refrigerator, a smart washing machine, a smart illumination, a smart training machine, a smart dryer, a smart dish washer, a smart bed, a smart wardrobe, or a smart anti-crime system (e.g., home closed circuit television (CCTV)). Example of the home internet appliance may include a machine-to-machine (M2M) or an IoT network-based home device.

Examples of the mobile device may include, without limitation, a M2M or an IoT network-based car, or a car navigation device.

Figure 2:
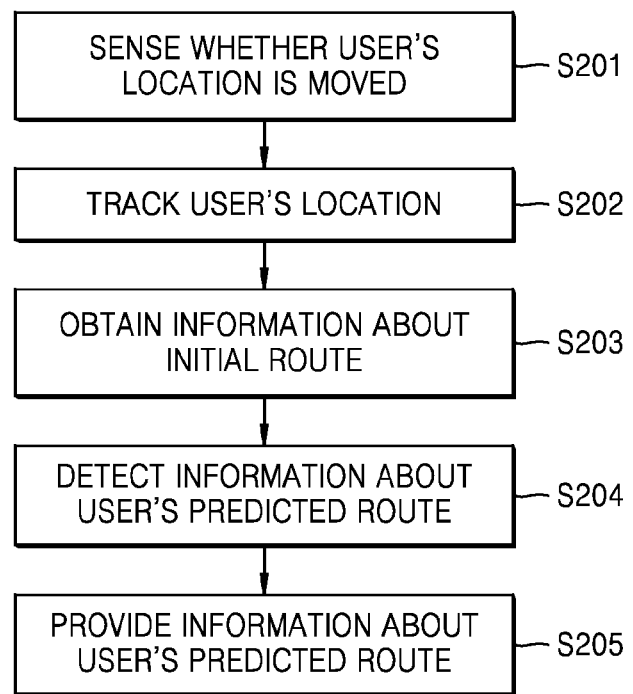
FIG. 2 is an operational flowchart of a method of providing personalized information according to an exemplary embodiment.

FIG. 2 is an operational flowchart of a method of providing personalized information according to an exemplary embodiment.

In operation S201, the computing device 100 senses whether a user's location (or a user's position) is moved. The sensing whether the user's location is moved may be indicated sensing whether the user's location is changed. The computing device 100 may sense whether the user's location is moved based on a latitude value and a longitude value of the computing device 100. For example, if one of the latitude value and the longitude value of the computing device 100 is changed, the computing device 100 may determine that the user's location is moved.

The latitude value and the longitude value of the computing device 100 may be provided from a network provider (or a network location information provider) or may be detected from a signal received from a GPS satellite. The network provider may provide the latitude value and the longitude value of the computing device 100 based on address information of a current location (or a current position) of the computing device 100, but the method of providing the latitude value and the longitude value by the network provider is not limited thereto.

A method of sensing whether the user's location is moved is not limited to the method described above of using the latitude value and the longitude value. For example, the computing device 100 may sense whether the user's location is moved based on location information of a base station that is connected to the computing device 100 (e.g., a cell ID), a fingerprint of a Wi-Fi access point that is connected to the computing device 100, and surrounding environment information (e.g., a sensing value (for example, visible ray illuminance) of an illuminance sensor (e.g., a LED sensor) or a sensing value of an IoT sensor).

The computing device 100 may sense whether the user's location is moved by using an inertia navigation method using an accelerometer sensor and a gyroscope sensor included in the computing device 100, a magnetic field fingerprint method using a geomagnetic sensor included in the computing device 100, or a method of sensing a signal generated via NFC or a Bluetooth beacon (Bluetooth signal generator).

Before sensing whether the user's location is moved, the computing device 100 may determine whether a current location of the user is indoors or outdoors. For example, the computing device 100 may determine whether a current location of the user is indoors or outdoors based on a distribution chart of a GPS satellite. That is, the computing device 100 detects a distribution chart of a GPS satellite based on a received GPS signal. When the detected distribution chart of a GPS satellite is uniform, the computing device 100 may determine that a current location of the user is outdoors. When the detected distribution chart of the GPS satellite is not uniform, the computing device 100 may determine that a current location of the user is indoors.

The computing device 100 may determine a method of sensing whether the user's location is moved and a method of tracking the user's location based on a result of determining whether a current location of the user is indoors or outdoors. For example, when a current location of the user is indoors, the computing device 100 may determine one of methods of using a network and/or a sensor as a method of sensing whether the user's location is moved and a method of tracking the user's location. For example, if a current location of the user is outdoors, one of the methods of using a network and/or a GPS may be determined as a method of sensing whether the user's location is moved and a method of tracking the user's location.

When tracking the route of the user, the computing device 100 may determine a method of sensing whether the user's location is moved and a method of tracking the user's location in multiple ways. For example, the computing device 100 may sense whether the user's location is moved by using a sensor, and may track the user's location by using a hybrid method in which both a network and a GPS are selectively used.

When tracking the user's route, the computing device 100 may vary a method of sensing whether the user's location is moved and a method of tracking the user's location based on at least one of a movement speed of a user, surrounding environment information of the user, and a past route (or a predicted route of the user).

When a movement of the user's location is sensed, the computing device 100 tracks the user's location in operation S202. The computing device 100 may continuously track the user's location, but is not limited thereto. For example, the computing device 100 may track the user's location at a preset measurement interval. The preset measurement interval may be set based on time and/or distance.

The preset measurement interval may be set differently according to a user mode. For example, a preset measurement interval used when a user who is walking or running may be different from a preset measurement interval of a user who is riding in a car. Further, a preset measurement interval used when a user is riding in a car may be different from a preset measurement interval used when a user is riding in a ship.

When tracking the user's location, the computing device 100 may variably control an interval of measuring the user's location based on at least one of a movement speed of the user and a surrounding environment information of the user.

For example, if the movement speed of the user increases, the computing device 100 may reduce an interval of measuring the user's location. If the movement speed of the user is reduced, the computing device 100 may increase an interval of measuring the user's location.

A range within which an interval of measuring the user's location is variably controllable according to the movement speed of the user may be different according to a user mode. For example, the range within which the interval of measuring the user's location is variably controllable when a user walks or runs may be different from a range within which an interval of measuring the user's location is variably controllable when a user is riding in a car. The range within which an interval of measuring the user's location is variably controllable may be represented in a form of a maximum value and a minimum value.

Even if a large amount of a user's movement is sensed, if it is determined based on surrounding environment information of the user that the user is staying at one location, the computing device 100 may increase an interval of measuring the user's location to be longer than a previous interval of measuring the user's location. The movement of the user may be sensed by using a motion sensor included in the computing device 100. Example of the motion sensor may include, without limitation, an accelerometer sensor, a geomagnetic sensor, and/or a gyroscope sensor.

Even if the movement speed of the user is faster, if it is determined based on surrounding environment information of the user that the user is staying at one location (for example, if a user is rotating at one position or quickly moves at a spot of the same Wi-Fi fingerprint), the computing device 100 may increase an interval of measuring a user's location to be longer than a previous interval of measuring the user's location.

As described above, by variably controlling an interval of measuring the user's location or increasing an interval of measuring the user's location to be longer than a previous interval of measuring the user's location, or by controlling a method of tracking the user's location indoors differently from a method of tracking the user's location outdoors, battery consumption of the computing device 100 due to tracking of the user's location may be reduced.

Tracking a location of the user by using the computing device 100 in operation S202 may be performed based on a preset time and/or a preset distance, but is not limited thereto.

Based on tracking of the user's location performed in S202 by using the computing device 100, the computing device 100 obtains information about an initial route of the user in operation S203. The information about an initial route is described above with reference to FIG. 1.

When the information about an initial route is obtained, the computing device 100 detects information indicating the predicted route of the user from the user location history information based on the information about an initial route in operation S204. The user location history information may be stored in the computing device 100, but may also be stored in an external device of the computing device 100 as described with reference to FIG. 1.

When the user location history information is stored in an external device, the computing device 100 may read the user location history information stored in the external device in operation S204 as described with reference to FIG. 1 and detect the information indicating the predicted route of the user from the read user location history information or may request information indicating the predicted route of the user to the external device and receive the same from the external device.

When the user location history information is stored in the computing device 100 or is read from an external device, the computing device 100 may detect the information indicating the predicted route of the user by using a method described below.

The computing device 100 may detect information indicating the predicted route of the user by using a statistical analysis method. Examples of information used in detecting information indicating the predicted route of the user may include, without limitation, a location measurement time, a latitude value, or a longitude value. For example, information used in detecting information indicating the predicted route of the user may further include information about a user mode and/or information about content generated by a user.

The computing device 100 may detect information about a user's route by comparing information about an initial route and user location history information. The information about a user's route includes information about a similar route to an initial route.

The computing device 100 may detect information about the user's route, including information about a similar route to the initial route by using the user location information (e.g., a latitude value and a longitude value), and the location measurement time information. Information used by the computing device 100 when detecting the information about the user's route may be, as described above, information about a user mode and/or information about content generated by a user, included in the information about an initial route.

The computing device 100 may detect information indicating the predicted route of the user by using a machine learning algorithm. That is, the computing device 100 may analyze information about an initial route based on a profile or model of a user's location generated based on the user location history information. The analysis method may be performed by using a decision tree learning method based on the profile or model of a user's location or an artificial neural network, but the analysis method is not limited thereto. The computing device 100 may detect Information about a user's route including a similar route to an initial route based on a result of analyzing information about an initial route.

The profile or model of a user's location, generated by machine learning, may be expressed as cumulative route information (or a cumulative route profile or model) or past route information (or a past route profile or model). The computing device 100 may detect information about a user's route including a similar route to an initial route based on the cumulative route information or the past route information.

When the information about the user's route including a similar route to an initial route is detected by using the statistical analysis method or the machine learning method (or a machine learning algorithm) described above, the computing device 100 may detect, from among the detected information about the user's route, information about the rest of the route indicating the predicted route of the user.

If a plurality of pieces of information about the user's route are detected by the computing device 100, the computing device 100 may select information about the user's route that is most frequently used, from among the detected plurality of piece of information about the user's route, as the information about the user's route.

The plurality of pieces of information about the user's route may include information about a route that is the same as an initial route and different rest of the routes. For example, if information about an initial route is "point A→point B (or from point A to point B)," the plurality of pieces of information about the user's route may include information about a user's first route which is "point A→point B→point C," information about a user's second route which is "point A→point B→point D→point E," and information about a user's third route which is "point A→point B→point F→point E."

If the number of times of using the information about the user's second route is the greatest among the information about the first through third routes of the user, the computing device 100 may select the information about the user's second route as the information about the user's route with respect to an initial route. When the information about the user's second route is selected, the computing device 100 may detect "point B→point F→point E" as information about a user's predicted route.

When the information about the user's predicted route is detected, the computing device 100 provides the user with a user's predicted route, in operation S205. The computing device 100 may provide the user's predicted route that extends from an initial route, as shown on the screen 120 of FIG. 1.

When detecting the information indicating the predicted route of the user by using an external device, the methods performed by the computing device 100 described above may be used.

Figure 3:
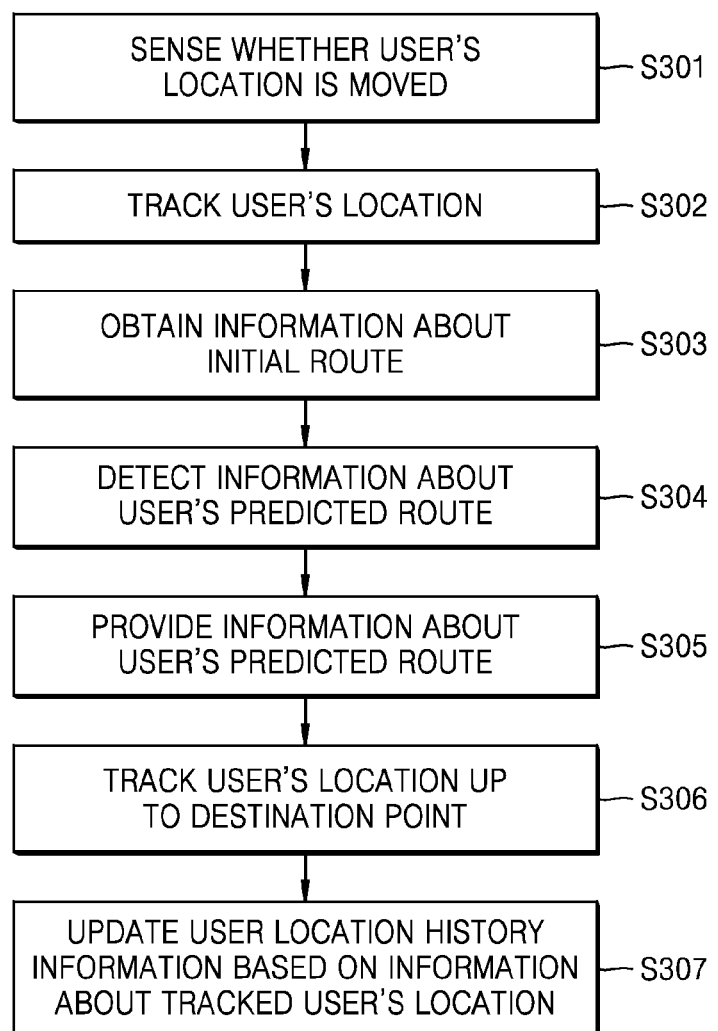
FIG. 3 is an operational flowchart of a method of providing personalized information according to another exemplary embodiment.

FIG. 3 is an operational flowchart of a method of providing personalized information according to another exemplary embodiment. In the method FIG. 3, a function of tracking a user's route to a destination point is added to an exemplary embodiment of FIG. 2.

Operations S301 through S305 of FIG. 3 are respectively similar to operations S201 through S205 of FIG. 2, and thus description thereof will be omitted below.

In operation S306, the computing device 100 tracks a user's location from a current point 102 to a destination point 105. The destination point 105 is based on the predicted route 104 of the user. When tracking a user's location, the computing device 100 may variably control an interval of measuring a user's location based on at least one of a movement speed of the user, surrounding environment information of the user, and/or the predicted route 104 of the user. In particular, the computing device 100 may determine a next location measurement time (or a next location measurement point) based on the predicted route 104 of the user. Based on the tracking of the user's location described above, battery consumption of the computing device 100 may be reduced.

In operation S307, the computing device 100 may update the user location history information based on information about the tracked user's location.

Figure 4:
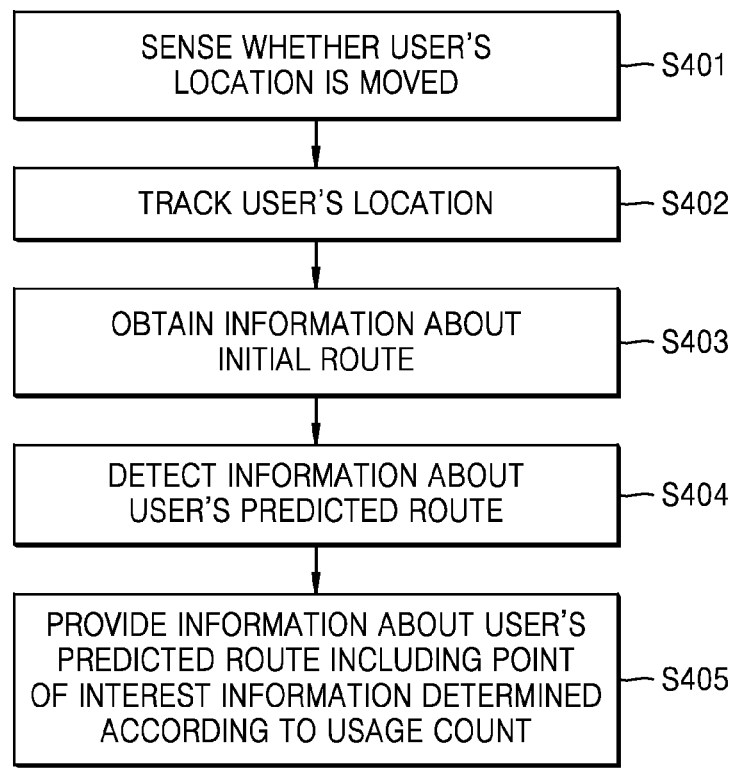
FIG. 4 is an operational flowchart of a method of providing personalized information according to another exemplary embodiment.

FIG. 4 is an operational flowchart of a method of providing personalized information according to another exemplary embodiment. Based on the method of FIG. 4, personalized information may be provided according to number of uses (or a usage count) of a user's predicted route.

Operations S401 through S404 of FIG. 4 are respectively similar to operations S201 through S204 of FIG. 2, and thus description thereof will be omitted below.

When providing information indicating the predicted route 104 of the user in operation S405, the computing device 100 may provide different interest information based on the usage count of the predicted route 104 of the user. The information indicating the predicted route 104 of the user may include information regarding the usage count of the predicted route 104 of the user. Different interest information may include a theme item, but is not limited thereto. For example, the computing device 100 may provide different user activities (or user mode) according to the usage count of the predicted route 104 of the user.

Figure 5:
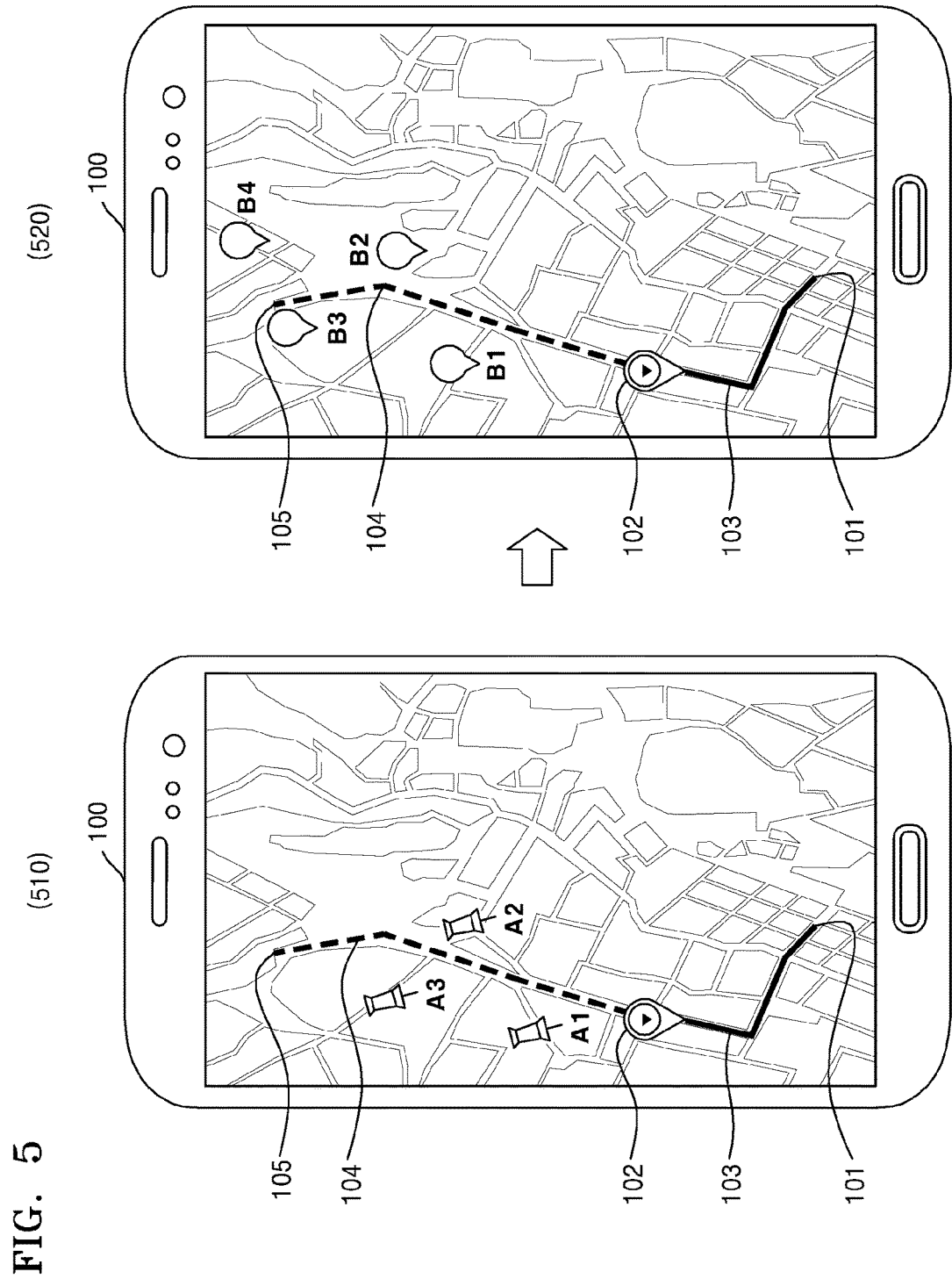
FIG. 5 illustrates an example of a screen for providing different interest information based on the usage count information included in information indicating a predicted route of the user.

FIG. 5 illustrates an example of a screen for providing different interest information based on the usage count included in information indicating the predicted route 104 of the user. A screen 510 of FIG. 5 shows an example in a case that the usage count of the predicted route 104 is n. A screen 520 of FIG. 2 illustrates an example in a case that the usage count of the predicted route 104 is m, in which n and m are natural numbers equal to or greater than 1. For example, n may be 2, and m may be 10.

The screen 510 of FIG. 5 provides points of interest A1, A2, and A3. The screen 520 of FIG. 5 provides points of interest B1, B2, B3, and B4. The points of interest A1, A2, and A3 may be information based on different content types (e.g., a restaurant, a gas station, or a shopping mall), different theme items, or different user activities. The points of interest B1, B2, B3, and B4 may be information based on the different content types, the different theme items, or the different user activities.

The computing device 100 may change information about the points of interest A1, A2, A3, B1, B2, B3, and B4 according to a user input. A user input may include, without limitation, for example, information about a desired point of interest. For example, a user input may include a request for changing a point of interest.

The computing device 100 may provide interest information as shown on the screen 510 and the screen 520 based on the usage count and information about a user included in the information indicating the predicted route 104 of the user.

Figure 6:
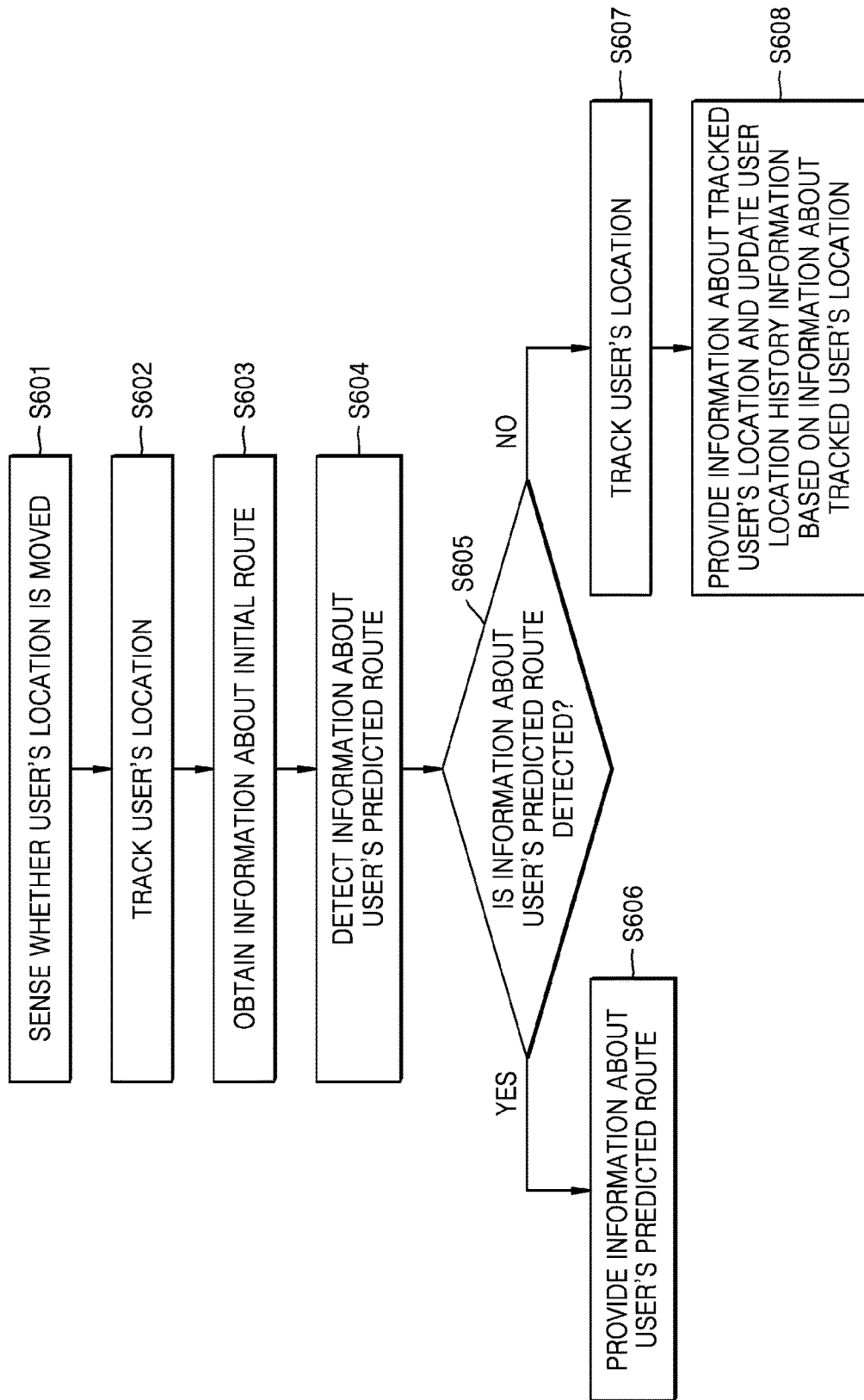
FIG. 6 is an operational flowchart of a method of providing personalized information according to another exemplary embodiment.

FIG. 6 is an operational flowchart of a method of providing personalized information according to another exemplary embodiment. The method of FIG. 6 is an example of providing personalized information depending on whether the predicted route 104 based on an initial route is detected from the user location history information.

Operations S601 through S604 of FIG. 6 are respectively similar to operations S201 through S204 of FIG. 2, and thus description thereof will be omitted below.

In operation S605, the computing device 100 determines whether information indicating the predicted route 104 based on the initial route 103 is detected from the user location history information. As a result of the determination, if the information indicating the predicted route 104 is detected from the user location history information, the computing device 100 provides information indicating the predicted route 104 in operation S606, like in operation S205.

If information indicating the predicted route is not detected from the user location history information in operation S605, the computing device 100 tracks a user's location in operation S607. The computing device 100 may track a user's location as in operation S202 described above. If information indicating the predicted route 104 is not detected from the user location history information, the initial route 103 may be an unusual route for the user. The unusual route may be based on unusual events (e.g., travel, new destination, party).

In operation S608, the computing device 100 may provide the information about the tracked user's location and update the user location history information based on the information about the tracked user's location.

Figure 7:
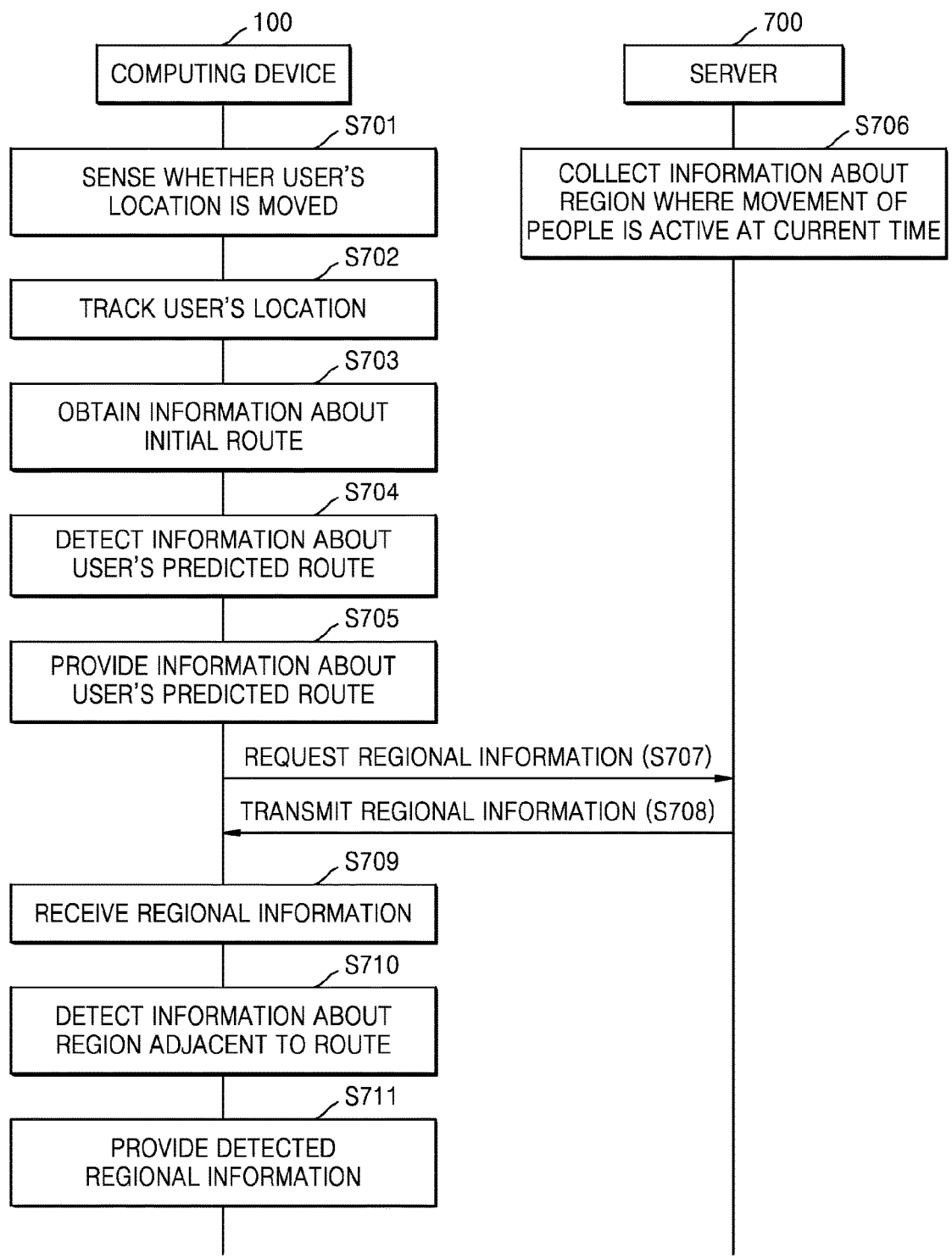
FIG. 7 is an operational flowchart of a method of providing personalized information according to another exemplary embodiment.

FIG. 7 is an operational flowchart of a method of providing personalized information according to another exemplary embodiment. FIG. 7 illustrates an example where there is a region where the movement of people is active at a current time based on the predicted route 104. FIG. 7 is an operational flowchart based on the computing device 100 and a server 700.

Operations S701 through S705 of FIG. 7 are respectively similar to operations S201 through S205 of FIG. 2, and thus description thereof will be omitted below.

In operation S706, the server 700 collects information about a region where movement of people is active at a current time (or a region with a large floating population). The server 700 may include an external device such as a location information collecting server or a personalized information providing server, but is not limited thereto.

The server 700 may collect information about a region where movement of people is active at a current time based on a preset number of people, but is not limited thereto. For example, the server may collect information of top ten regions with active movement of people at a current time for each administrative region (e.g., Maetandong of Suwon City). The information about the region may be expressed as location information (or coordinates information). The preset number of people and the top ten for each administrative region described above may be included in a first parameter that is used to collect the information about the region where movement of people is active at a current time. Information included in the first parameter is not limited thereto.

In operation S707, the computing device 100 requests from the server 700 information about a region where movement of people is active at a current time. In operation S708, the server 700 transmits the collected information about a region where movement of people is active at a current time, to the computing device 100.

In operation S709, the computing device 100 receives the information about a region where movement of people is active at a current time. In operation S710, the computing device 100 detects information about a region adjacent to the predicted route 104 from the information about a region where movement of people is active at a current time, by using a second parameter.

Figure 8:
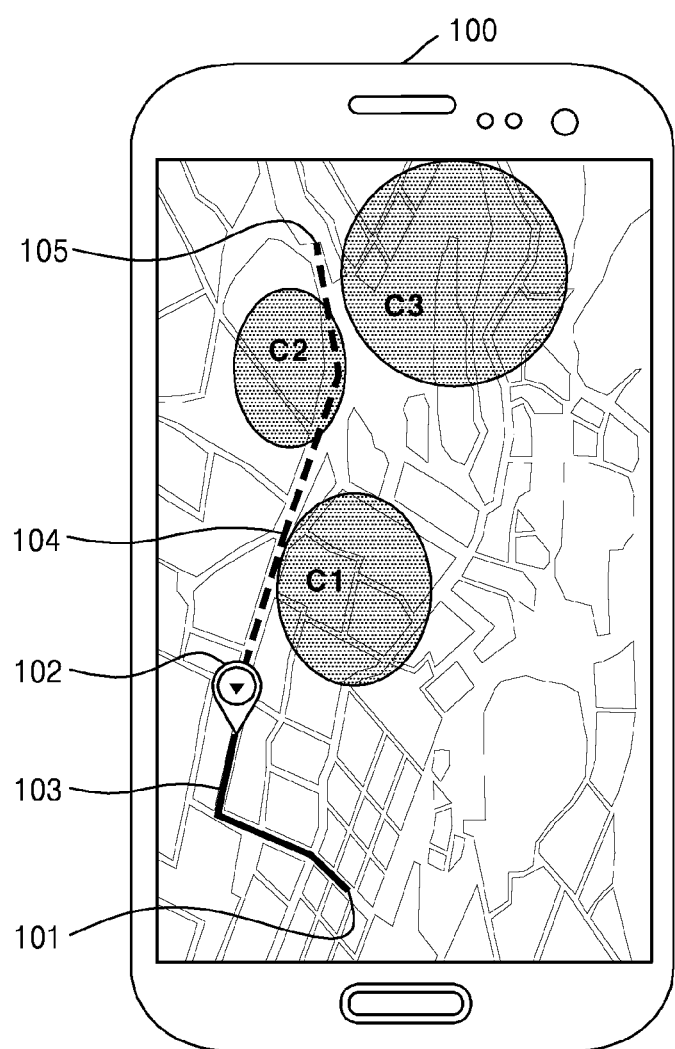
FIG. 8 illustrates an example of providing information about a region adjacent to a predicted route of a user, according to another exemplary embodiment.

FIG. 8 illustrates an example of providing information about regions C1, C2, and C3 adjacent to the predicted route 104. In operation S710, to detect the adjacent regions C1, C2, and C3 as shown in FIG. 8, the computing device 100 may use the second parameter which includes distance information and number information. Information included in the second parameter is not limited thereto.

The distance information may include, for example, information such as 100 m or 200 m. If the distance information is 100 m, the computing device 100 may detect information about a region within 100 m with respect to the predicted route 104. The number information may refer to a number of regions and may include integers such as 2, 3, or 4. If the number information is 3, the computing device 100 may detect information about three regions adjacent to the predicted route 104.

When using both distance information of 100 m and number information of 3, the computing device 100 may detect information about three regions within 100 m with respect to the predicted route 104. Information included in the first and second parameters may be set in advance. Information included in the second parameter may be input by a user. Information included in the second parameter may be selectively used by a user.

In operation S711, the computing device 100 provides the detected regional information as shown in FIG. 8. In FIG. 8, number information included in the second parameter is 3. If number information included in the second parameter is 2, the computing device 100 may provide information about the adjacent regions C1 and C2. If number information included in the second parameter is 1, the computing device 100 may provide information about the adjacent region C3.

Sizes of the adjacent regions C1, C2, and C3 may be determined based on the number of people. Referring to FIG. 8, an amount of movement of people is large in an order of C3, C1, and C2. The adjacent regions C1, C2, and C3 are expressed as circles, but are not limited thereto. For example, the adjacent regions C1, C2, and C3 may be expressed as squares or triangles. The distance information included in the second parameter may be a distance between a center point of the adjacent regions C1, C2, and C3 and a boundary line of the predicted route 104, but is not limited thereto. The boundary line of the predicted route 104 denotes a boundary line of the predicted route 104 adjacent to the side of the adjacent regions C1, C2, and C3. For example, in a case of the adjacent region C1, the boundary line of the predicted route 104 is the right side boundary line of the predicted route 104.

Figure 9:
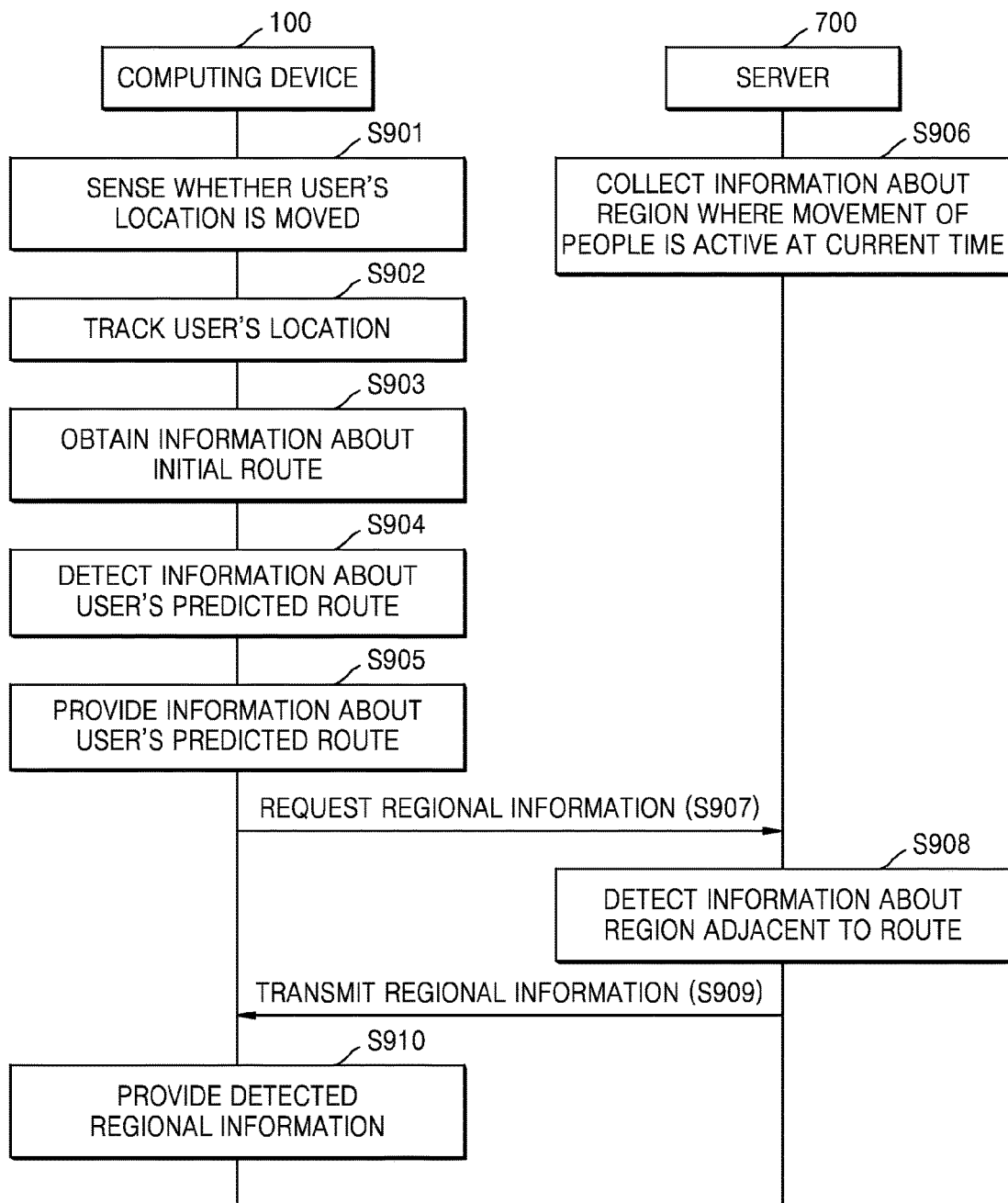
FIG. 9 is an operational flowchart of a method of providing personalized information according to another exemplary embodiment.

FIG. 9 is an operational flowchart of a method of providing personalized information according to another exemplary embodiment. FIG. 9 shows another example of providing information about a region where movement of people is active at a current time based on the predicted route 104. FIG. 9 is an operational flowchart based on the computing device 100 and the server 700.

Operations S901 through S906 of FIG. 9 are respectively similar to operations S701 through S706 of FIG. 7, and thus description thereof will be omitted below.

In operation S907, the computing device 100 requests regional information from the server 700. When requesting the regional information, the computing device 100 may transmit information indicating the predicted route 104 detected in operation S904 to the server 700. In operation S907, the computing device 100 may further transmit the second parameter to the server 700. The second parameter may include a current time.

In operation S908, the server 700 may detect information about a region adjacent to the predicted route 104 from the information about a region where movement of people is active at a current time, collected in operation S906, by using at least one of the received information indicating the predicted route 104 and the second parameter. The server 700 may set the second parameter in advance, and may use the second parameter when detecting information about adjacent regions by using the received information indicating the predicted route 104.

In operation S909, the server 700 transmits information about the regions C1, C2, and C3 adjacent to the predicted route 104 to the computing device 100. In operation S910, the computing device 100 provides the received information about the adjacent regions C1, C2, and C3 as illustrated in FIG. 8.

Figure 10:
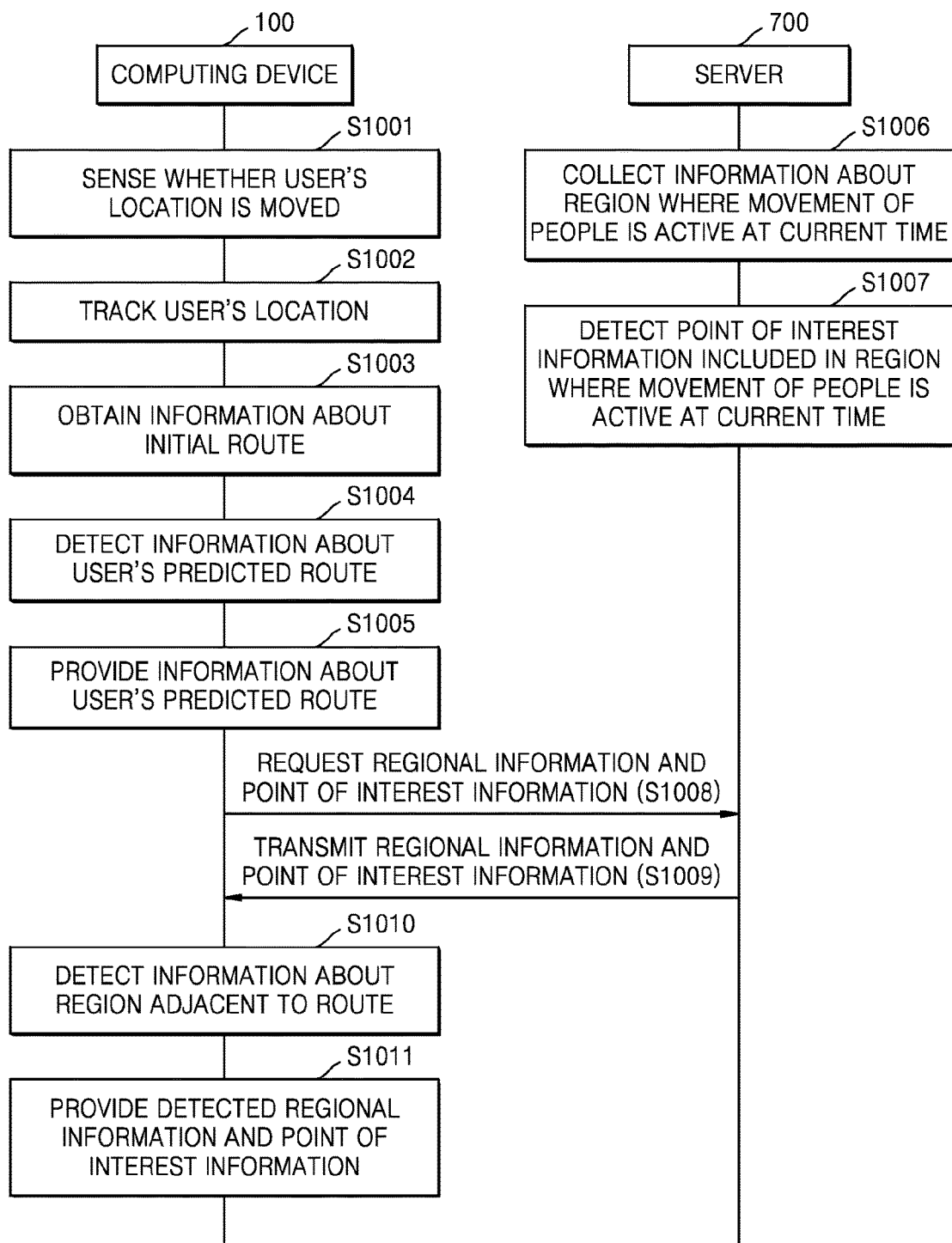
FIG. 10 is an operational flowchart of a method of providing personalized information according to another exemplary embodiment.

FIG. 10 is an operational flowchart of a method of providing personalized information according to another exemplary embodiment. FIG. 10 shows an example of providing information about a region where movement of people is active at a current time and information about a point of interest at a current time based on the predicted route 104. FIG. 10 is an operational flowchart based on the computing device 100 and the server 700.

Operations S1001 through S1006 of FIG. 10 are respectively similar to operations S901 through S906 of FIG. 9, and thus description thereof will be omitted below.

In operation S1007, the server 700 detects information about a point of interest included in a region where movement of people is active at a current time. The information about the point of interest may be determined based on information about a user.

In operation S1008, the computing device 100 requests regional information and information about the point of interest from the server 700. In operation S1009, the server 700 transmits to the computing device 100 the regional information collected in operation S1006 and the information about the point of interest included in each region, detected in operation S1007.

In operation S1010, the computing device 100 detects information about a region adjacent to the predicted route 104 from the received regional information. In operation S1011, the computing device 100 provides the detected adjacent regional information and information about the point of interest included in the detected adjacent region.

Figure 11:
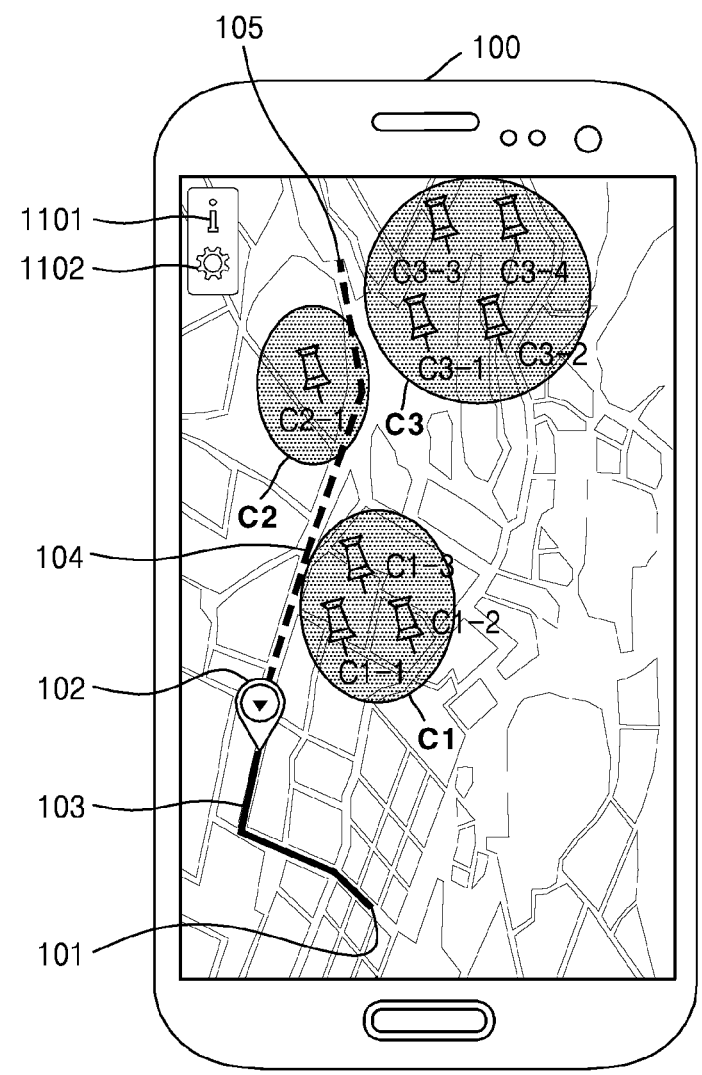
FIG. 11 illustrates an example of providing information about a point of interest included in a region adjacent to a predicted route of a user, according to another exemplary embodiment.

FIG. 11 illustrates an example of providing the adjacent regional information and information about a point of interest included in the adjacent regional information provided by a computing device in operation S1011. Referring to FIG. 11, the computing device 100 provides information about the regions C1, C2, and C3 that are adjacent to the predicted route 104 and points of interest C1-1, C1-2, C1-3, C1-4, C2-1, C3-1, C3-2, C3-3, and C3-4 included in the adjacent regions C1, C2, and C3. The adjacent regions C1, C2, and C3 are regions where movement of people is active at a current time.

Referring to FIG. 11, the number of points of interest included in the adjacent regions C1, C2, and C3 may be different according to the adjacent regions C1, C2, and C3. Referring to FIG. 11, the computing device 100 provides information regarding the most number of points of interest C3-1, C3-2, C3-3, and C3-4, in the region C3. While the number of points of interest may be different according to sizes of the adjacent regions C1, C2, and C3, the number of points of interest may also be provided regardless of the sizes of the adjacent regions C1, C2, and C3. For example, less points of interest may be included in the adjacent region C3 than the adjacent regions C1 and C2.

The computing device 100 may change information about points of interest included in the adjacent regions C1, C2, and C3 based on the set information about points of interest. The computing device 100 may set or change information about points of interest included in the adjacent regions C1, C2, and C3 based on information about a user or according to a user input.

Although the computing device 100 provides information about a point of interest based on information about a user, information about a point of interest provided by the computing device 100 is not limited thereto.

For example, in operation S1008, the computing device 100 may request from the server 700 information about a point of interest of another user. The another user may be a user who allowed information to be provided about a point of interest of his or her own to the user of the computing device 100. In operation S1008, when information about a point of interest of another user is requested, the computing device 100 may transmit identification information (e.g., a name, or a telephone number) of another user to the server 700.

To provide information about a point of interest of another user, the server 700 may detect not only information about a point of interest based on information about the user of the computing device 100 but also information about a point of interest based on information about another user in operation S1007.

In operation S1009, the server 700 transmits the information about the point of interest of another user to the computing device 100. In operation S1011, the computing device 100 may provide information about the point of interest of the another user included in a detected adjacent region.

When there are multiple another users, the computing device 100 may further provide identification information of a user corresponding to information about a point of interest so as to intuitively identify the information about the point of interest for each user in operation S1011. A method of intuitively identifying information about a point of interest of each user is not limited thereto. For example, the computing device 100 may provide information about a point of interest of each user in different colors or shapes, and provide guide information (e.g., a legend) about the colors or shapes corresponding to the respective users.

Figure 12:
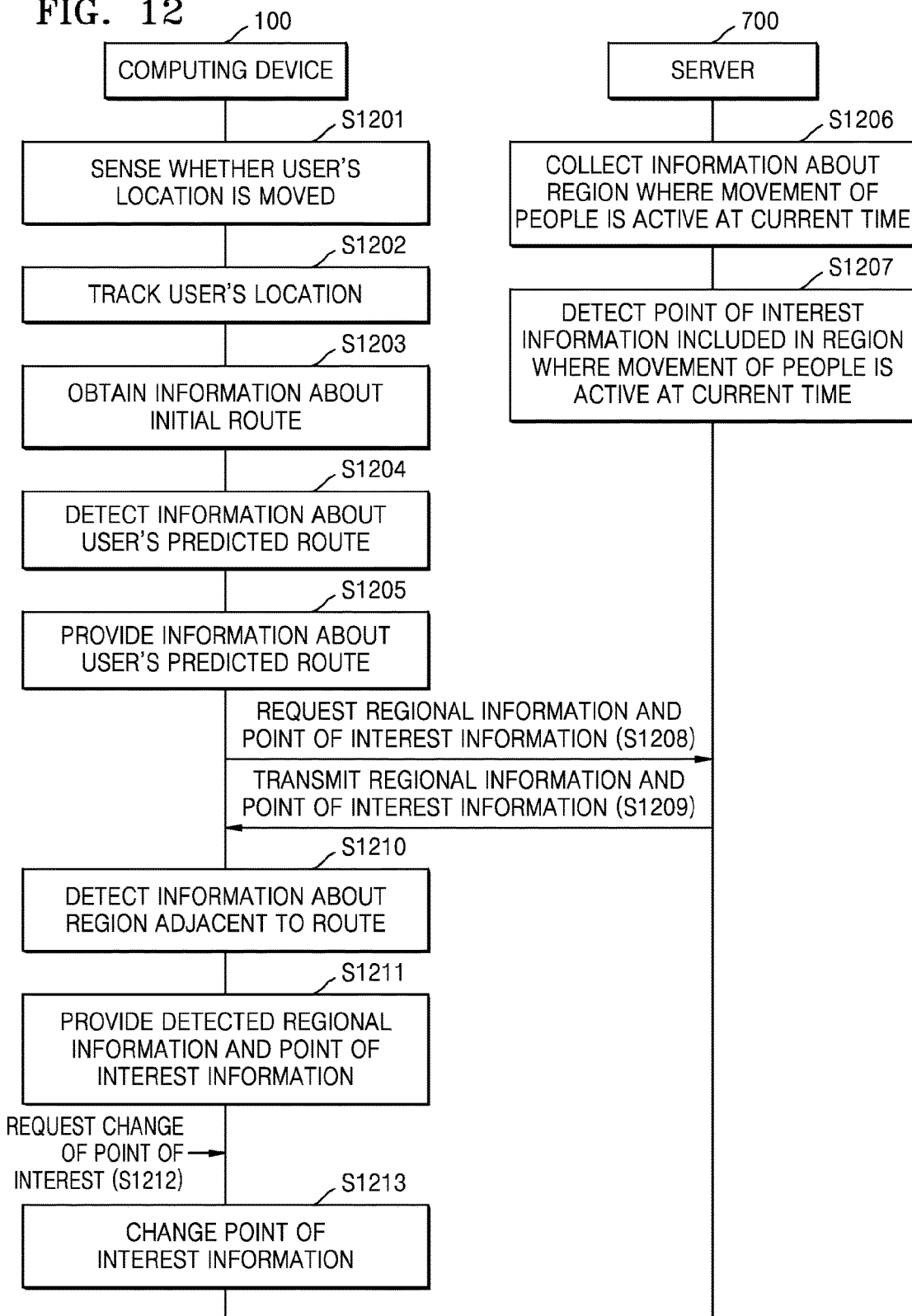
FIG. 12 is an operational flowchart of a method of providing personalized information according to another exemplary embodiment.

FIG. 12 is an operational flowchart of a method of providing personalized information according to another exemplary embodiment. FIG. 12 shows an example of changing information about a point of interest included in a region adjacent to the predicted route 104. FIG. 12 is an operational flowchart based on the computing device 100 and the server 700.

Operations S1201 through S1211 of FIG. 12 are respectively similar to operations S1001 through S1011 of FIG. 10, and thus description thereof will be omitted below.

Figure 13:
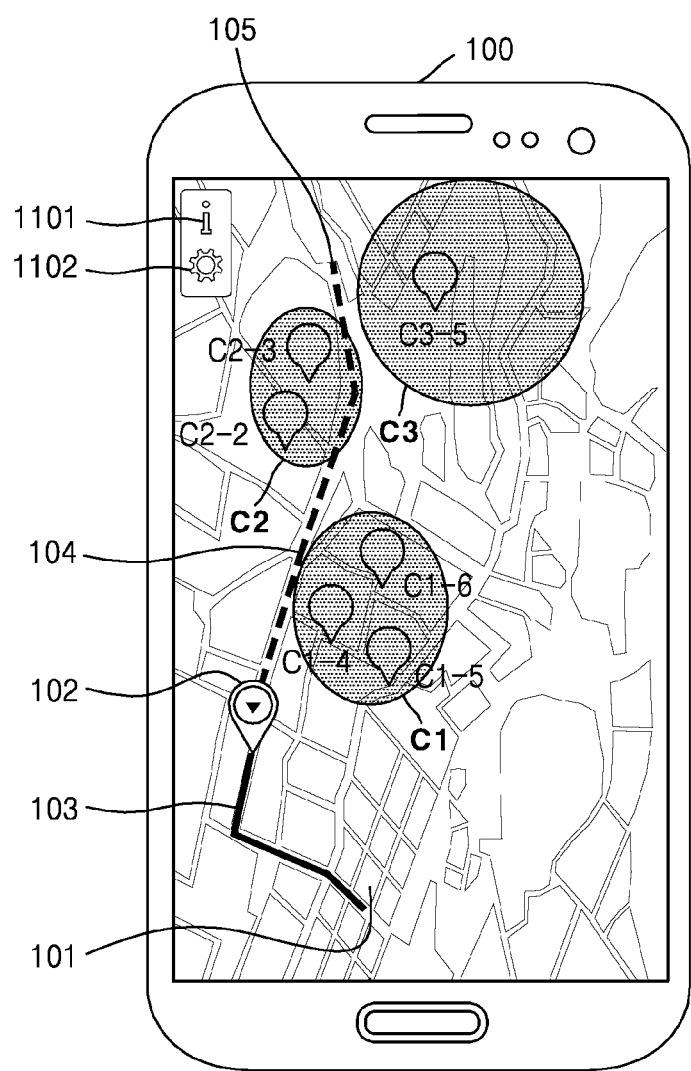
FIG. 13 illustrates an example of providing information about a point of interest included in a region adjacent to a predicted route of a user, according to another exemplary embodiment.

When personalized information as illustrated in FIG. 11 is provided in operation S1211, and when a request for changing a point of interest is received in operation S1212, the computing device 100 may change information about points of interest C1-1, C1-2, C1-3, C1-4, C2-1, C3-1, C3-2, C3-3, and C3-4 included in the adjacent regions C1, C2, and C3 to information about points of interest C1-4, C1-5, C1-6, C2-2, C2-3, and C3-5, as illustrated in FIG. 13 in operation S1213. FIG. 13 illustrates an example of providing information about adjacent regions and information about a point of interest included in the adjacent region, provided by the computing device 100.

The request for changing a point of interest may be received based on, for example, a point of interest toggle item 1101 or a point of interest information setting item 1102 illustrated in FIGS. 11 and 13, but is not limited thereto.

The point of interest toggle item 1101 is an item used to change a type of a point of interest. A type of a point of interest may be classified as, for example, a park, a restaurant (Korean, Chinese, Japanese, etc.), a shopping mall, or an exhibition hall, etc. At least one type of point of interest that is registered to the point of interest toggle item 1101 may be automatically set based on information about a point of interest included in information about a user or may be set by a user.

At least one piece of information about a point of interest may be registered to the point of interest toggle item 1101. For example, if four pieces of information about a point of interest are registered to the point of interest toggle item 1101, every time the point of interest toggle item 1101 is toggled, the computing device 100 may sequentially toggle through four types of points of interest via the adjacent regions C1, C2, and C3.

For example, if the information about the points of interest C1-1, C1-2, C1-3, C1-4, C2-1, C3-1, C3-2, C3-3, and C3-4 included in the adjacent regions C1, C2, and C3 in FIG. 11 is information about a point of interest of a first type (e.g., Korean restaurant), and the point of interest toggle item 1101 is toggled, the computing device 100 may change the information about the point of interest of the first type (e.g., Korean restaurant) included in the adjacent regions C1, C2, and C3 to information about a point of interest of a second type (e.g., shopping mall). Accordingly, the computing device 100 may provide the information about points of interest C1-4, C1-5, C1-6, C2-2, C2-3, and C3-5 as illustrated in FIG. 13 via the adjacent regions C1, C2, and C3.

If the information about a point of interest of the second type (e.g., shopping mall) is provided, and the point of interest toggle item 1101 is toggled, the computing device 100 may change the information about the point of interest of the second type (e.g., shopping mall) included in the adjacent regions C1, C2, and C3 to information about a point of interest of a third type (e.g., Chinese restaurant).

If the information about a point of interest of the third type (e.g., Chinese restaurant) is provided, and the point of interest toggle item 1101 is toggled, the computing device 100 may change the information about the point of interest of the third type (e.g., Chinese restaurant) included in the adjacent regions C1, C2, and C3 to information about a point of interest of a fourth type (e.g., bakery).

If the information about a point of interest of the fourth type (e.g., bakery) is provided, and the point of interest toggle item 1101 is toggled, the computing device 100 may change the information about the point of interest of the fourth type (e.g., bakery) included in the adjacent regions C1, C2, and C3 to information about a point of interest of the first type (e.g., Korean restaurant).

If information about points of interest included in the adjacent regions C1, C2, and C3 is provided as illustrated in FIG. 11, the computing device 100 may change the information about points of interest included in the adjacent regions C1, C2, and C3 according to a user input by using the point of interest information setting item 1102.

A user input received by using the point of interest information setting item 1102 may include at least one of a touch-based input, a user voice input, a proximity touch-based input, and a user gesture based input. A user input received by using the point of interest information setting item 1102 may be expressed as a selection or control of the point of interest information setting item 1102.

Figure 14:
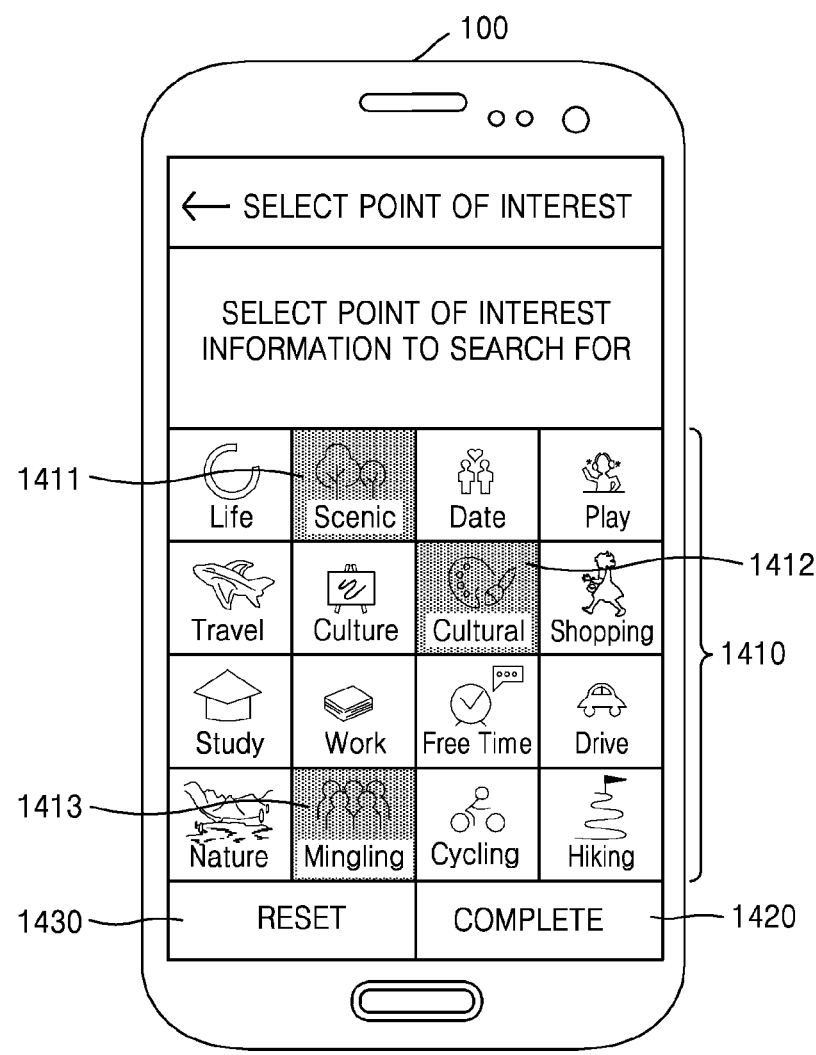
FIG. 14 illustrates an example of a screen including a list of searchable points of interest according to another exemplary embodiment.

When the point of interest information setting item 1102 is controlled, the computing device 100 may provide a screen as illustrated in FIG. 14. FIG. 14 illustrates an example of a screen including a list 1410 of searchable points of interest. Information about points of interest included in the list 1410 of searchable points of interest (hereinafter, it will be referenced to as the list 1410) illustrated in FIG. 14 may be similar to information included in a theme item.

When a user input selecting a Scenic item 1411, a Cultural item 1412, and a Mingling item 1413 is received based on the list 1410, and a Complete button 1420 is selected, the computing device 100 may provide information about points of interest (the Scenic item 1411, the Cultural item 1412, and the Mingling item 1413) selected from the adjacent regions C1, C2, and C3. The Mingling item 1413 indicates points (or places) where people frequently gather together.

In FIG. 14, when a user input selecting the Scenic item 1411, the Cultural item 1412, and the Mingling item 1413 is received based on the list 1410, and a reset button 1430 is selected, the computing device 100 may reset information about selected points of interest. As the information about selected points of interest is reset, the computing device 100 may provide a screen where a selected state of the Scenic item 1411, the Cultural item 1412, and the Mingling item 1413 illustrated in FIG. 14 is cancelled.

Referring to FIG. 12, information about points of interest of every type that may be included in a collected region is received in operation S1209, and the computing device 100 provides information about some points of interest (e.g., Korean restaurant) included in the adjacent regions C1, C2, and C3 in operation S1211. Thus, according to a request for changing a point of interest, received in operation S1212, the computing device 100 may provide information about other points of interest (e.g., Chinese restaurant), which are not provided in operation S1211, in operation S1213.

When providing all information about points of interest received in operation S1209 of FIG. 12, and when the request for changing a point of interest is received in operation S1212, the computing device 100 may transmit a request for changing a point of interest included in a detected region, to the server 700. The server 700 may provide the computing device 100 with information about a point of interest provided in operation S1209 (e.g., Korean restaurant or Chinese restaurant) and information about other points of interest (e.g., shopping mall) from among information about points of interest included in the detected region.

The server 700 may determine information about the other points of interest, based on information about a user, but is not limited thereto. For example, the server 700 may receive the information about the other points of interest (e.g., shopping mall) from the computing device 100 upon receiving a request for changing a point of interest from the computing device 100.

When receiving information indicating other points of interest from the computing device 100, the server 700 may detect information related to other points of interest from the points of interest detected in operation S1207, but is not limited thereto. For example, when receiving information about other points of interest from the computing device 100, the server 700 may perform operation S1207 again to detect information about other points of interest included in the collected region. When information about other points of interest is detected, the server 700 transmits the detected information about the other points of interest to the computing device 100.

Figure 15:
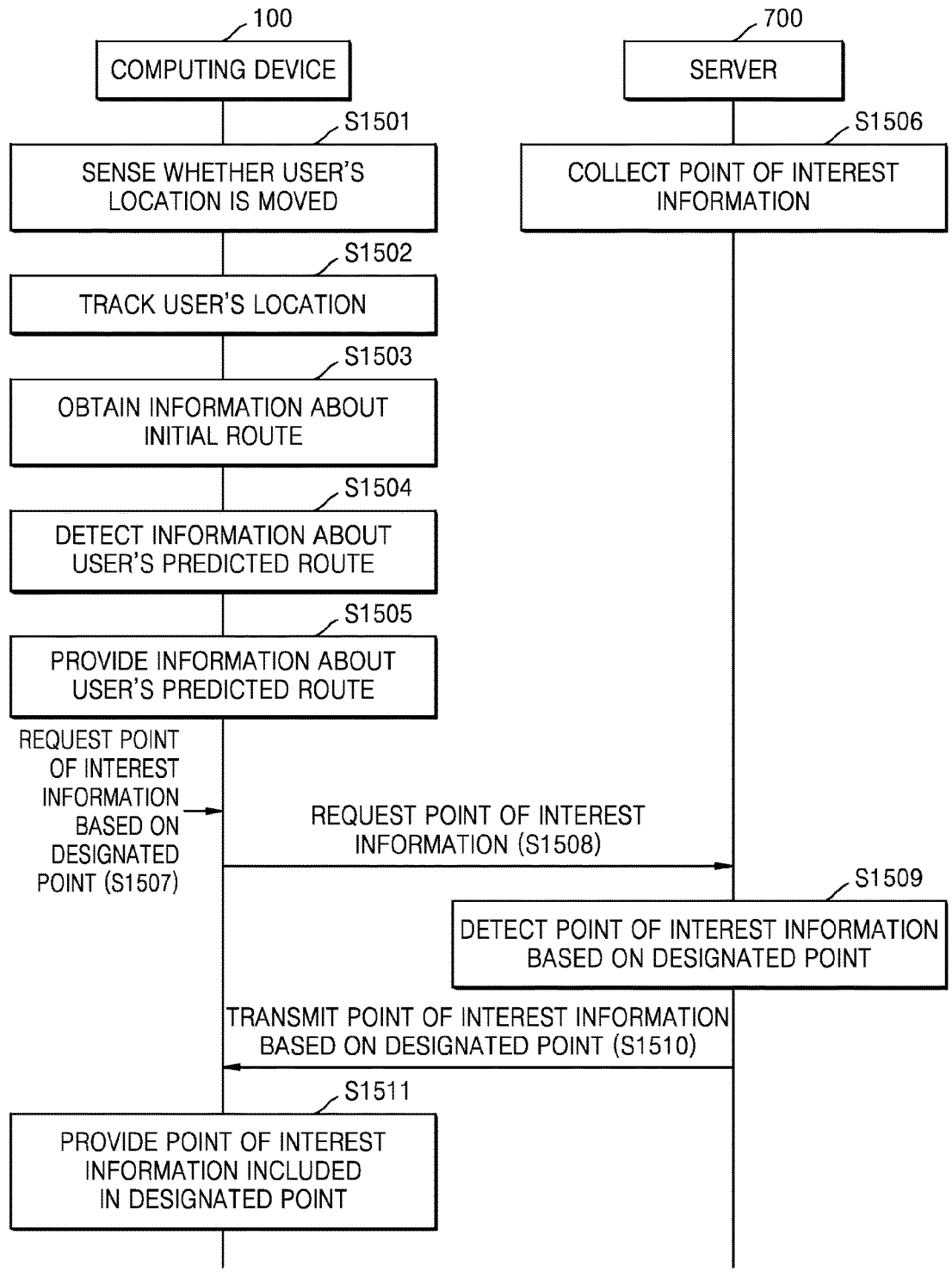
FIG. 15 is an operational flowchart of a method of providing personalized information according to another exemplary embodiment.

FIG. 15 is an operational flowchart of a method of providing personalized information according to another exemplary embodiment. FIG. 15 shows an example of providing information about a point of interest based on a point (or a specially-designated point) on the predicted route 104.

Operations S1501 through S1505 of FIG. 15 are respectively similar to operations S201 through S205 of FIG. 2, and thus description thereof will be omitted below.

In operation S1506, the server 700 collects information about points of interest of a user in each region based on information about a user.

In operation S1505, when the screen 120 of FIG. 1 is provided by the computing device 100, and a request for information about a point of interest based on the point is received in operation S1507, the computing device 100 requests information about the point of interest based on the point to the server 700 in operation S1508. The information about the point of interest based on the point may include, for example, information about a point of interest located within 100 m from the point, but is not limited thereto. 100 m may be included in condition information (or parameter) used to provide information about a point of interest based on the point. The condition information may be preset or set by the user.

The point includes at least one point on the predicted route 104. The point may include, for example, the current point 102 and the destination point 105 on the predicted route 104, but is not limited thereto.

The request for information about a point of interest based on a predetermined point may be input as a touch-based user input, but is not limited thereto. For example, the request for the information about the point of interest based on the point may include a user voice input (e.g., point A) indicating the point. A user input or a user voice input requesting information about a point of interest based on the point may include an input designating a particular one point on the predicted route 104.

For example, when the screen 120 of FIG. 1 is provided by the computing device 100 in operation S1505, when a user input indicating a request for information about a point of interest based on the current point 102 is received in operation S1507, the computing device 100 transmits the request for information about the point of interest to the server 700 in operation S1508.

In operation S1509, the server 700 detects information about a point of interest based on the point from among the information about points of interest collected in operation S1506. In operation S1510, the computing device 100 transmits the detected information about the point of interest based on the point, to the computing device 100.

Figure 16A:
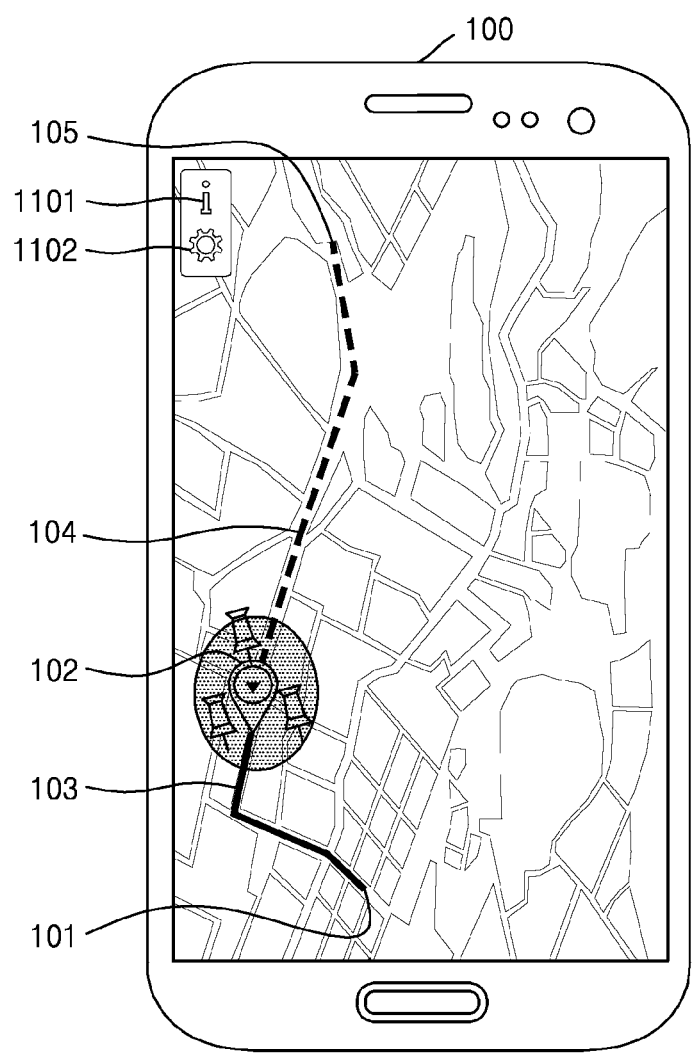
FIG. 16A illustrates an example of a screen for providing information about a point of interest based on a current point on a predicted route of a user, according to another exemplary embodiment.

In operation S1511, the computing device 100 provides the information about the point of interest based on the point. When the point is the current point 102, the computing device 100 may provide a screen illustrated in FIG. 16A in operation S1511. FIG. 16A illustrates an example of a screen providing information about a point of interest based on the current point 102 on the predicted route 104.

Figure 16B:
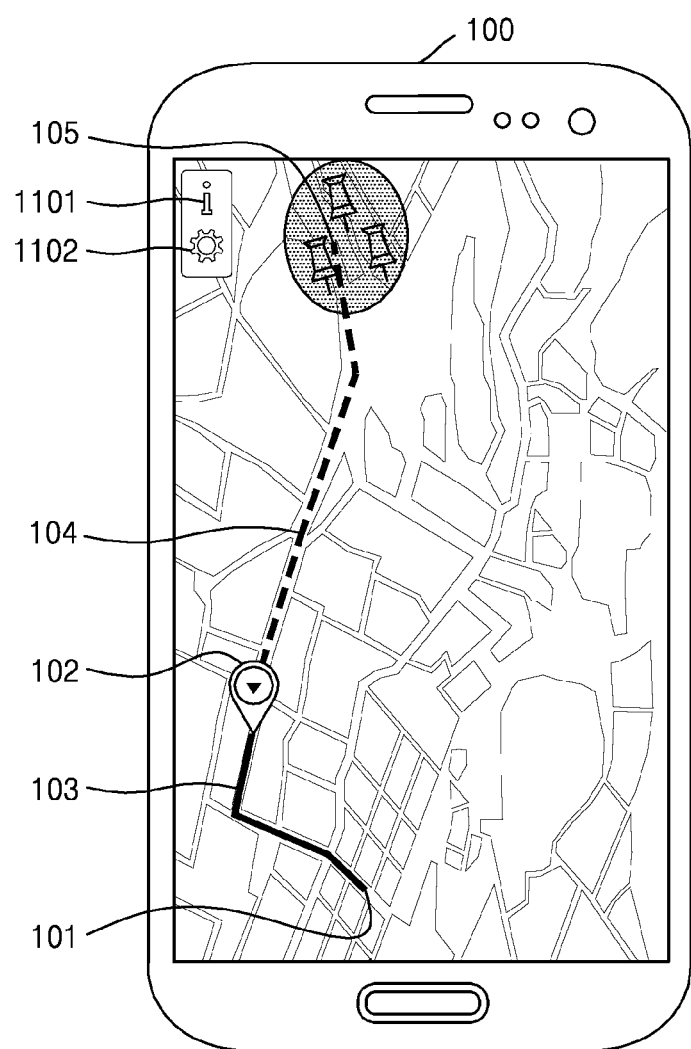
FIG. 16B illustrates an example of a screen for providing information about a point of interest based on a destination point on a predicted route of a user, according to another exemplary embodiment.

When the screen 120 of FIG. 1 is provided by the computing device 100 in operation S1505, and the point requested in operation S1507 is the destination point 105, the computing device 100 may provide a screen illustrated in FIG. 16B in operation S1511. FIG. 16B illustrates an example of a screen providing information about a point of interest based on the destination point 105 on the predicted route 104.

Figure 16C:
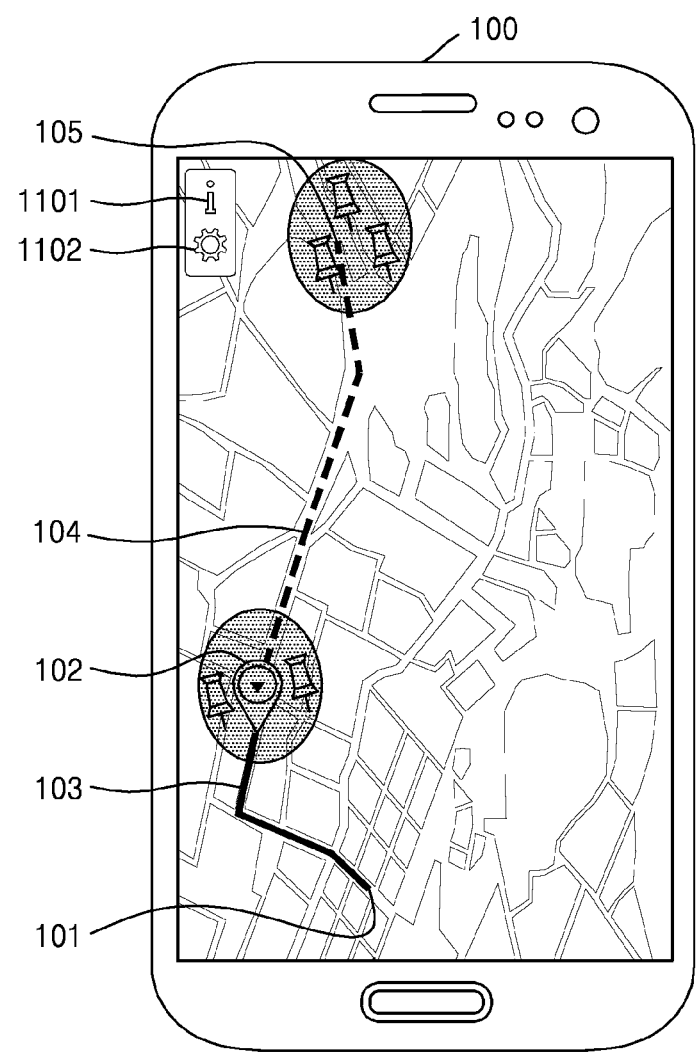
FIG. 16C illustrates an example of a screen for providing information about a point of interest based on a current point and a destination point on a predicted route of a user, according to another exemplary embodiment.

When the screen 120 of FIG. 1 is provided by the computing device 100 in operation S1505, and the point requested in operation S1507 is the current point 102 and the destination point 105, the computing device 100 may provide a screen illustrated in FIG. 16C in operation S1511. FIG. 16C illustrates an example of a screen providing information about a point of interest based on the current point 102 and the destination point 105 on the predicted route 104.

FIG. 17 is an operational flowchart of a method of providing personalized information according to another exemplary embodiment. FIG. 17 illustrates an example of changing information about a point of interest based on a point (or a specially-designated point) on the predicted route 104.

Operations S1701 through S1711 of FIG. 7 are respectively similar to operations S1501 through S1511 of FIG. 15, and thus description thereof will be omitted below.

In operation S1711 of FIG. 17, when one of the screens of FIGS. 16A through 16C is provided by the computing device 100, and a request for changing information about a point of interest is received in operation S1712, the computing device 100 changes the information about the point of interest based on the point in operation S1713.

For example, when information about a point of interest is provided as illustrated in FIG. 16A in operation S1711, and the point of interest toggle item 1101 is toggled in operation S1712, the computing device 100 may change the information about the point of interest (e.g., an exhibition hall) provided based on the current point 102 illustrated in FIG. 16A to information about another point of interest (e.g., a shopping mall) in operation S1713.

When information about a point of interest is provided as illustrated in FIG. 16B in operation S1711, and the point of interest toggle item 1101 is toggled in operation S1712, the computing device 100 may change the information about the point of interest (e.g., Korean restaurant) provided based on the destination point 105 illustrated in FIG. 16B to information about another point of interest (e.g., Chinese restaurant) in operation S1713.

When information about a point of interest is provided as illustrated in FIG. 16C in operation S1711, and the point of interest toggle item 1101 is toggled in operation S1712, the computing device 100 may change the information about the point of interest (e.g., a gas station) provided based on the current point 102 and the destination point 105 illustrated in FIG. 16C to information about another point of interest (e.g., a vehicle maintenance shop) in operation S1713.

Referring to FIG. 17, not all information received in operation S1710 about points of interest based on the point is provided by the computing device 100 in operation S1711. The computing device 100 may provide information about a point of interest according to priority from among the received information about the points of interest based on the point. The priority may be determined based on the number of points of interest based on the point, but is not limited thereto. The priority may be determined based on information about a user.

When a request for changing a point of interest is received in operation S1712, the computing device 100 may change the information from information about the point of interest based on the point to information about another point of interest, according to the priority of the information about points of interest received in operation S1710.

If the computing device 100 has provided all of the information about the points of interest based on the point received in operation S1710, in operation S1711, then operations S1712 and S1713 of FIG. 17 may be modified such that the information about the points of interest based on the point is changed based on communication between the computing device 100 and the server 700.

For example, when the request for changing information about a point of interest is received in operation S1712, the computing device 100 transmits the request for changing information about a point of interest based on the point to the server 700. The server 700 detects information about another point of interest that is different from the information about a point of interest based on the point, from the information about points of interest collected in operation S1706. The server 700 transmits the detected information about another point of interest to the computing device 100. The computing device 100 may change the information about the point of interest based on the point to the received information about another point of interest.

When the request for changing the point of interest is transmitted from the computing device 100 to the server 700, the computing device 100 may transmit information related to another point of interest (type information of point of interest) to the server 700 but is not limited thereto. For example, the server 700 determines a priority regarding a type of point of interest with respect to a user, based on information about a user. The server 700 may detect information about a point of interest based on the point from the information about points of interest collected in operation S1706, according to the determined priority and transmit the same to the computing device 100.

While FIGS. 7, 9, 10, 12, 15, and 17 illustrate operational flowcharts based on communication between the computing device 100 and the server 700, the methods may also be performed only by the computing device 100, without involvement of the server 700 based on a function of the computing device 100.

Information about a point of interest described with reference to FIGS. 10 through 17 may be detected by further considering place profile information. The information about a point of interest described with reference to FIGS. 10 through 17 may include information recommending content based on place profile information and information about a user, as detailed information. For example, when information about a point of interest is selected according to a user input, the information recommending content provided at the selected point of interest may be provided through an additional window (e.g., a popup window), but is not limited thereto. For example, the content recommendation information may be provided as at least one of a map form and a notification form. The content may refer to content described with reference to exemplary embodiments of theme items to be described later.

FIG. 18 is an operational flowchart of a method of providing personalized information according to another exemplary embodiment. Referring to FIG. 18, after the predicted route 104 is provided, information about a point of interest is provided according to a received notification message.

Operations S1801 through S1805 of FIG. 18 are respectively similar to operations S201 through S205 of FIG. 2, and thus description thereof will be omitted below.

In operation S1805 of FIG. 18, when providing information indicating the predicted route 104 as shown on the screen 120 of FIG. 1, and a context for transmitting a notification message occurs in a car 1800 in operation S1806, the car 1800 transmits a notification message to the computing device 100 in operation S1807. The car 1800 is a device connected to the computing device 100.

The context for transmitting a notification message may include, for example, a battery replacing context or refueling context, but is not limited thereto. The above-described contexts may be detected by using a sensor or the like included in the car 1800.

When a notification message is received, the computing device 100 provides information about a point of interest that is adjacent to the predicted route 104, from among points of interest related to the notification message, in operation S1808.

For example, if a notification message notifies battery replacement of the car 1800, the computing device 100 may provide information about a vehicle battery replacement center (or car maintenance shop) located near the predicted route 104 in operation S1808. If a notification message notifies refueling of the car 1800, the computing device 100 may provide information about a refueling center located near the predicted route 104 in operation S1808.

FIG. 19 is an operational flowchart of a method of providing personalized information according to another exemplary embodiment. FIG. 19 illustrates an example of providing information about a route of another user and an activity of another user. The another user refers to a person who allowed the user of the computing device 100 to access information about a route of the another user. The another person may be at least one person from among children of the user, parents of the user, etc. who is to be notified of the route of the user.

In operation S1901, another computing device 1900 transmits a route tracking permission signal to the computing device 100. In operation S1902, the other computing device 1900 tracks a location of a user of the other computing device 1900 and detects a user activity of the user of the other computing device 1900. The other computing device 1900 may be a device such as the computing device 100 described with reference to FIG. 1. Tracking of the user's location may be performed as described with reference to operation S202 of FIG. 2 and as described with reference to FIG. 1. The tracking of the user's location may be performed by using a sensor, a GPS receiver, a network location information receiver included in the other computing device 1900, or an IoT sensor that is not included in the another computing device 1900, but is not limited thereto.

In operation S1903, the other computing device 1900 transmits the detected user location information and the detected information about the user activity to the computing device 100.

In operation S1904, the computing device 100 obtains information about an initial route of the user of the other computing device 1900 based on the received user location information and the received user activity information. The information about the initial route may be obtained in the same manner as in operations S202 and S203 of FIG. 2.

In operation S1905, the computing device 100 detects information about a predicted route of the user of the other computing device 1900 from user location history information of the user of the other computing device 1900 based on the obtained information about the initial route. The user location history information of the user of the another computing device 1900 may be stored in the computing device 100 or in an external device such as a home sync, synchronized with the computing device 100, or in the another computing device 1900.

The computing device 100 may set a connection to another device in operation S1905 according to a location of where the user location history information of the user of the other computing device 1900 is stored. For example, if the user location history information of the user of the other computing device 1900 is stored in a home sync, the computing device 100 may set a connection to the home sync while being connected to the another computing device 1900. When connected to the home sync, the computing device 100 may read user location history information from the home sync or request information indicating the predicted route of the user from the home sync.

In operation S1906, the computing device 100 provides information indicating the predicted route of the user of the other computing device 1900 and information about the user activity of the user of the other computing device 1900 together. The information about the user activity may be information about user modes described above, and may be displayed on the predicted route. Thus, the user of the computing device 100 may be aware of a location of the user of the other computing device 1900 and user activity information of the user of the other computing device 1900 at each location.

Figure 20:
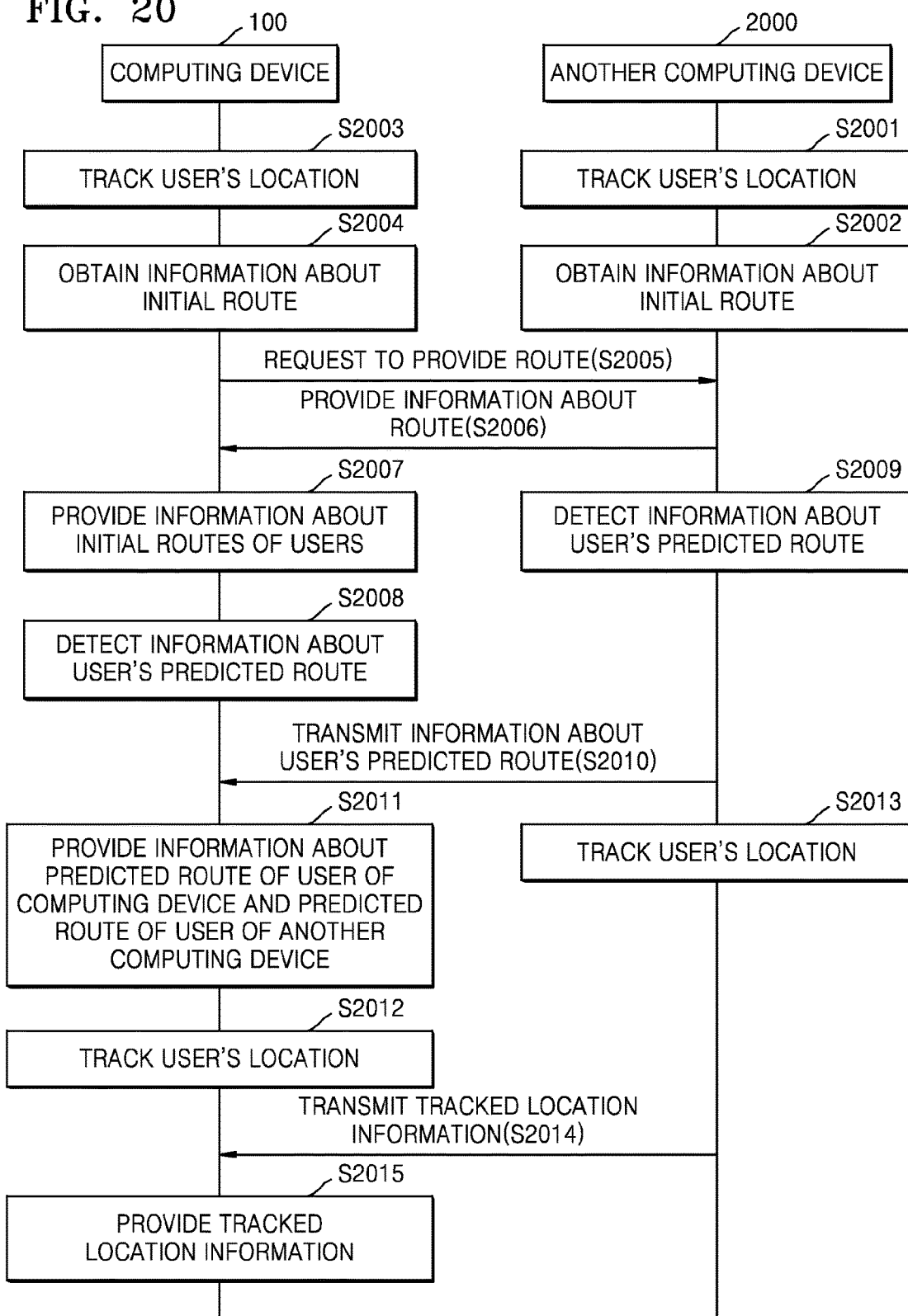
FIG. 20 is an operational flowchart of a method of providing personalized information according to another exemplary embodiment.

FIG. 20 is an operational flowchart of a method of providing personalized information according to another exemplary embodiment. FIG. 20 is an example of providing routes of the user of the computing device 100 and the user of another computing device 2000 together.

The user of the other computing device 2000 refers to a person who allowed the user of the computing device 100 to access information about a route of the user of the other computing device 2000. The other computing device 2000 may be the same device as the other computing device 1900 illustrated in FIG. 19, but is not limited thereto.

In operation S2001 and S2002, the other computing device 2000 obtains information about an initial route of the user of the other device 2000 in the same manner as operation S202 and S203. Operation S2001 may include a function of determining whether the user's location is moved, performed in operation S201 of FIG. 2.

In operations S2003 and S2004, the computing device 100 obtains information about an initial route of the user of the computing device 100 in the same manner as operation S202 and S203 of FIG. 2. Operations S2003 may include a function of determining whether the user's location is moved, performed in operation S201 of FIG. 2.

In operation S2005, the computing device 100 transmits to the other computing device 2000 a signal requesting to provide a route regarding the user of the other computing device 2000. When the user of the other computing device 2000 agrees to the request for proving a route, the other computing device 2000 transmits the information about the user's route obtained up to a current time, to the computing device 100 in operation S2006. In operation S2006, the other computing device 2000 may transmit a message notifying that access to information about routes is allowed.

In operation S2007, the computing device 100 provides information about the initial route of the user of the other device 2000 and information about the initial route of the user of the computing device 100. FIG. 21 illustrates examples of a screen that may be provided according to the flowchart of FIG. 20. In operation S2007, the computing device 100 may provide a screen 2110 of FIG. 21.

Referring to the screen 2110 of FIG. 21, a starting point 2111, a current point 2112, and an initial route 2113 of the user of the another computing device 2000, and the starting point 101, the current point 102, and the initial route 103 of the user of the computing device 100 are provided together.

In operation S2008, the computing device 100 detects information indicating the predicted route of the user of the computing device 100. Operation S2008 may be performed in a similar manner to operation S204 of FIG. 2.

In operation S2009, the other computing device 2000 detects information indicating the predicted route of the user of the other computing device 2000. Operation S2009 may be performed in a similar manner as operation S204.

In operation S2010, the other computing device 2000 transmits information indicating the predicted route detected in operation S2009 to the computing device 100. Accordingly, in operation 2011, the computing device 100 may provide a screen 2120 of FIG. 21.

Referring to the screen 2120 of FIG. 21, the computing device 100 provides information about a starting point 101, a current point 102, an initial route 103, a predicted route 104, and a destination point 105 of the user of the computing device 100, a current point 2112, an initial route 2113, a predicted route 2121 of the user of the another computing device 20, and the destination point 105 which is the same as that of the user of the computing device 100.

In operation S2012, the computing device 100 tracks a location of the user of the computing device 100. In operation S2013, the other computing device 2000 tracks a location of the user of the another computing device 2000, and transmits user location tracking information to the computing device 100 in operation S2014.

In operation S2015, the computing device 100 provides the location information of the user of the computing device 100 tracked by the computing device 100 and the information about the location of the user of the other computing device 2000 tracked by the other computing device 2000. Information about the predicted routes 104 and 2121 and information about the current points 102 and 2112 provided through the screen 2120 of FIG. 21 may be changed according to the above user location information.

According to the operational flowchart illustrated in FIG. 20, the user of the computing device 100 may check a moving state of the user of the other computing device 2000 which is heading towards the destination point 105 which is the same as that of the user of the computing device 100.

While the information about a route of the user of the computing device 100 and the information about a route of the user of the other computing device 2000 may be provided in different colors, a method of distinguishing the routes of the two users is not limited thereto. For example, an image or a text indicating users may be displayed at the current points 101 and 2112. An image indicating a user may be a face image or an Avatar representing the user, but is not limited thereto. A text indicating a user may include, for example, identification information of the user (e.g., name of the user), but is not limited thereto.

In FIG. 20, the other computing device 2000 may transmit information about a user's route to the computing device 100 every time a location of the user of the other computing device 2000 is determined. Thus, the computing device 100 may provide information about moving states of the user of the computing device 100 and the user of the other computing device 2000 in real time.

The operational flowchart illustrated in FIG. 20 may be changed such that routes of the user of the computing device 100 and the user of the other computing device 2000 are provided in real time.

Referring to FIG. 20, before tracking the location of the user of the computing device 100, the computing device 100 may transmit a signal requesting to provide a route, to the another computing device 2000. When a signal agreeing to provide a route is received from the other computing device 2000, the computing device 100 may provide information location information of the user of the other computing device 2000 provided from the another computing device 2000 and the location information of the user of the computing device 100 together in real time.

Although the operational flowchart illustrated in FIG. 20 is an example of providing a route of the user of the computing device 100 and a route of the user of the other computing device 2000 together, the operational flowchart may be changed such that a route of the user of the computing device 100 and routes of a plurality of other users are provided together.

The method illustrated in FIG. 20 may be changed such that information about a plurality of devices that allowed the user of the computing device 100 to access route information thereof, and a route of at least one selected device among the plurality of devices is provided. When the screen 110 of FIG. 1 is provided to select at least one of the plurality of devices, the computing device 100 may provide information about a plurality of selectable of devices. The plurality of devices may include devices of persons who are previously registered to the computing device 100. Persons who are previously registered to the computing device 100 may include persons registered to a phone book or registered as friends of the user of the computing device 100 according to an exemplary embodiment, but are not limited thereto.

Recommendation theme items described with reference to FIGS. 22 through 34 below may be included in information about points of interest described with reference to FIGS. 4, 10, 12, 15, 17, and 18. Thus, FIGS. 23, 27, 29, and 31 through 34 may be included in the operation of detecting information about a point of interest performed in FIGS. 4, 10, 12, 15, 17, and 18, but is not limited thereto.

Figure 22:
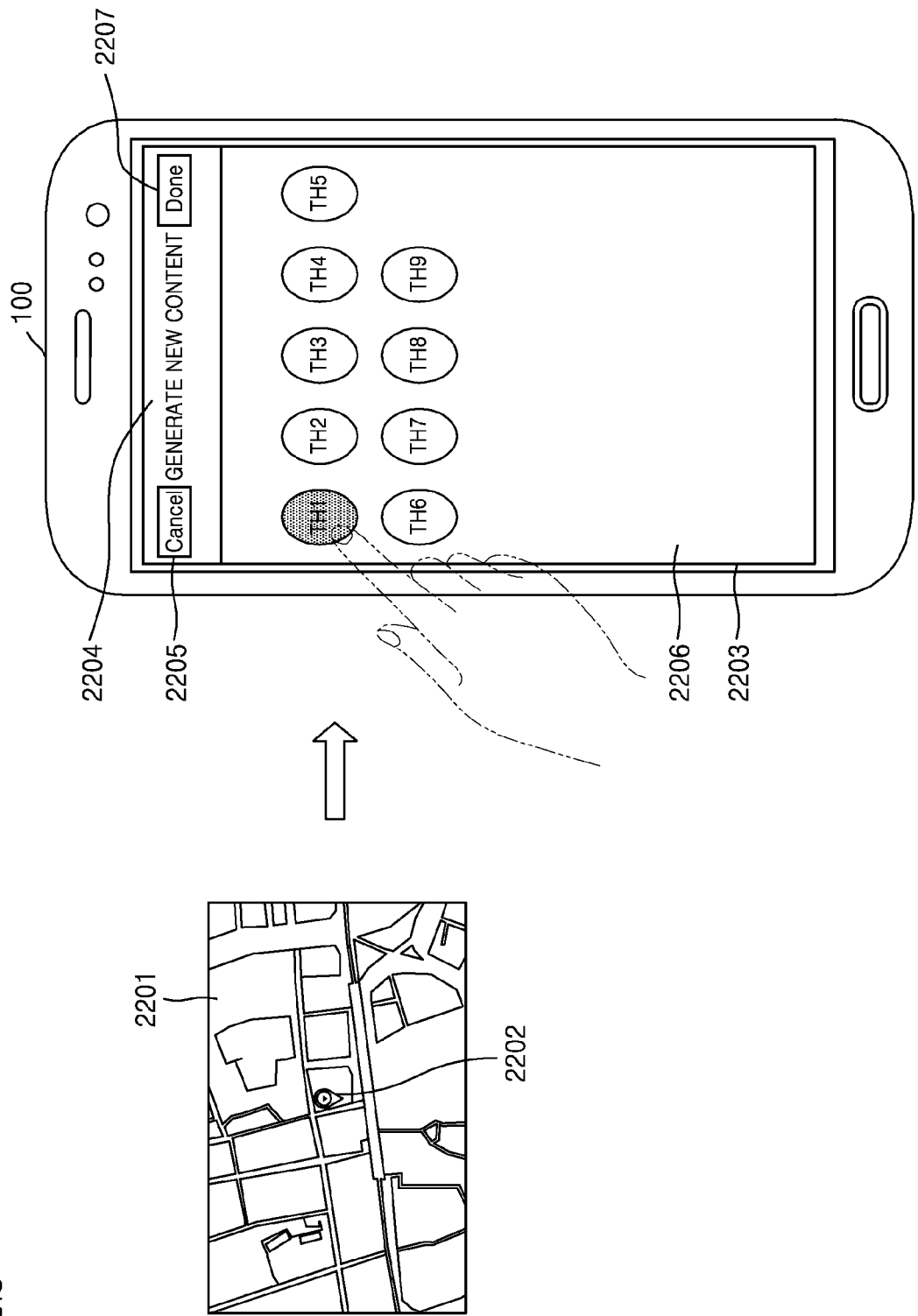
FIG. 22 is a view illustrating a method of providing personalized information according to an exemplary embodiment.

FIG. 22 is an example of providing a recommendation theme item based on a geographical location as personalized information.

Referring to FIG. 22, if content related to a point 2202 marked on a map 2201 is capable of being generated, the computing device 100 may provide recommendation theme items TH1 through TH9.

A context where content related to a point 2202 marked on a map 2201 may be generated may include a context where the user of the computing device 100 is close to or at the point 2202, but exemplary embodiments are not limited thereto. For example, the above context may include a context where a user input pointing to the point 2202 on the map 2201 is received. A close position may be within 50 m from the point 2202, but is not limited thereto.

The recommendation theme items TH1 through TH9 may include theme items that are filtered from a plurality of theme items according to a context. For example, if the point 2202 is shop A at Gangnam Station, the recommendation theme items TH1 through TH9 may include theme items (e.g., coffee, dating, study, and/or meeting) that are filtered from a plurality of theme items (coffee, bicycle, meeting, dating, movie, drive, exercise, shopping, . . . , (omitted), . . . , study, beauty care, gathering, and/or hiking, etc.).

Referring to FIG. 22, a screen 2203, on which the recommendation theme items TH1 through TH9 are provided, may include a screen title 2204 (e.g., "GENERATE NEW CONTENT"), a cancel item 2205 for canceling generation of new content, a region 2206 displaying the recommendation theme items TH1 through TH9, and a recommendation theme item selection complete item "Done" 2207, but is not limited thereto.

When a user input selecting the cancel item 2205 for generating new content is selected, the computing device 100 may change the screen 2203 into a previous screen or a home screen or an application screen.

Figure 26:
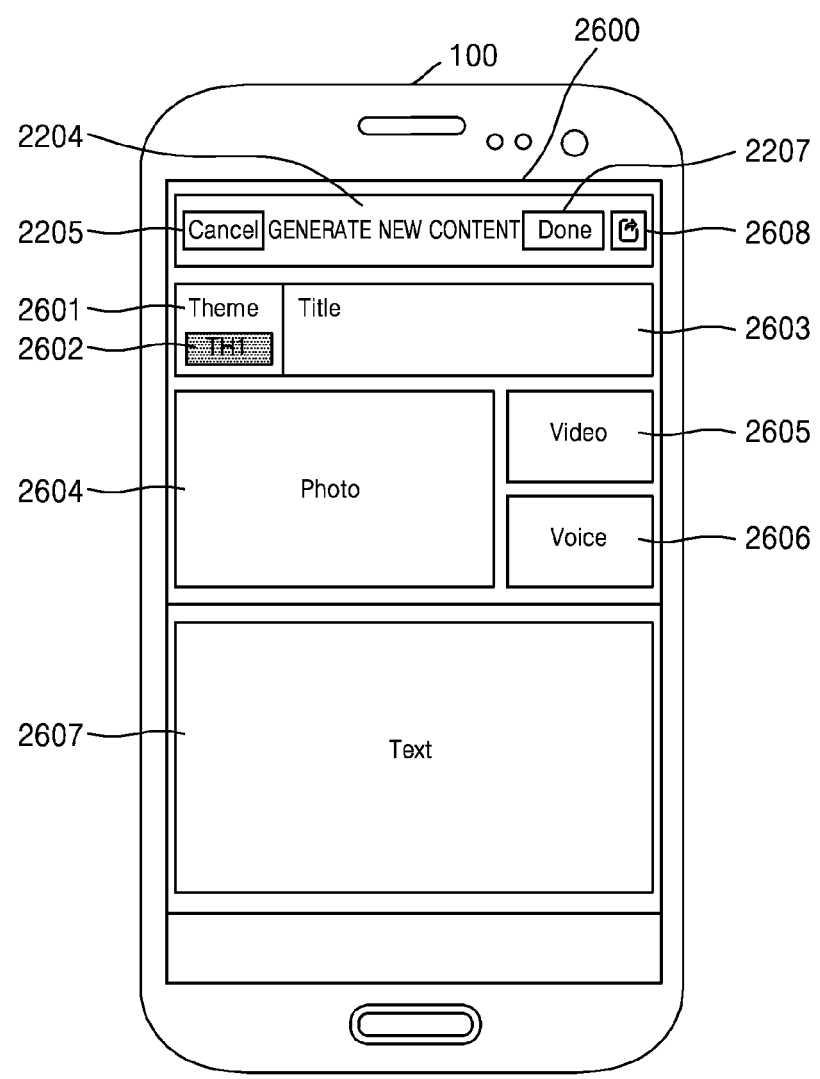
FIG. 26 illustrates an example of a screen including an input window whereby new content is generated according to an exemplary embodiment.

After a user input selecting one of the recommendation theme items TH1 through TH9 is received, and a user input selecting the recommendation theme item selection complete item (e.g., Done button) 2207 is received, the computing device 100 may provide a screen where new content may be generated. The screen for generating new content may be provided as illustrated in FIG. 26 which will be described later.

The user input selecting the cancel item 2205 for canceling generation of new content, the user input selecting the recommendation theme item TH1, and the user input selecting the recommendation theme item selection complete item 2207 may be performed by at least one of a touch-based input, a user gesture based input, and a user voice signal based input, but is not limited thereto.

Figure 23:
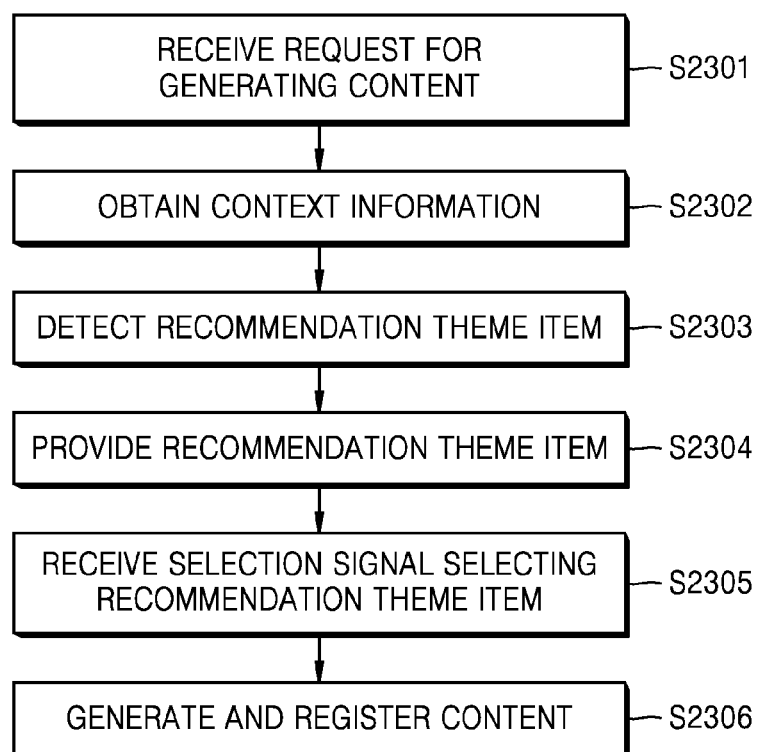
FIG. 23 is an operational flowchart of a method of providing personalized information according to an exemplary embodiment.

FIG. 23 is an operational flowchart of a method of providing personalized information according to another exemplary embodiment. FIG. 23 illustrates an example where a recommendation theme item is provided as personalized information, according to a user's request so that content of a selected theme item is generated and registered to the computing device 100.

Referring to FIG. 23, when a request for generating content is received by the user of the computing device 100 in operation S2301, the computing device 100 obtains context information in operation S2302.

A request for generating content may be made by at least one of a touch-based input, a user gesture-based input, and a user voice signal-based input, but is not limited thereto.

For example, a request for generating content may be received via an existence sensing screen, such as a touch screen. In other words, the computing device 100 may receive a request for generating content by touching or pointing to at least one location on a touch screen by a finger of the user or by using a stylus pen. The location on the touch screen that is touched or pointed may be a location where an item for requesting generation of content is marked or information whereby it is recognized that the touching or pointing indicates a request for generating content.

Figure 24:
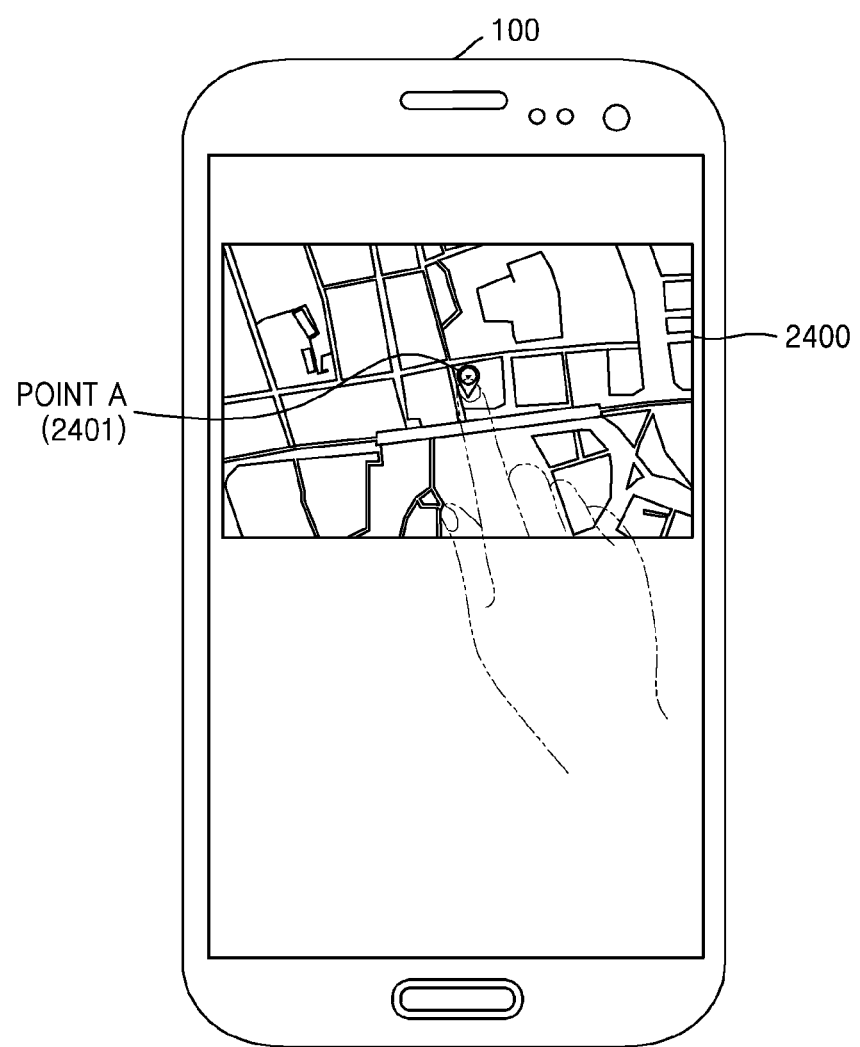
FIG. 24 illustrates an example of a screen illustrating a request for generating content according to an exemplary embodiment.

FIG. 24 illustrates an example of a screen illustrating a request for generating content according to an exemplary embodiment. As illustrated in FIG. 24, when a point A 2401 on a map 2400 provided by using the computing device 100 is touched by the user as illustrated in FIG. 24, the computing device 100 may determine that a request for generating content is received at point A 2401. A touch by a user may include a long touch, but is not limited thereto. A touch by a user may be preset so as to indicate a request for generating content.

In operation S2302, the computing device 100 obtains at least one of user-based context information of the user of the computing device 100 and geographical location-based context information. The user-based context information and geographical location-based context information are as described earlier in the present disclosure.

The user-based context information may be obtained by using sensors included in the computing device 100, a GPS receiver, a network location receiver, user history information of the computing device 100, and/or information about a user. Information used to obtain user-based context information is not limited to the above. Geographical location-based context information may be received and obtained from an external device of the computing device 100. The external device, for example, may include a place profile information providing server, or a computing device located at a corresponding place.

Operation S2302 may be divided into an operation of obtaining the user-based context information and an operation of obtaining the geographical location-based context information. The obtaining of the user-based context information and the obtaining the geographical location-based context information may be performed simultaneously or sequentially. When the operations are sequentially performed, the order may be set in advance. The preset order may be changed by a user.

When the context information is obtained, the computing device 100 detects a recommendation theme item based on the obtained context information in operation S2303.

For example, the context information obtained in operation S2302 includes information indicating that the user of the computing device 100 is at shop A at Gangnam Station, and theme items of contents that are mostly generated by the user of the computing device 100 at shop A at Gangnam Station are dating and gathering, and a theme item that is mostly generated at shop A at Gangnam Station is dating, the computing device 100 may detect dating as a recommendation theme item in operation S2303. The mostly generated content may indicate content with a high frequency generation. The mostly generated theme item may indicate a theme item with a high frequency generation.

In the above example, information indicating that the user is at shop A at Gangnam Station and information about a theme item that is mostly generated by the user at shop A at Gangnam Station may be included in the user-based context information of the computing device 100. Information about a theme item that is mostly generated by the user at shop A at Gangnam Station may be included in the geographical location-based context information.

For example, the context information obtained in operation S2302 includes information indicating that the user of the computing device 100 is near shop A at Gangnam Station, and theme items of contents that are mostly generated by the user of the computing device 100 at shop A at Gangnam Station are dating and gathering, the computing device 100 may detect dating and gathering as a recommendation theme item in operation S2303.

For example, the context information obtained in operation S2302 includes information indicating that theme items of contents that are mostly generated at shop A at Gangnam Station are coffee, dating, and gathering, and theme items of contents preferred by the user of the computing device 100 are coffee, meal, shopping, and game, the computing device 100 may detect coffee as a recommendation theme item in operation S2303.

In the above example, information about the theme items of the contents preferred by the user of the computing device 100 may be included in the user-based context information of the computing device 100.

A theme item of content that is mostly generated may be set to be detected based on a frequency of generating of content (or the number of generation). For example, if five pieces of content are generated in regard to a theme of coffee, and ten pieces of content are generated in regard to a theme of dating, and 13 pieces of content are generated in regard to a theme of gathering, and two pieces of content are generated in regard to a theme of game, and a reference value is 3, the computing device 100 may detect coffee, dating, and gathering as theme items of content that are mostly generated.

The theme items of content that are mostly generated may be set to be detected n pieces of top theme items based on a frequency of generating contents. For example, if five pieces of content are generated in regard to a theme of coffee, and ten pieces of content are generated in regard to a theme of dating, and 13 pieces of content are generated in regard to a theme of gathering, and two pieces of content are generated in regard to a theme of game, and n is 2, the computing device 100 may detect gathering and dating as theme items of content that are mostly generated.

Figure 25:
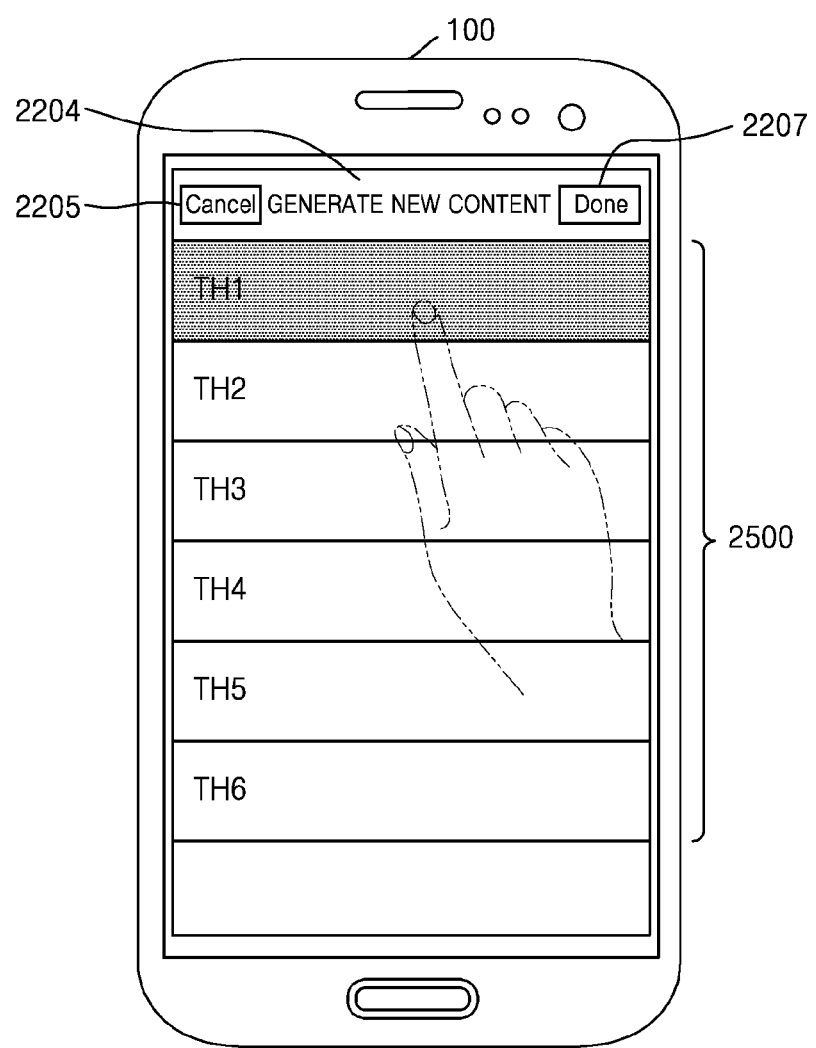
FIG. 25 illustrates an example of a display of a recommendation theme item according to an exemplary embodiment.

In operation S2304, the computing device 100 provides the detected recommendation theme item. A recommendation theme item may be provided as shown on a screen 2203 illustrated in FIG. 22, but exemplary embodiments are not limited thereto. FIG. 25 illustrates an example of a display of a recommendation theme item according to an exemplary embodiment. FIG. 25 illustrates that recommendation theme items are provided as a list 2500.

In operation S2305, the computing device 100 receives a selection signal selecting a theme item. A selection signal indicates a user input indicating a selection. The screen 2203 illustrated in FIG. 22 and FIG. 25 show an example where a selection signal selecting a theme item TH1 is received.

In operation S2306, the computing device 100 generates and registers content. In operation S2305, when a selection signal selecting a theme item is received, the computing device 100 may provide an input window 2600 for generating new content as illustrated in FIG. 26. FIG. 26 illustrates an example of a screen including the input window 2600 for generating new content according to an exemplary embodiment.

Referring to FIG. 26, the input window 2600 may include a display window 2601 displaying a selected theme item 2602, a title input window 2603 of the selected theme item 2602, a picture input window 2604 related to the selected theme item 2602, a video input window 2605 related to the selected theme item 2602, an audio input window 2606 related to the selected theme item 2602, a text input window 2607 related to the selected theme item 2602, and an item 2608 for requesting sharing of new content including input information, but is not limited to the setup of FIG. 26.

When one of the input windows 2603 through 2607 included in the input window 2600 is selected, the computing device 100 may provide a window (e.g., a virtual keyboard) for inputting information according to type of inputtable information, but is not limited thereto. For example, when one of the input windows 2603 through 2607 is selected, the computing device 100 may provide a window for requesting execution of a related application. When one of the input windows 2603 through 2607 is selected, the computing device 100 may execute a related application.

For example, when the picture input window 2604 is selected, the computing device 100 may provide a window for requesting execution of an album application or a camera application. When the picture (e.g., photo) input window 2604 is selected, the computing device 100 may execute a camera application to immediately execute a photographing mode. An operation of the computing device 100 according to selection of the picture input window 2604 may be set or changed by using an environment setup menu.

When the video input window 2605 is selected, the computing device 100 may provide a window for requesting execution of a video application or a camera application. When the video input window 2605 is selected, the computing device 100 may execute a video application to provide a screen for selecting a video that is managed. When the video input window 2605 is selected, the computing device 100 may execute a camera application to immediately execute a video photographing mode. An operation of the computing device 100 according to selection of the video input window 2605 may be set or changed by using an environment setup menu.

When the voice input window 2606 is selected, the computing device 100 may provide a window for requesting execution of a voice recording application. When the voice input window 2606 is selected, the computing device 100 may execute a voice recording application to immediately perform recording. An operation of the computing device 100 according to selection of the voice input window 2606 may be set or changed by using an environment setup menu.

When the text input window 2607 is selected, the computing device 100 may provide a window for requesting execution of a virtual keyboard or a pen input. When the text input window 2607 is selected, the computing device 100 may execute a virtual keyboard. When the text input window 2607 is selected, the computing device 100 may execute a pen input. An operation of the computing device 100 according to selection of the text input window 2607 may be set or changed by using an environment setup menu.

In operation S2306, the computing device 100 may register new content generated by mapping geographical location information and information about generated content.

Figure 27:
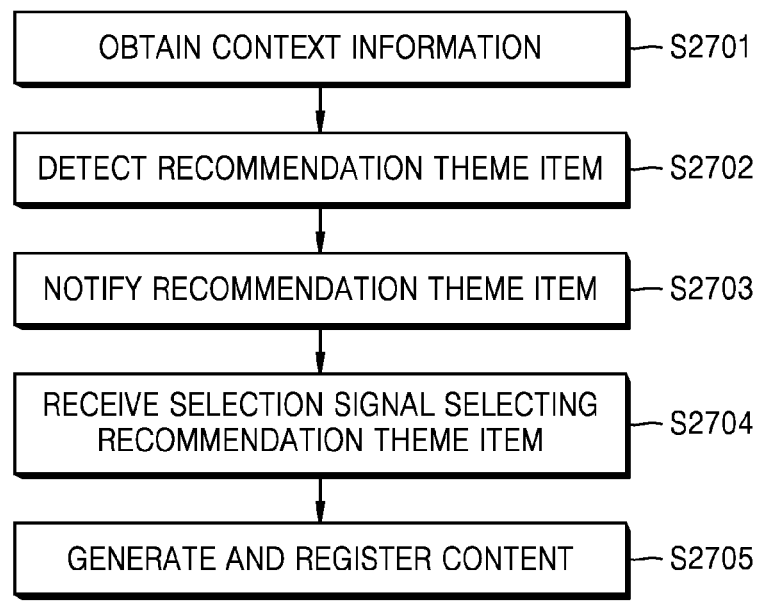
FIG. 27 is an operational flowchart of a method of providing personalized information according to another exemplary embodiment.

FIG. 27 is an operational flowchart of a method of providing personalized information according to another exemplary embodiment. FIG. 27 illustrates an example where, regardless of whether a request for generating content is received, a recommendation theme item may be provided according to geographical location as a notification as personalized information, and new content generated according to the provided recommendation theme item may be registered.

Operations S2701, S2702, S2704, and S2705 illustrated in FIG. 27 are respectively performed in a similar manner to operations S2302, S2303, S2305, and S2306 of FIG. 23 described above. Operation S2701 is performed even when a request for generating content is not received.

When a recommendation theme item is detected in operation S2702, the computing device 100 displays the recommendation theme item as a notification in operation S2703.

Figure 28A:
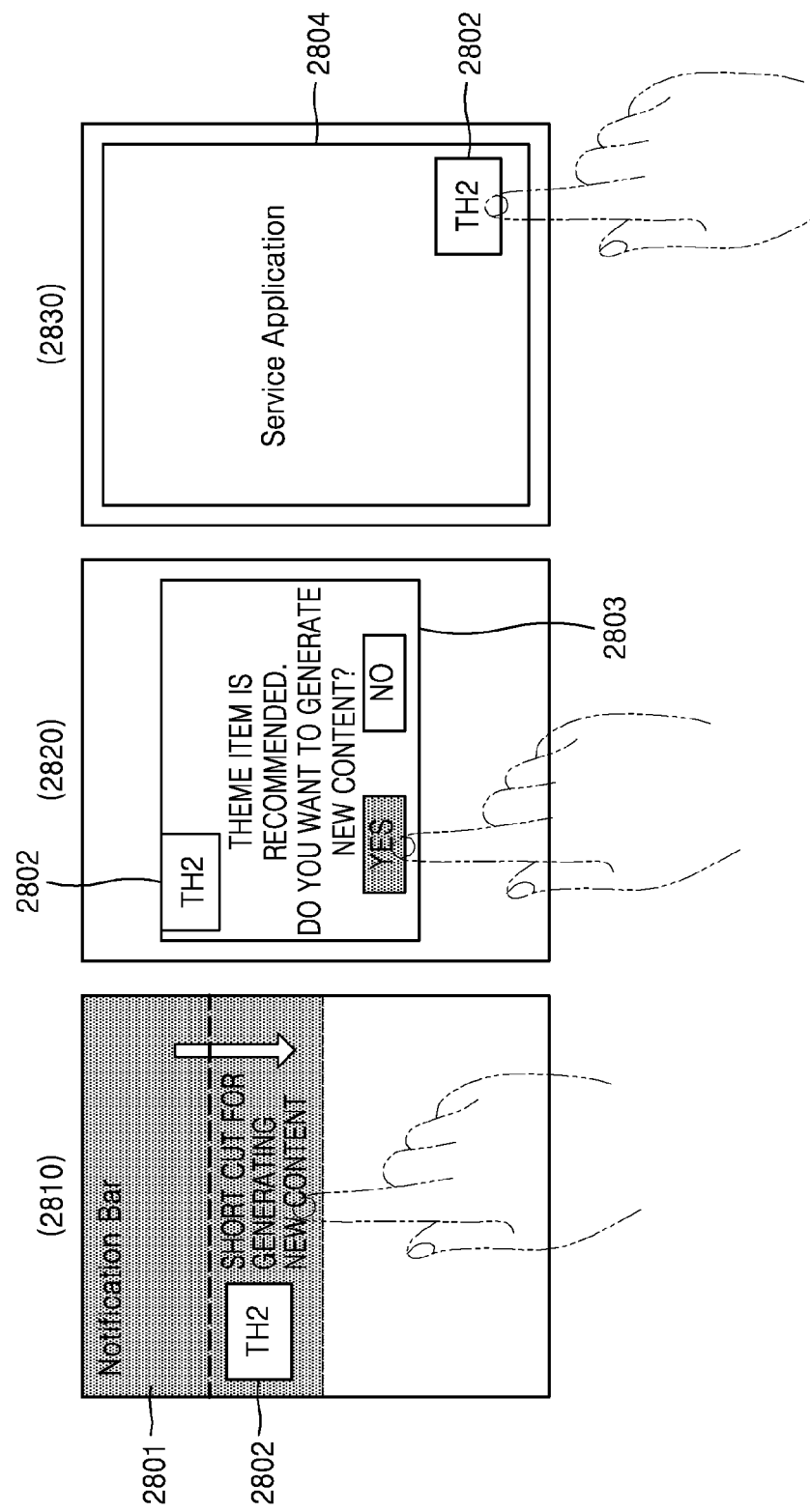
FIGS. 28A and 28B illustrate examples of a display of a recommendation theme item as a notification.
Figure 28B:
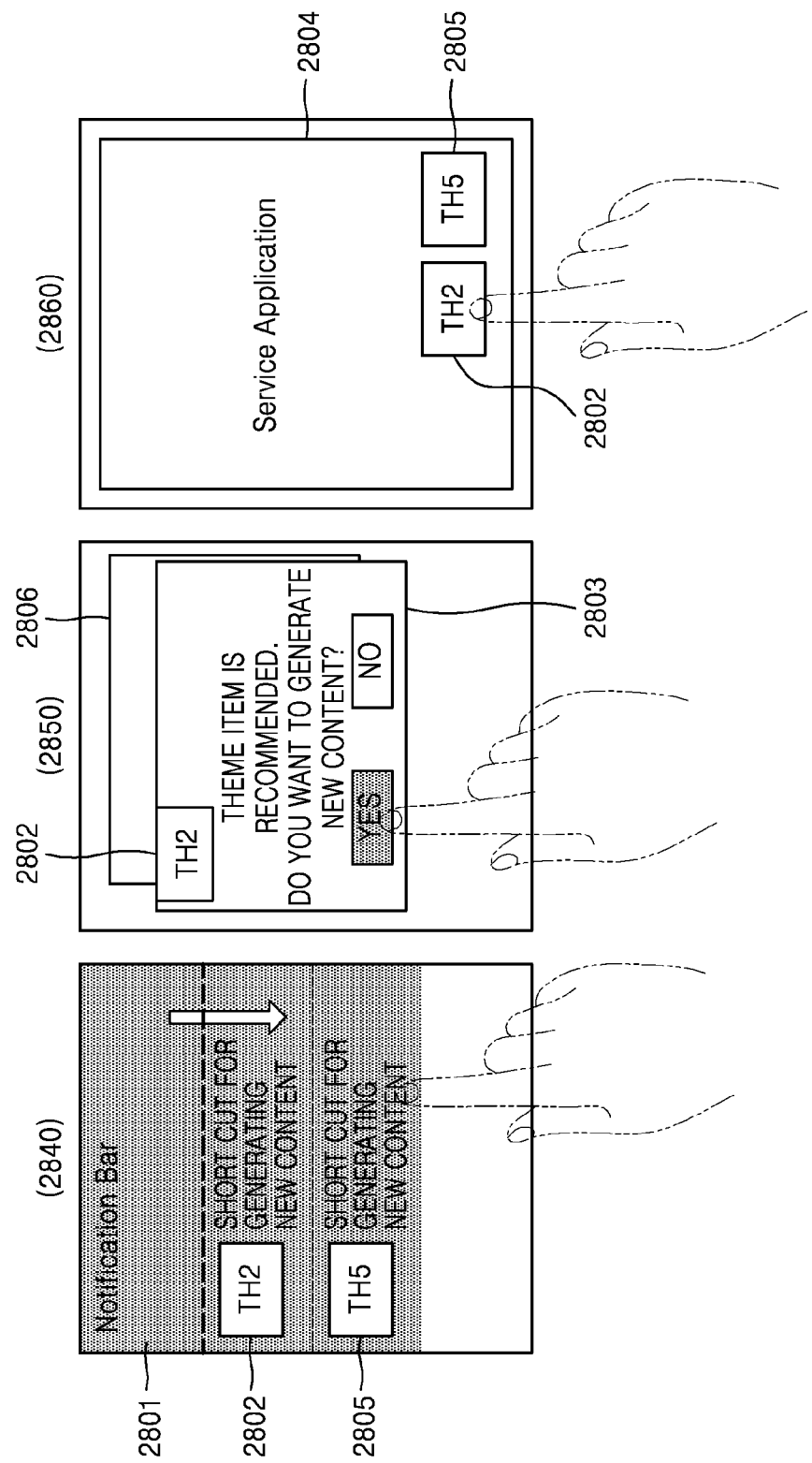

FIGS. 28A and 28B illustrate screens 2810 through 2860 displaying a recommendation theme item as a notification.

The screen 2810 of FIG. 28A shows an example of notifying a recommendation theme item 2802 by using a notification bar 2801 of the computing device 100. When the recommendation theme item 2802 is detected, the computing device 100 automatically expands the notification bar 2801 located at a top end of a screen to notify detection of the recommendation theme item 2802.

Referring to the screen 2810 of FIG. 28A, information such as "SHORT CUT FOR GENERATING NEW CONTENT" adjacent to the recommendation theme item 2802 may be displayed. When "SHORT CUT FOR GENERATING NEW CONTENT" is touched, the computing device 100 may provide the input window 2600 for generating new content as illustrated in FIG. 26. When the "SHORT CUT FOR GENERATING NEW CONTENT" is being touched, it may indicate that the recommendation theme item 2802 is selected. "SHORT CUT FOR GENERATING NEW CONTENT" may be expressed as "SHORT CUT FOR POSTING", but is not limited thereto.

The screen 2820 of FIG. 28A is an example of notifying a recommendation theme item by using a popup window 2803. The popup window 2803 may includes the recommendation theme item 2802, a message for checking whether new content is generated, and an item (Yes, No) via which a response may be made to the checking message. When a response item "Yes" is selected, the computing device 100 may close the popup window 2803 and provide the input window 2600 for generating new content, as illustrated in FIG. 26. That the response item "Yes" is selected indicates that the recommendation theme item 2802 is selected. When the response item "No" is selected, the computing device 100 closes the popup window 2803.

The screens 2810 and 2820 of FIG. 28A may be provided regardless of an application that is currently being executed by the computing device 100.

A screen 2830 of FIG. 28A is an example of notifying a recommendation theme item 2802 based on a portion of an execution screen of a service application 2804. The service application includes a function of generating new content based on a geographical location. The service application may include, for example, a navigation application, a video call application, a social network service application, a life log application, and a schedule application, but is not limited thereto.

When the recommendation theme item 2802 is touched on the screen 2830, the computing device 100 provides the input window 2600 for generating new content as illustrated in FIG. 26. That the recommendation theme item 2802 is touched indicates that the recommendation theme item 2802 is selected.

Screens 2840 through 2860 of FIG. 28B illustrate an example of notifying a plurality of recommendation theme items 2802 and 2805.

When referring to the screen 2840 of FIG. 28B, the computing device 100 expands a notification bar region 2801 according to the number of recommendation theme items 2802 and 2805. When referring to the screen 2850 of FIG. 28B, the computing device 100 provides popup windows 2803 and 2806 corresponding to the number of the recommendation theme items 2802 and 2805. When referring to the screen 2860 of FIG. 28B, the computing device 100 provides icons corresponding to the number of the recommendation theme items 2802 and 2805.

A method of notifying the plurality of recommendation theme items 2802 and 2805 is not limited to the screens 2840 through 2860 of FIG. 28B.

Figure 29:
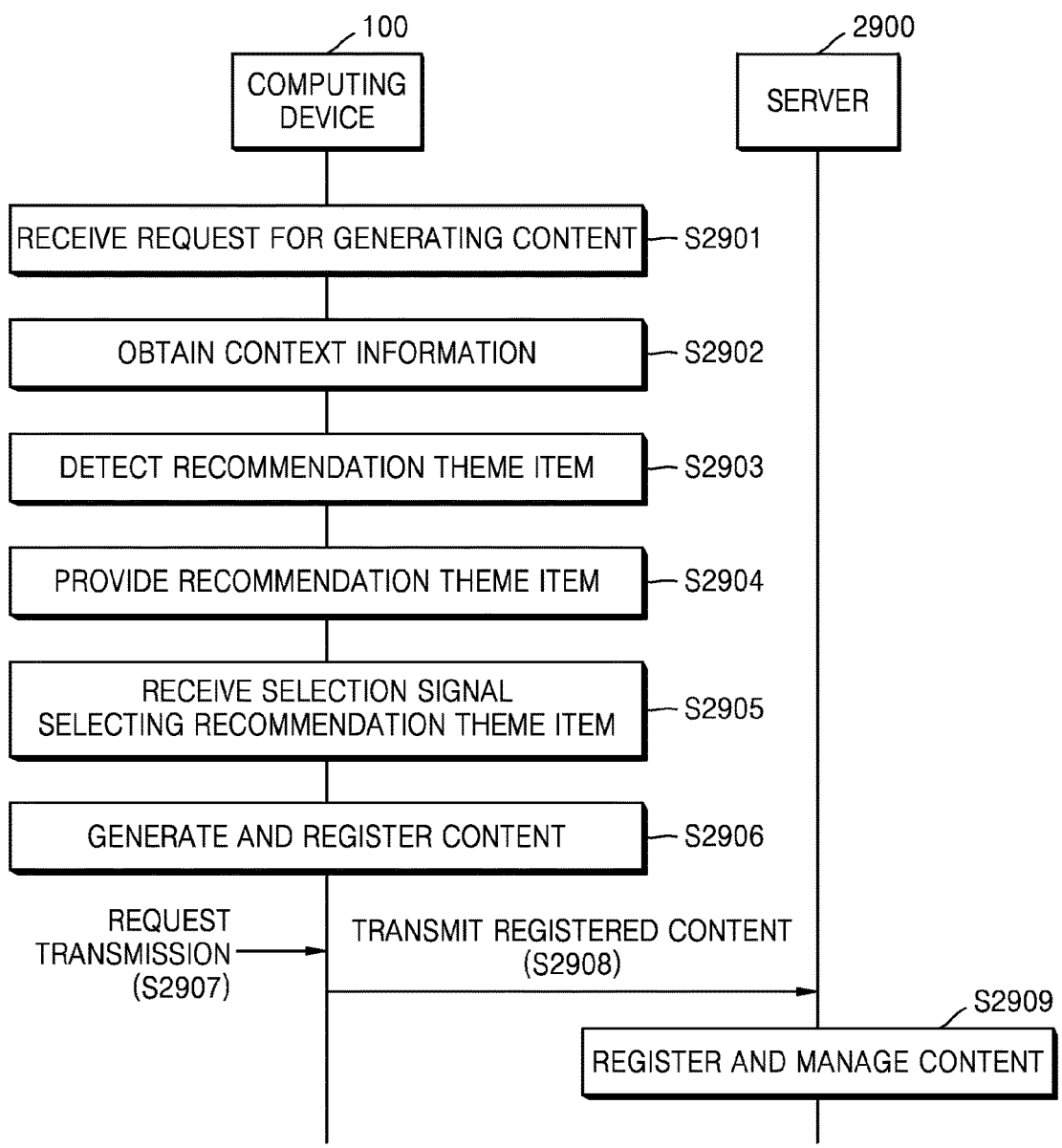
FIG. 29 is an operational flowchart of a method of providing personalized information according to another exemplary embodiment.

FIG. 29 is an operational flowchart of a method of providing personalized information according to another exemplary embodiment. In an exemplary method FIG. 29, an operation of registering content is added to a method of FIG. 23.

Operations S2901 through S2906 of FIG. 29 are respectively performed in a similar manner as operations S2301 through S2306 of FIG. 23. When a request for transmitting content registered to the computing device 100 is received in operation S2907, the computing device 100 transmits the registered content to a server 2900.

Figure 30:
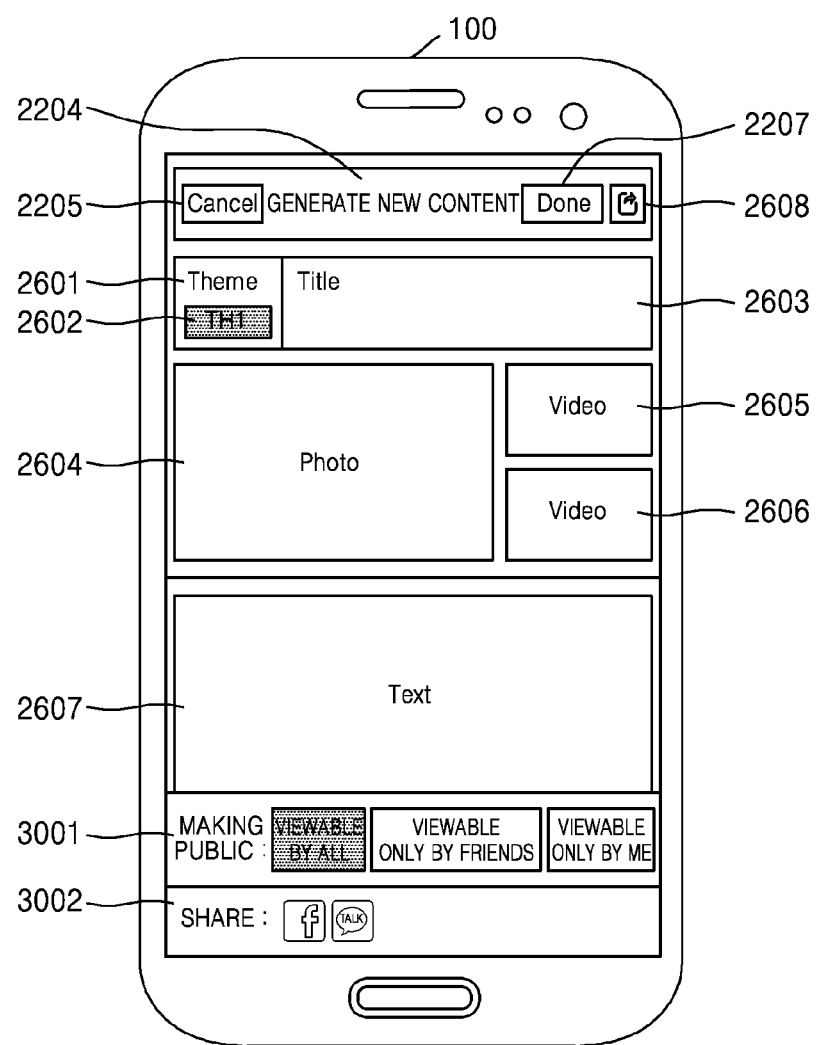
FIG. 30 illustrates an example of a screen whereby sharing of generated content may be set, according to another exemplary embodiment.

The computing device 100 may further display an input window 3001 for making public the generated content and an input window 3002 for sharing the generated content illustrated in FIG. 30, as the sharing 2608 of FIG. 26 is touched after content is generated.

FIG. 30 illustrates an example of a screen on which sharing of generated content may be set, according to an exemplary embodiment. According to a user input based on items such as public, viewable only by friends, and viewable only by me provided via the input window 3001 for making public the generated content, the computing device 100 may set a range of publication of the generated content. According to information input regarding social media by using the input window 3002 for sharing the generated content, the computing device 100 may determine social media through which the generated content is to be shared.

The server 2900 may be determined based on information input through the input window 3002 for sharing the generated content. For example, when Chat On is input through the input window 3002, the server 2900 may be a Chat On server. When KakaoTalk is input through the input window 3002, the server 2900 may be the KakaoTalk server. When Routrip is input through the input window 3002, the server 2900 may be a Routrip server.

The input window 3001 for making public the generated content may be expressed as an input window for posting. Also, while content being transmitted may be a currently generated new content, a plurality of pieces of content may also be transmitted to the server 2900 in units of days, weeks, or months or in units of a geographical location. A unit of transmitted contents is not limited thereto.

In operation S2909, the server 2900 registers and manages the content received in operation S2909.

Figure 31:
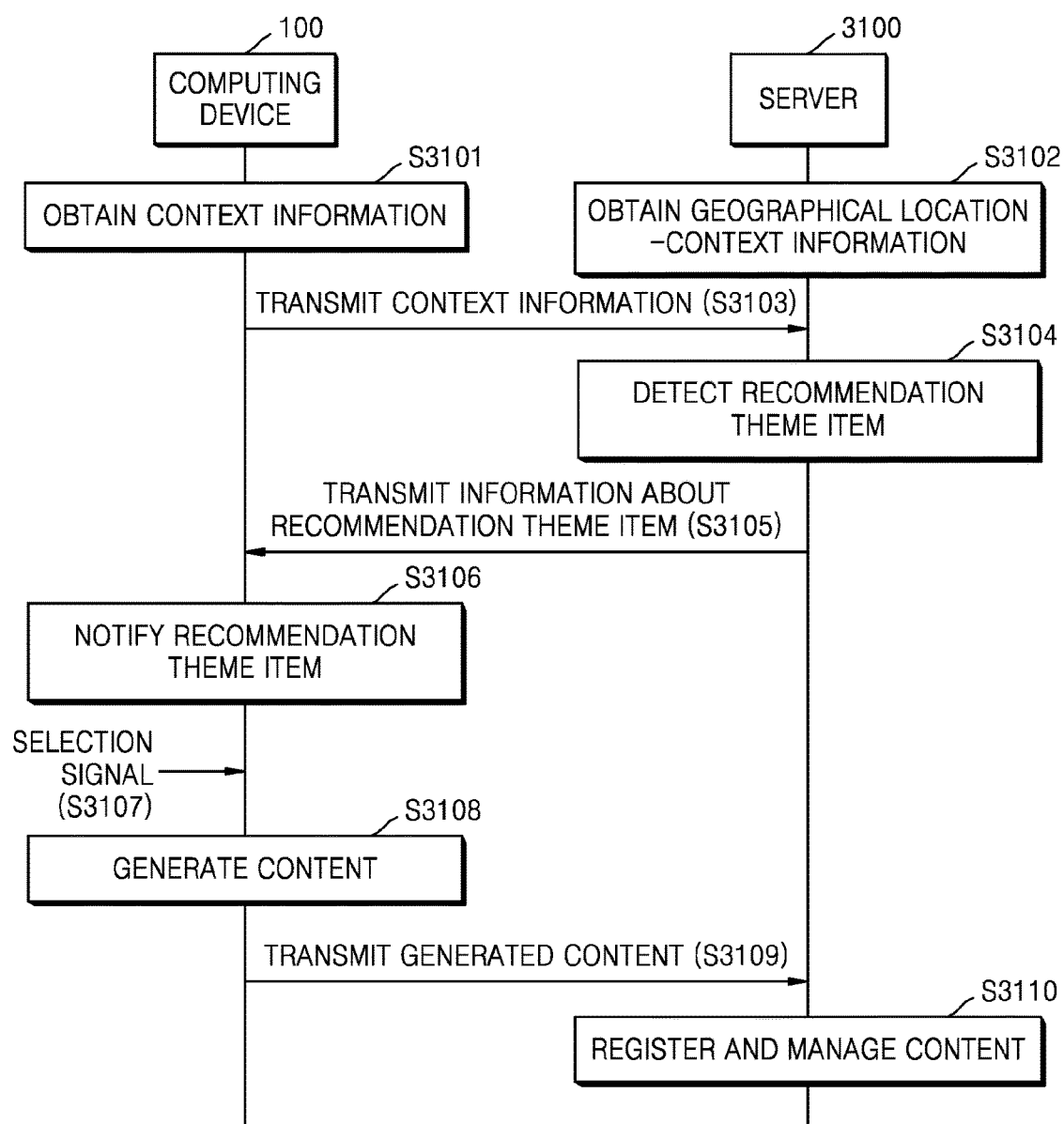
FIG. 31 is an operational flowchart of a method of providing personalized information according to another exemplary embodiment.

FIG. 31 is an operational flowchart of a method of providing personalized information according to an exemplary embodiment. FIG. 31 illustrates an example of providing a recommendation item in the form of a notification as personalized information without a user's request for generating content. A server 3100 of FIG. 31 is a server that is capable of obtaining and providing information about geographical locations like a map server. The server 3100 may include the server 700 illustrated in FIG. 7.

In operation S3101, the computing device 100 obtains user-based context information. In operation S3102, the server 3100 obtains geographical location-based context information. The geographical location-based context information may be expressed as geographical location-based information as described earlier in the present disclosure.

Operation S3102 may be performed before operation S3101 or may be continuously performed regardless of the computing device 100.

When the user-based context information obtained from the computing device 100 is received, the server 3100 detects a recommendation theme item by using the received user-based context information and geographical location-based context information in operation S3104. Detection of a recommendation theme item may be performed as in operation S2303 of FIG. 23 described above.

When at least one recommendation theme item is detected, the server 3100 transmits information about recommendation theme items to the computing device 100 in operation S3105. The computing device 100 provides a recommendation theme item as a notification based on the received recommendation theme item in operation S3106. The notification may be provided as illustrated in screens 2810 through 2860 in FIGS. 28A and 28B, but is not limited thereto.

When a selection signal selecting a recommendation theme item provided as a notification is received in operation S3107, the computing device 100 generates content in operation S3108, and transmits the generated content to the server 3100 in operation S3109. Then the server 3100 registers the received content and manages the same in operation S3110. Registration of content may include an operation of mapping a theme item regarding the received content and a geographical location, but is not limited thereto.

Figure 32:
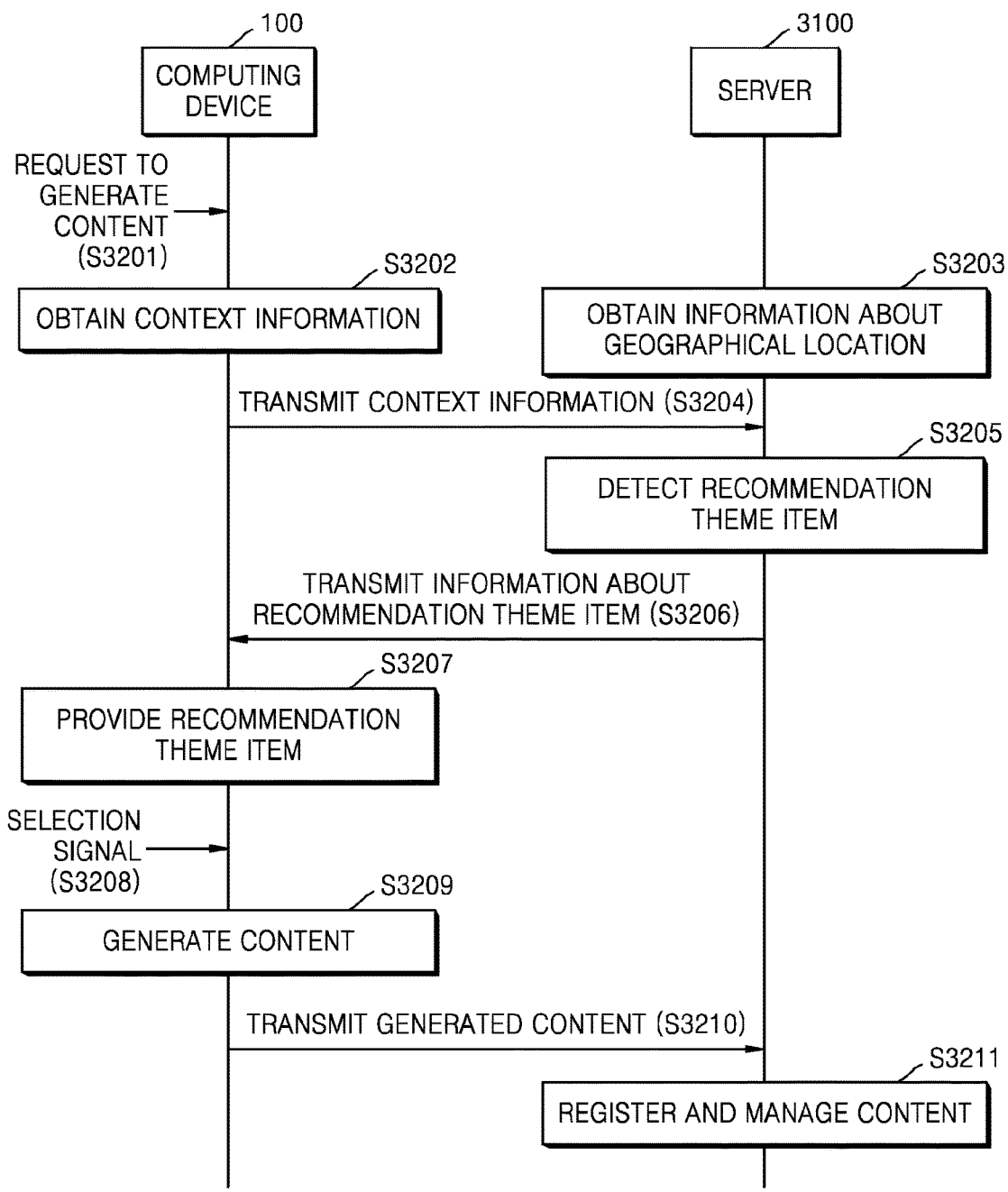
FIG. 32 is an operational flowchart of a method of providing personalized information according to another exemplary embodiment.

FIG. 32 is an operational flowchart of a method of providing personalized information according to another exemplary embodiment. The method of FIG. 32 includes an operation of providing a recommendation theme item as personalized information according to a user's request for generating content, and an operation of registering and managing the generated content to the server 3100 based on the provided recommendation theme item.

Operations S3202 through S3211 of FIG. 32 may be respectively performed in the same manner as operations S3101 through S3110 of FIG. 31 described above. Operation S3201 of FIG. 32 may be performed in the same manner as operation S2301 of FIG. 23 described above.

Figure 33:
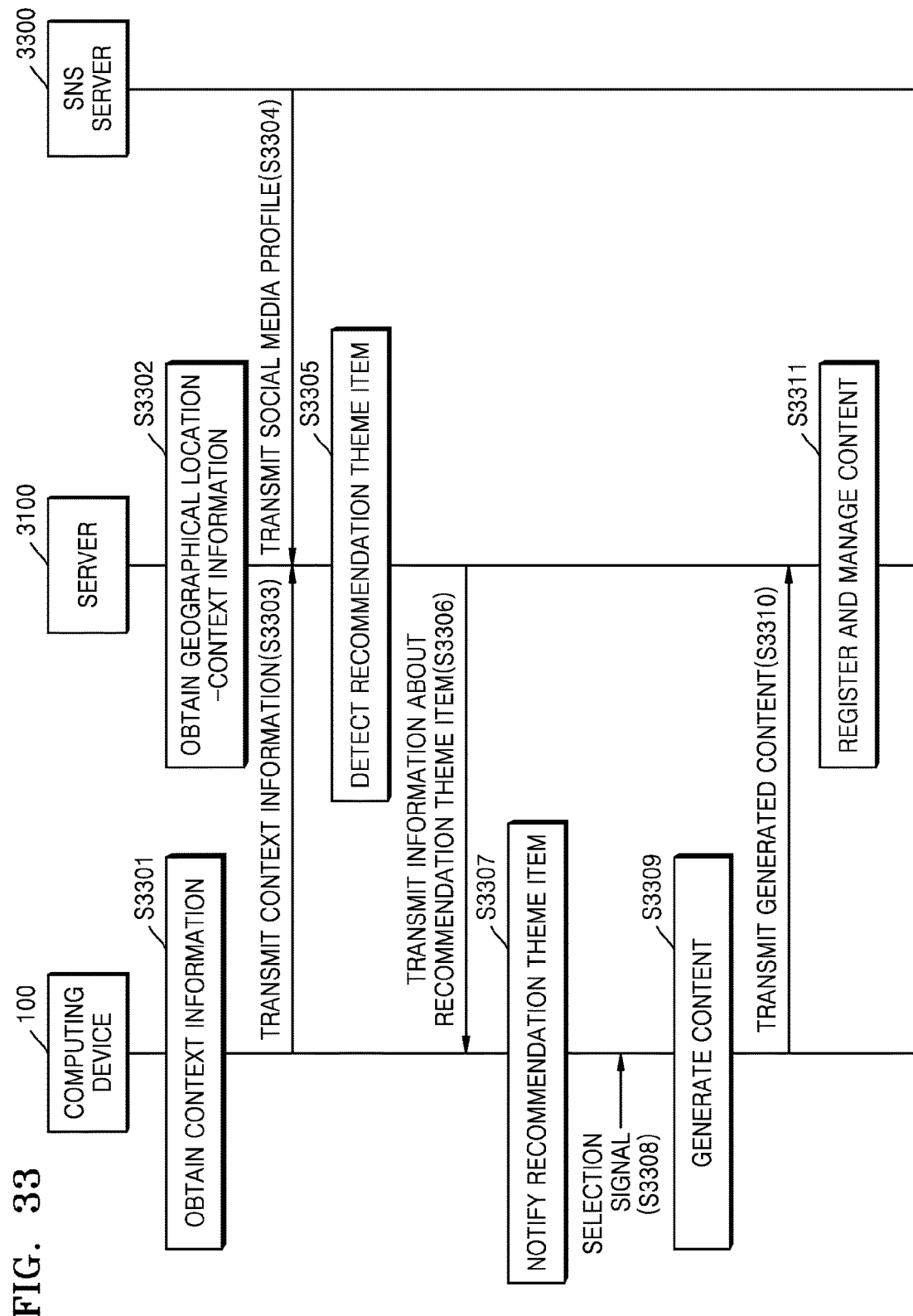
FIG. 33 is an operational flowchart of a method of providing personalized information according to another exemplary embodiment.

FIG. 33 is an operational flowchart of a method of providing personalized information according to another exemplary embodiment. FIG. 33 illustrates an example of notifying a recommendation theme item based on geographical location-based context information obtained by the server 3100, user-based context information obtained by the computing device 100, and a social media profile of the user of the computing device 100 received from a social network service (SNS) server 3300, as personalized information.

In operation S3301, user-based context information (except social media profile information) of the user of the computing device 100 is obtained.

Operations S3302, S3303, and S3306 through S3311 of FIG. 33 may be respectively similarly performed as operations S3102, S3103, and S3105 through S3110 of FIG. 31.

In operation S3304, when social media profile information is received from the SNS server 3300, the server 3100 detects a recommendation theme item based on the user-based context information received from the computing device 100, the geographical location-based context information obtained by the server 3100, and the social media profile information of the user of the computing device 100 received from the SNS server 3300.

For example, when information about a current location and a current time of the computing device 100 (e.g., shop A at Gangnam Station, 7 p.m.) is included in the user-based context information received from the computing device 100, and a theme item (e.g., drinking, having meal, and dining together) of content generated at the current location of the computing device 100 is included in geographical location-based context information, and information (e.g., drinking in the evening) about preference of the user of the computing device 100 is included in social media profile information, the server 3100 may detect drinking as a recommendation theme item in operation S3305.

The SNS server 3300 is a social media server. For example, the SNS server 3300 may be one of a Routrip server, a Facebook server, a Twitter server, a blog server, a Youtube server, a LinkedIn server, and/or the like, but is not limited thereto.

In operation S3304, the SNS server 3300 may transmit a social network service history to the server 3100. In this case, in operation S3305, the server 3100 may detect a recommendation theme item based on the social network service history, and user-based context information obtained in operation S3301 may include context information, from which the social network service history is excluded.

Figure 34:
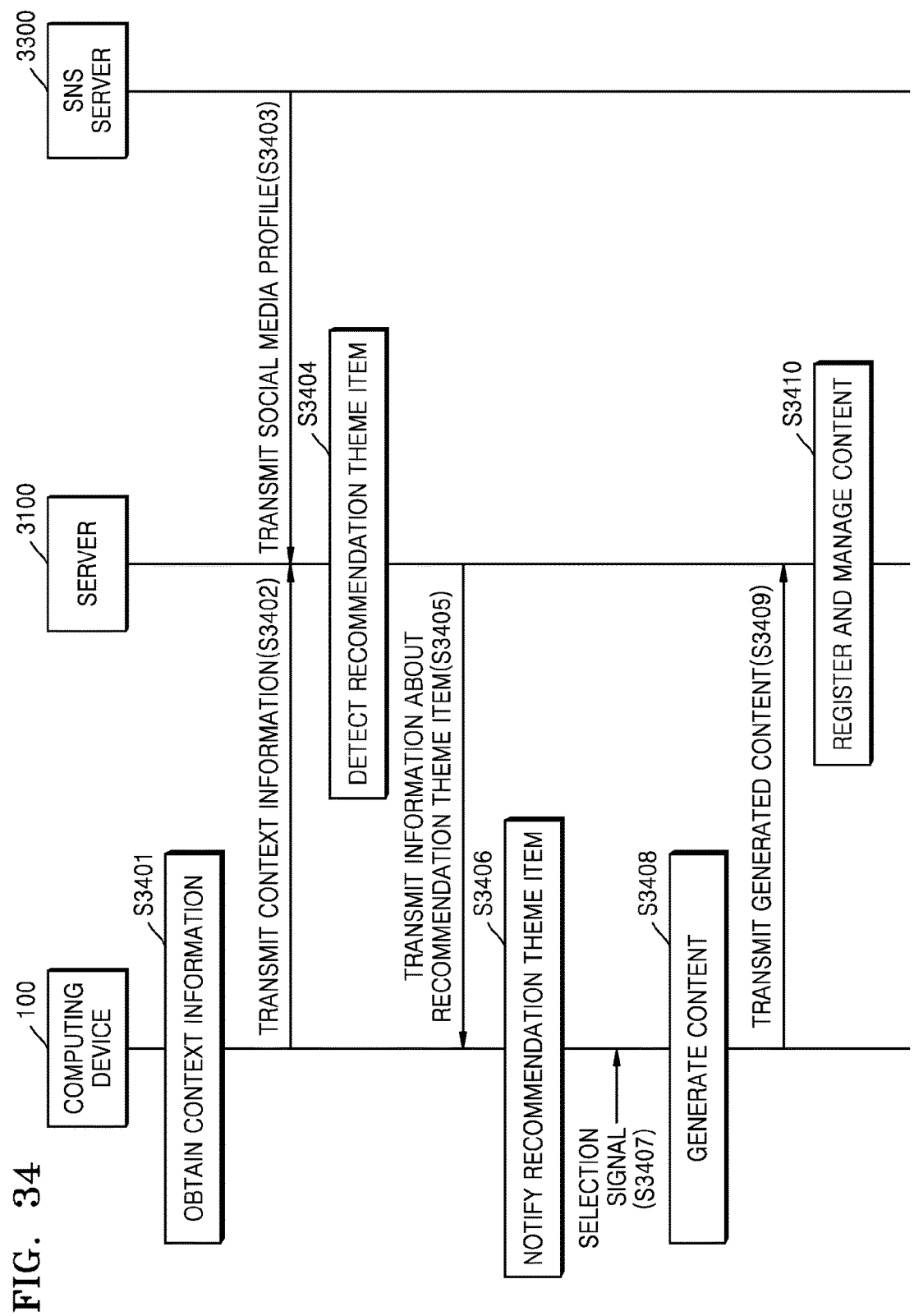
FIG. 34 is an operational flowchart of a method of providing personalized information according to another exemplary embodiment.

FIG. 34 is an operational flowchart of a method of providing personalized information according to another exemplary embodiment. FIG. 34 is an example of providing a recommendation theme item detected based on user-based context information obtained by the computing device 100 and a social media profile of the user of the computing device 100 received from the SNS server 3300, as personalized information.

Operations S3401 through S3403 may be performed in a similar manner as operations S3301, S3303, and S3304 of FIG. 33, and operations S3405 through S3410 may be performed in a similar manner as operations S3306 through S3311 of FIG. 33.

User-based context information of the computing device 100 obtained in operation S3301 may include context information without a social media profile of the user of the computing device 100. If information transmitted from the SNS server 3300 is a social network service history, user-based context information of the user of the computing device 100 obtained in operation S3301 may not include the social network service history of the user of the computing device 100.

In operation S3404, the server 3100 may detect a recommendation theme item based on the user-based context information received from the computing device 100 and the social media profile information received from the SNS server 3300.

For example, when information (e.g., shop A at Gangnam Station, 6 p.m.) about a current location and a current time of the computing device 100 is included in the user-based context information received from the computing device 100, and information (e.g., a blogger for providing information regarding a place that has tasty food) about a preference of the user of the computing device 100 is included in social media profile information, the server 3100 may detect tasty food restaurant (or gourmet restaurant) as a recommendation theme item in operation S3404.

Figure 35:
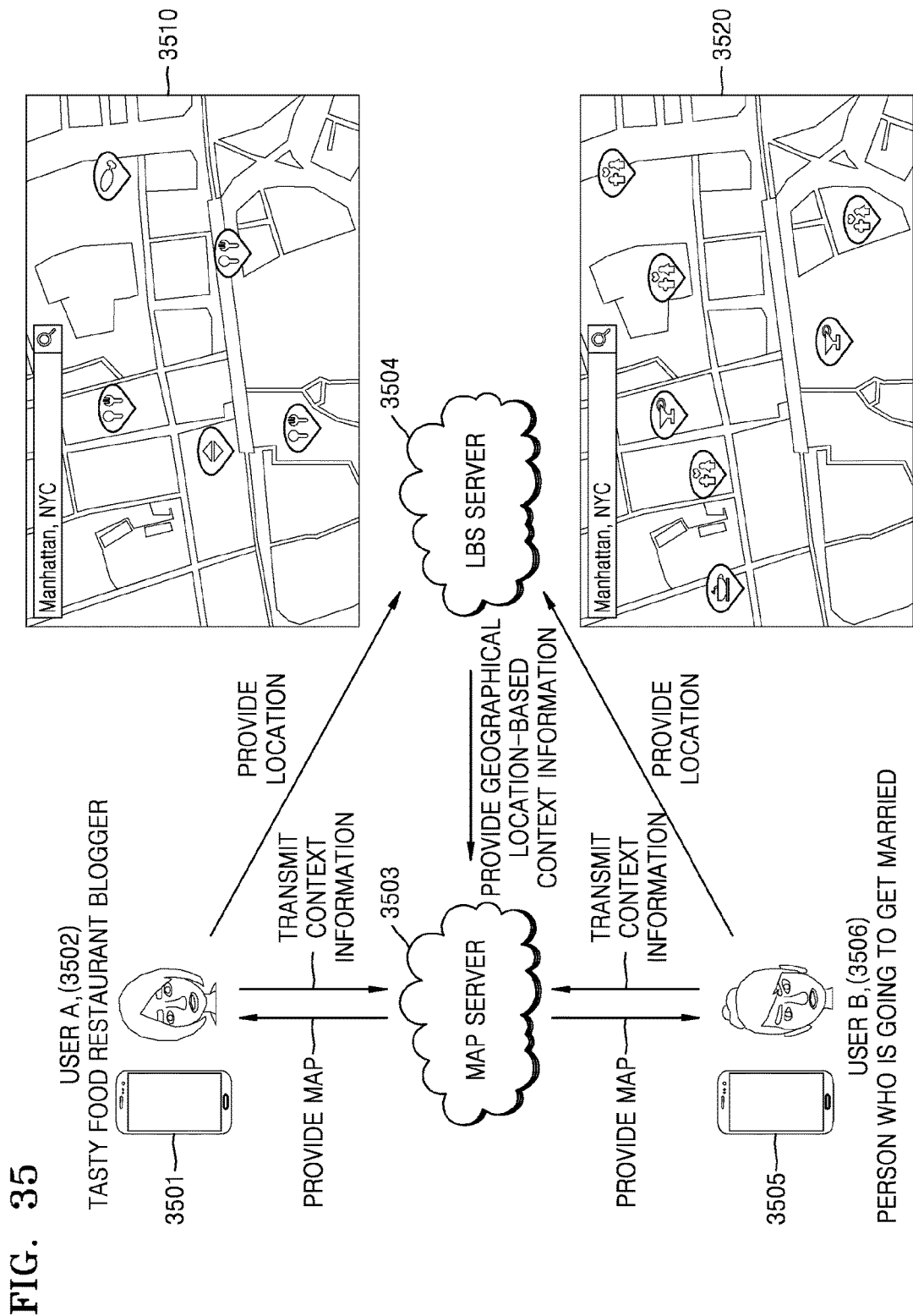
FIG. 35 is a view illustrating a method of providing personalized information according to another exemplary embodiment.

FIG. 35 is a view illustrating a method of providing personalized information according to another exemplary embodiment.

Referring to FIG. 35, a computing device 3501 obtains context information based on user A 3502 and provides the same to a map server 3503. The computing device 3501 may transmit location information included in the context information based on user A 3502 to a location-based service (LBS) server 3504. Location information may be obtained by the computing device 3501 or may also be input by the user of the computing device 3501. The computing device 3501 may be configured in a similar device as the computing device 100.

Another computing device 3505 obtains context information based on user B 3506 and provides the same to the map server 3503. The another computing device 3505 may transmit location information included in the context information based on user B 3506 to the location-based service server 3504. Location information may be obtained by the another computing device 3505 or may also be input by the user of the another computing device 3505. The another computing device 3505 may be configured in a similar manner as the computing device 100.

The location-based service server 3504 may transmit to the map server 3503 geographical location-based context information based on the location information received from the computing device 3501 of user A 3502 and geographical location-based context information based on the location information received from the another computing device 3505 of user B 3506.

The map server 3503 may provide the user A 3502 with map information 3510 that is customized to user A 3502 based on user-based context information received from the computing device 3501 and context information based on geographical location of user A 3502 transmitted from the location-based service server 3504.

For example, if location information transmitted by the computing device 3501 to the location-based service server 3504 is Manhattan, N.Y., the location-based service server 3504 transmits geographical location-based context information about Manhattan, N.Y., to the map server 3503.

The map server 3503 analyzes the context information based on user A 3502 received from the computing device 3501. As a result of the analysis, if user A 3502 is a tasty food restaurant blogger, and theme items that user A 3502 prefers are TH1 (e.g., show) and TH3 (e.g., dating), the map server 3503 may provide the computing device 3501 with the map 3510, on which tasty food restaurants (e.g., tasty food restaurant with shows and/or tasty food restaurants suitable for dating), to which TH1 and TH3 are registered, are marked as points of interest, from among theme items included in the geographical location-based context information received from the location-based service server 3504.

For example, if location information transmitted by the another computing device 3505 to the location-based service server 3504 is New York, Manhattan, the location-based service server 3504 transmits geographical location-based context information about New York, Manhattan to the map server 3503.

The map server 3503 analyzes the context information based on user B 3506 received from the other computing device 3505. As a result of analysis, if user B 3506 is going to get married, and theme items of content that user B 3506 has recently mostly generated are TH2 (e.g., hotel) and TH5 (e.g., travel), the map server 3503 may provide the another computing device 3505 with the map 3520 on which places to which TH2 and TH5 (e.g., hotels or sights to see) are registered, are marked as points of interest, from among theme items included in the geographical location-based context information received from the location-based service server 3504.

The maps 3510 and 3520 illustrated in FIG. 35 may include the point of interest toggle item 1101 or the point of interest information setting item 1102 illustrated in FIG. 11. When the point of interest toggle item 1101 or the point of interest information setting item 1102 are included in the maps 3510 and 3520, the computing devices 3501 and 3505 may change points of interest marked on the maps 3510 and 3520 according to a user input based on the point of interest toggle item 1101 or the point of interest information setting item 1102.

The map server 3503 illustrated in FIG. 35 may operate in connection with a map application installed in the computing devices 3501 and 3505.

Figure 36:
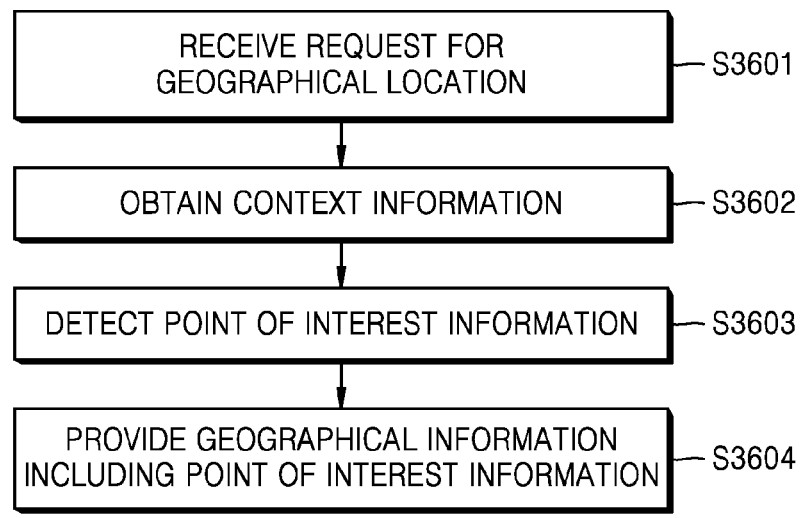
FIG. 36 is an operational flowchart of a method of providing personalized information according to another exemplary embodiment.

FIG. 36 is an operational flowchart of a method of providing personalized information according to another exemplary embodiment. FIG. 36 illustrates an example of providing geographical information including point of interest information as personalized information as a request for geographical information is received from a user of the computing device 100.

When a request for geographical information is received in operation S3601, the computing device 100 obtains at least one of user-based context information of the user of the computing device 100 and geographical location-based context information in operation S3602. The request for geographical information may be received like the request for generating content received in operation S2301 of FIG. 23. The operation of the computing device 100 in operation S3602 may be similar to the operation of the computing device 100 in operation S2302 of FIG. 23.

Before requesting geographical information in operation S3601, the user of the computing device 100 may select in advance a theme item that the user prefers. An operation of selecting a theme item in advance may be included in an operation of setting a filtering condition of the theme item.

Figure 37:
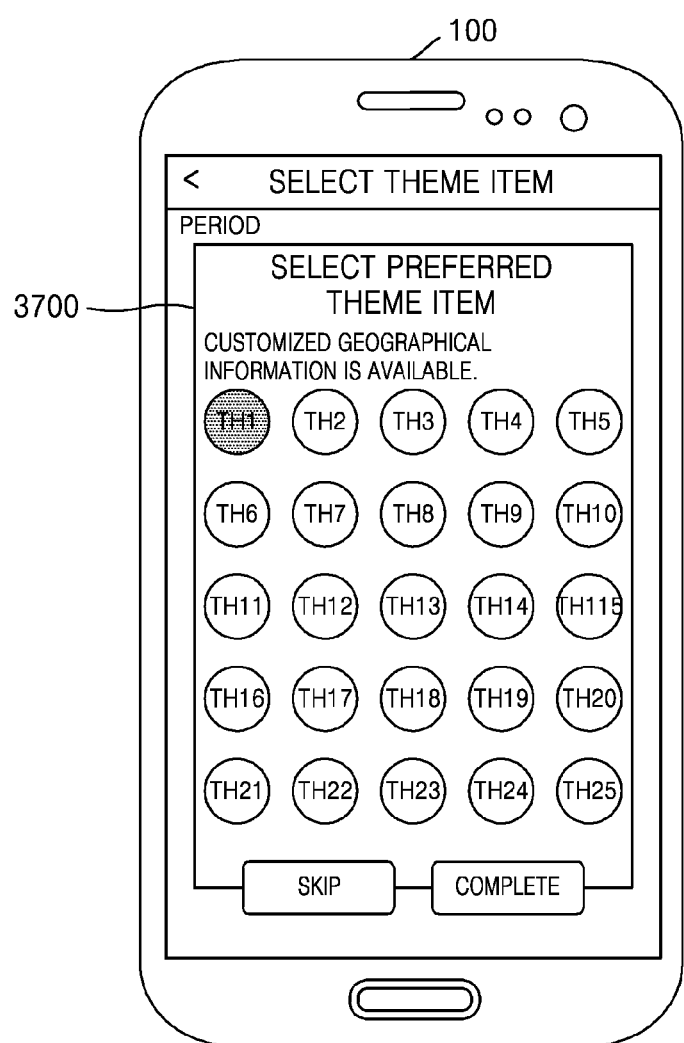
FIG. 37 illustrates an example of a screen for selecting a theme item according to another exemplary embodiment.

FIG. 37 illustrates an example of a screen for selecting a theme item according to an exemplary embodiment. Referring to FIG. 37, the computing device 100 may provide a screen 3700 including theme item TH1 through TH25 as a screen via which theme items are selectable. The theme items TH1 through TH25 displayed on the screen 3700 may be theme items that a user frequently uses.

The number of selectable theme items may be more than a number of the theme items TH1 through TH25 marked on the screen 3700. If the number of selectable theme items is more than the number of the theme items TH1 through TH25 displayed on the screen 3700, the computing device 100 may provide other theme items by moving a page to the left or right according to a touch-based input such as a swipe. A method of providing other theme items is not limited to the above method. For example, the computing device 100 may provide other theme items by moving a page upward or downward based on a touch-based input such as a scroll.

A skipping item illustrated in FIG. 37 indicates an input item that is selectable if a user wishes to skip the preferred theme item selection operation and continue without selecting preferred theme items. A complete item illustrated in FIG. 37 indicates an input item indicating completion of selection of a preferred theme item. The computing device 100 may provide a screen for selecting point of interest information illustrated in FIG. 14 described above instead of the screen 3700 related to the selectable theme items illustrated in FIG. 37.

Figure 38:
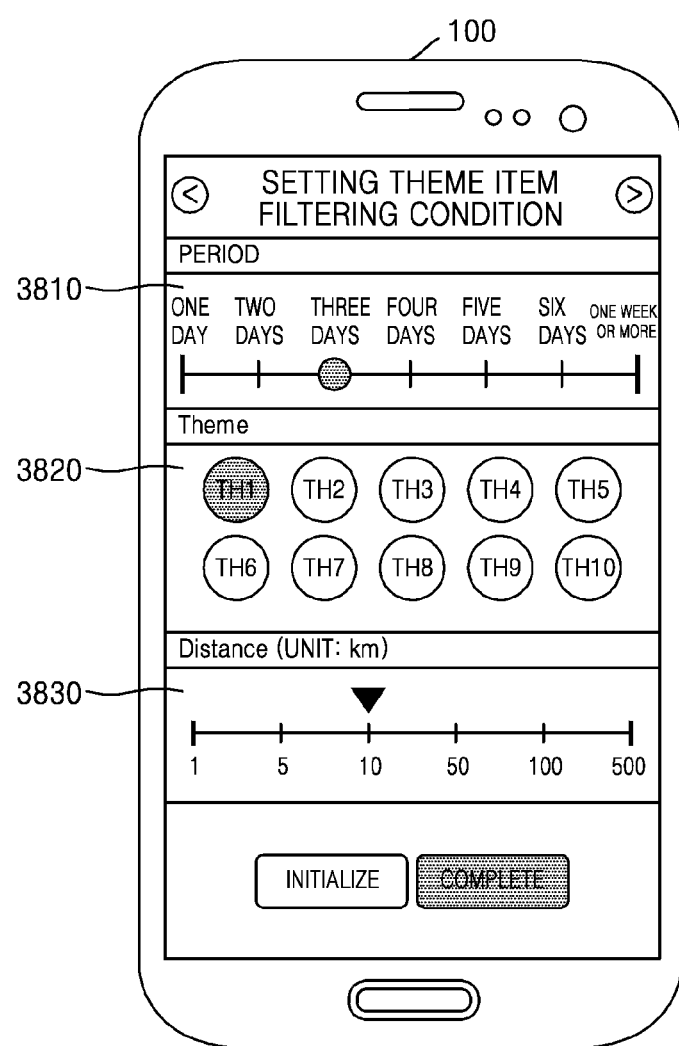
FIG. 38 illustrates an example of a screen for setting a theme item filtering condition according to another exemplary embodiment.

FIG. 38 illustrates an example of a screen for setting a theme item filtering condition according to an exemplary embodiment. Referring to FIG. 38, a theme item filtering condition may include information about a time period, a theme item, and distance, but is not limited thereto.

A period illustrated in FIG. 38 indicates a time period before the current date. For example, when three days is selected in a period area 3810 as illustrated in FIG. 38, the computing device 100 may perceive the period as three days before the current date.

At least one theme item selected in a theme item area (3820) illustrated in FIG. 38 may indicate a theme item preferred by the user of the computing device 100. For example, when a theme item TH1 is selected in the theme area 3820 as illustrated in FIG. 38, the theme item TH1 may be set as a theme item preferred by the user of the computing device 100.

A distance illustrated in FIG. 38 may indicate a radial distance from a current location of the computing device 100 or from a location set by the user of the computing device 100. For example, when a distance of 10 km is selected in a distance area 3830 as illustrated in FIG. 38, the computing device 100 may provide information about a point of interest within 10 km from a reference location.

The computing device 100 may individually control the period area 3810, the theme item area 3820, and the distance area 3830. In each of the period area 3810, the theme item area 3820, and the distance area 3830, when a touch-based input such as a swipe is received, the computing device 100 may set a desired filtering condition by moving to the left or right corresponding to at least one of the period area 3810, the theme item area 3820, and the distance area 3830. When a touch-based input such as a scroll is received in the period area 3810, the theme item area 3820, and the distance area 3830, the computing device 100 may set a desired filtering condition by moving to the upward or the downward the period area 3810, the theme item area 3820, and the distance area 3830 respectively.

Meanwhile, in operation S3603, the computing device 100 detects point of interest information based on the context information obtained in operation S3602. The computing device 100 may detect point of interest information in the same manner as the map server 3503 does as described with reference to FIG. 35, but is not limited thereto. For example, the computing device 100 may request from the map server 3403 detection of point of interest information, and may receive point of interest information from the map server 3503.

When point of interest information is detected, the computing device 100 provides geographical information including the point of interest information in operation S3604. The computing device 100 may provide the geographical information including the point of interest information as illustrated in FIG. 39 or FIG. 40.

Figure 39:
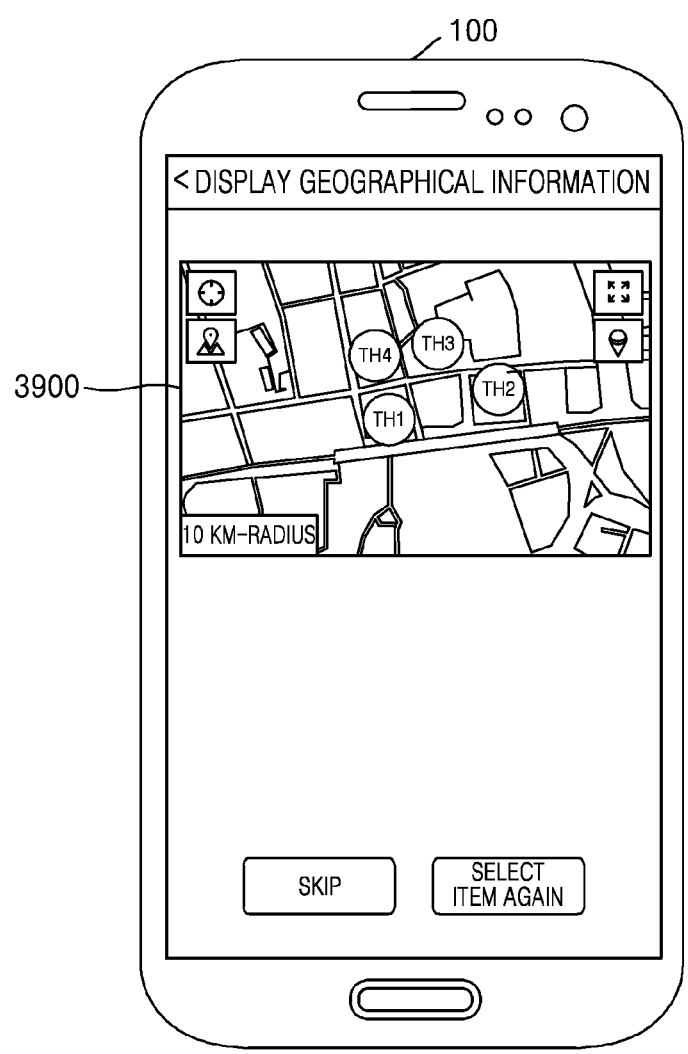
FIG. 39 illustrates an example of a map image, on which a theme item according to another exemplary embodiment is marked on a point of interest.

FIG. 39 illustrates an example of a map image, on which a theme item according to an exemplary embodiment is marked on a point of interest.

Referring to FIG. 39, the computing device 100 provides a map image 3900 showing theme items TH1, TH2, TH3, and TH4 at points of interest, as point of interest information.

Figure 40:
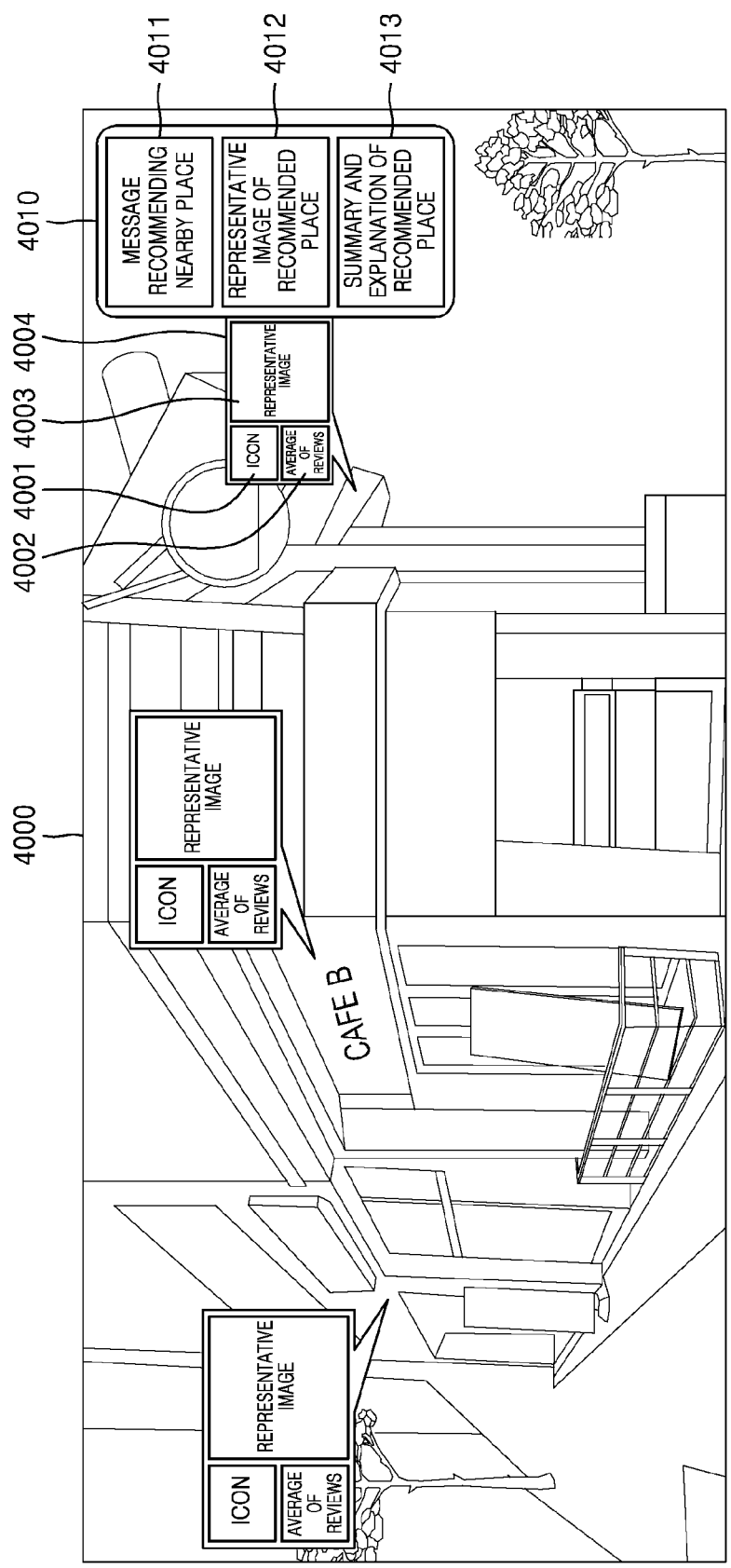
FIG. 40 illustrates an example of a screen on which an augmented reality (AR) image and data about a point of interest are synthesized, according to another exemplary embodiment.

FIG. 40 illustrates an example of a screen showing an augmented reality (AR) image and information about a point of interest, that are combined together, according to an exemplary embodiment. Referring to FIG. 40, the computing device 100 provides a screen on which point of interest information is combined with an AR image 4000. The AR image 4000 may be obtained by using a camera included in the computing device 100. The point of interest information marked in FIG. 40 may include icons, average of reviews, and a representative image, but is not limited thereto. For example, the point of interest information may further include icons indicating the name of the shop, and the number of comments by customers, but is not limited thereto. The icons may indicate theme items regarding a point of interest. The average of reviews may indicate a grade of review about the point of interest. The representative image may be a representative image of the point of interest.

When a user input selecting an icon 4001 is received, the computing device 100 may provide a window 4010 including a message recommending nearby places 4011, a representative picture 4012 of recommended places, and summary and explanation 4013 of the recommended places, illustrated in FIG. 40. The computing device 100 may display the window 4010 as an independent popup window apart from a window 4004. The window 4004 may include an icon 4001, an average of reviews 4002, and/or a representative picture 4003.

The computing device 100 may also individually manage the message for recommending nearby locations 4011, the representative picture 4012 of the recommended places, and the summary and explanation 4013 of the recommended places, included in the window 4010 as independent windows. When a selection of the summary and explanation 4013 of the recommended places is received, and the recommended place is a restaurant, the computing device 100 may provide, for example, menus, today's highlight menus, daily specials, happy hour specials, and price information via the corresponding window or another independent window.

Figure 41:
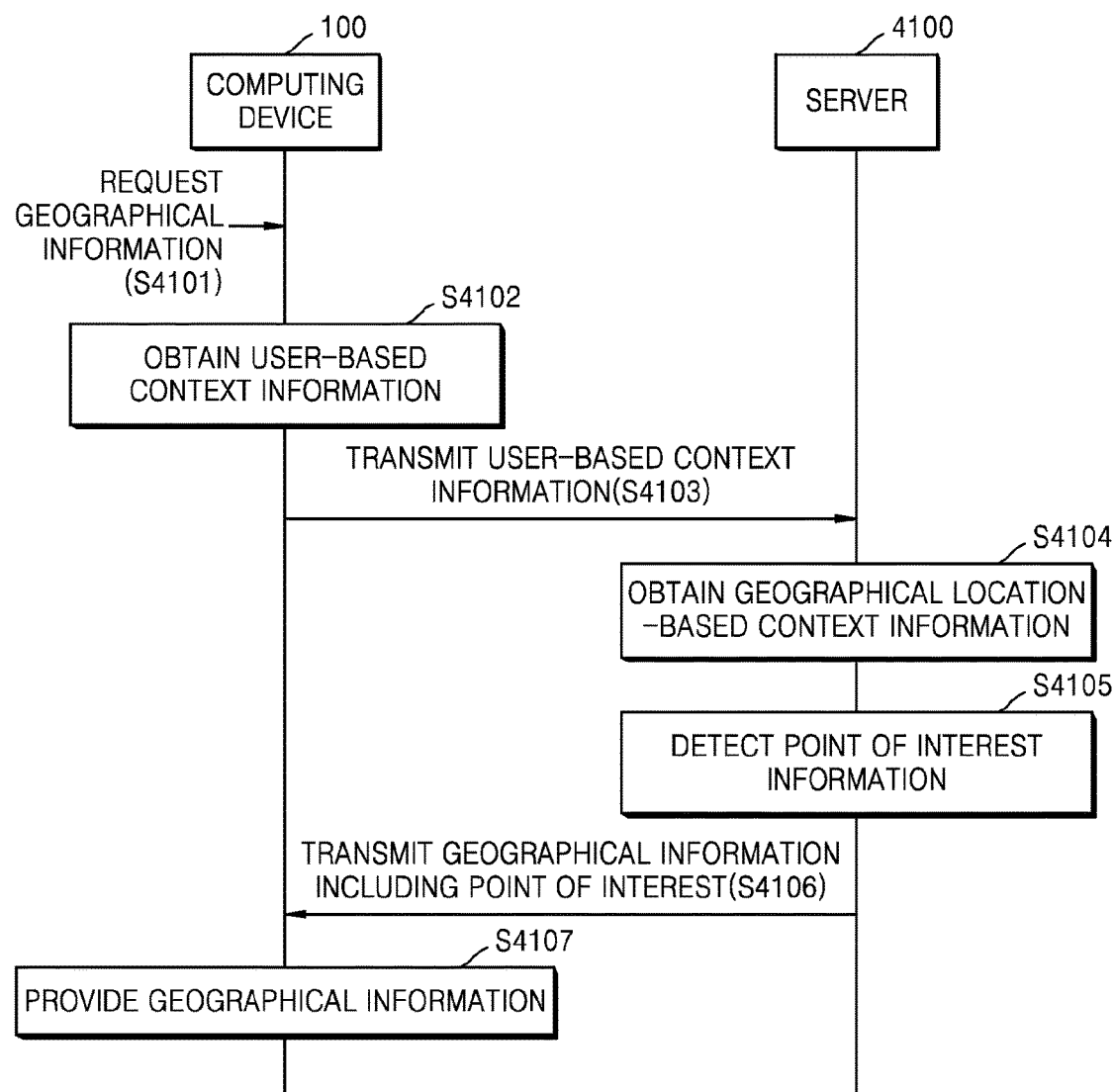
FIG. 41 is an operational flowchart of a method of providing personalized information according to another exemplary embodiment.

FIG. 41 is an operational flowchart of a method of providing personalized information according to another exemplary embodiment. FIG. 41 illustrates an example of providing geographical information based on user-based context information obtained by using the computing device 100 and geographical location-based context information obtained by the server 4100 as personalized information.

In operation S4101, when a request for geographical information is received, the computing device 100 obtains user-based context information. The request for geographical information may be received by appointing a specifically-designated point as illustrated in FIG. 24 (point A 2401), but a method of requesting geographical information is not limited thereto.

For example, location information may be input by using a text input window provided by the computing device 100, and the computing device 100 may receive the request for geographical information via a touch-based input selecting an input complete item or an item corresponding to the request for geographical information, provided by the computing device 100.

A request for execution of a map application installed in the computing device 100 may also be used as a request for geographical information. A method of requesting geographical information may be determined by an environment setting of the computing device 100 or an environment setup of the map application, but is not limited thereto.

In operation S4102, the computing device 100 obtains user-based context information. The computing device 100 may obtain different pieces of user-based context information according to a usage environment and/or specifications of the computing device 100. For example, if the computing device 100 is capable of receiving a sensing value of an IoT sensor, the computing device 100 may obtain user-based context information by using the sensing value of the IoT sensor. If the computing device 100 is not able to receive a sensing value of an IoT sensor, the computing device 100 may obtain user-based context information regardless of a sensing value of an IoT sensor.

The computing device 100 transmits the obtained user-based context information to the server 4100 in operation S4103. The server 4100 obtains geographical location-based context information based on the received user-based context information in operation S4104. For example, if location information indicating New York, Manhattan is included in the received user-based context information as shown in FIG. 35, the server 4100 may obtain geographical location-based context information about New York, Manhattan. The server 4100 may be a server capable of providing a location-based service and a map service, but is not limited thereto.

In operation S4105, the server 4100 may detect point of interest information based on the obtained geographical location-based context information and the received user-based context information. For example, the computing device 100 may detect information about a point of interest (e.g., a point of interest in New York, Manhattan) based on a place profile (e.g., information about a theme item registered to a place) included in the geographical location-based context information and a user profile (e.g., information about a preferred theme item) included in the user-based context information.

In operation S4106, the server 4100 may transmit geographical information including the detected information about a point of interest to the computing device 100. After mapping the detected information about a point of interest and the geographical location, the server 4100 may transmit to the computing device 100 the information obtained by mapping the information about a point of interest and the geographical information.

In operation S4107, the computing device 100 provides the geographical information received from the server 4100.

Figure 42:
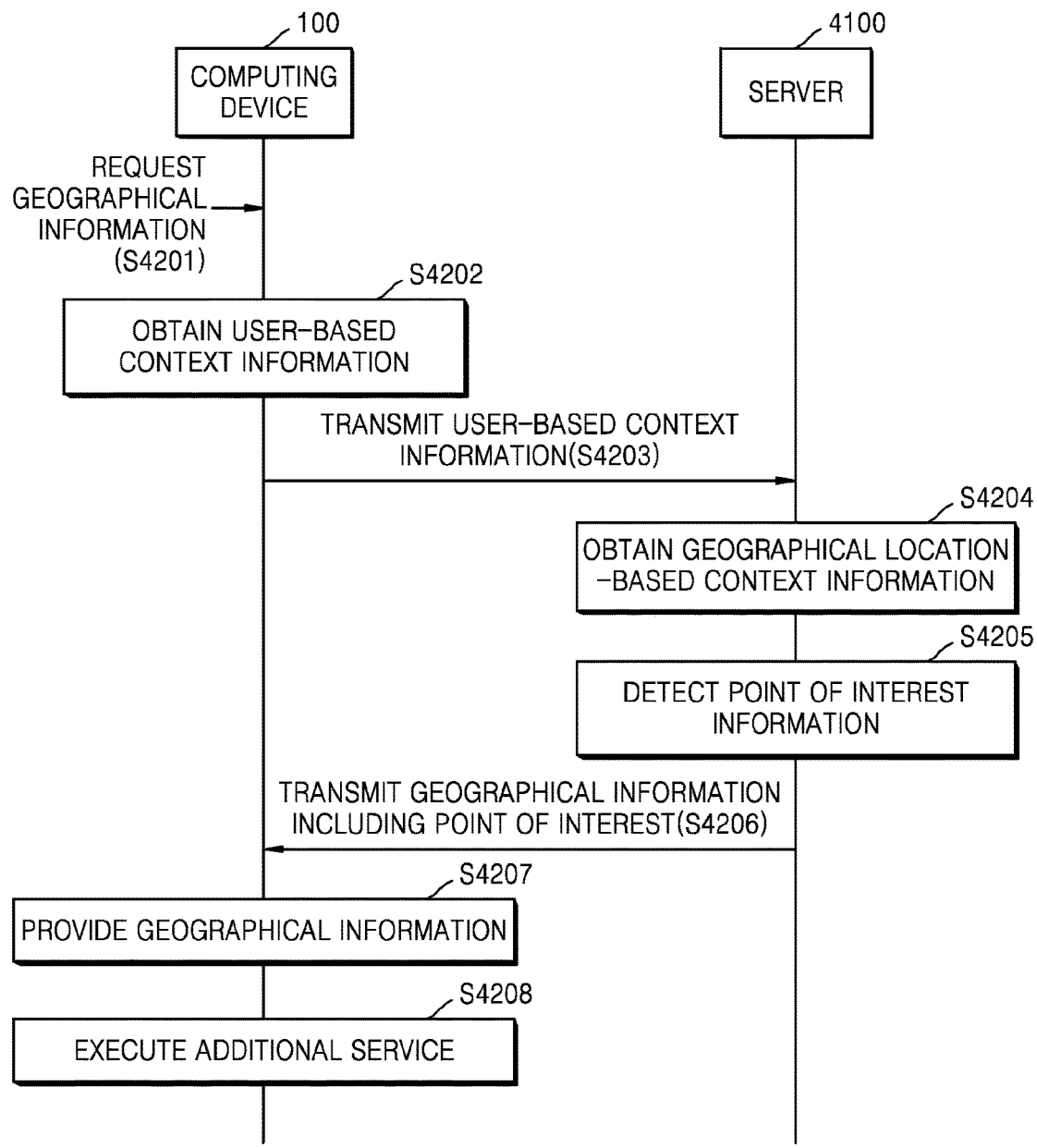
FIG. 42 is an operational flowchart of a method of providing personalized information according to another exemplary embodiment.

FIG. 42 is an operational flowchart of a method of providing personalized information according to another exemplary embodiment. The method FIG. 42 illustrates an example adding an operation of executing an additional service to the method of FIG. 41.

Operations S4201 through S4207 of FIG. 42 may be respectively performed in a similar manner as operations S4101 through S4107 of FIG. 41.

In operation S4208, the computing device 100 executes an additional service based on the provided geographical information. The additional service may include, for example, on-line booking of a designated place, making a call to a designated place, transmitting a message to a designated place, positing information about a designated place to the SNS server 3400 or a blog, and connecting to a Uniform Resource Locator (URL) connected to a designated place, but is not limited thereto.

The additional service may include an operation of immediately executing an application for executing the additional service.

For example, when making a call to the designated place is selected, the computing device 100 may execute a phone application and perform an operation of making a call using a telephone number of the designated place. When on-line booking of the designated place is selected, the computing device 100 may access a home page address of the designated place by executing an Internet application and may open an on-line booking page. When information about the designated place is posted to the SNS server 3400 or a blog is selected, the computing device 100 may immediately post the information about the designated place by accessing the SNS server 3400 or the blog. When connecting to a URL connected to the designated place is selected, the computing device 100 may immediately perform an operation of connecting based on the URL connected to the designated place. If there are multiple URLs connected to the designated place, the computing device 100 may provide a screen by connecting to a URL that is selected from among a plurality of URLs or may provide a multi-screen by simultaneously connecting to multiple URLs.

Figure 43:
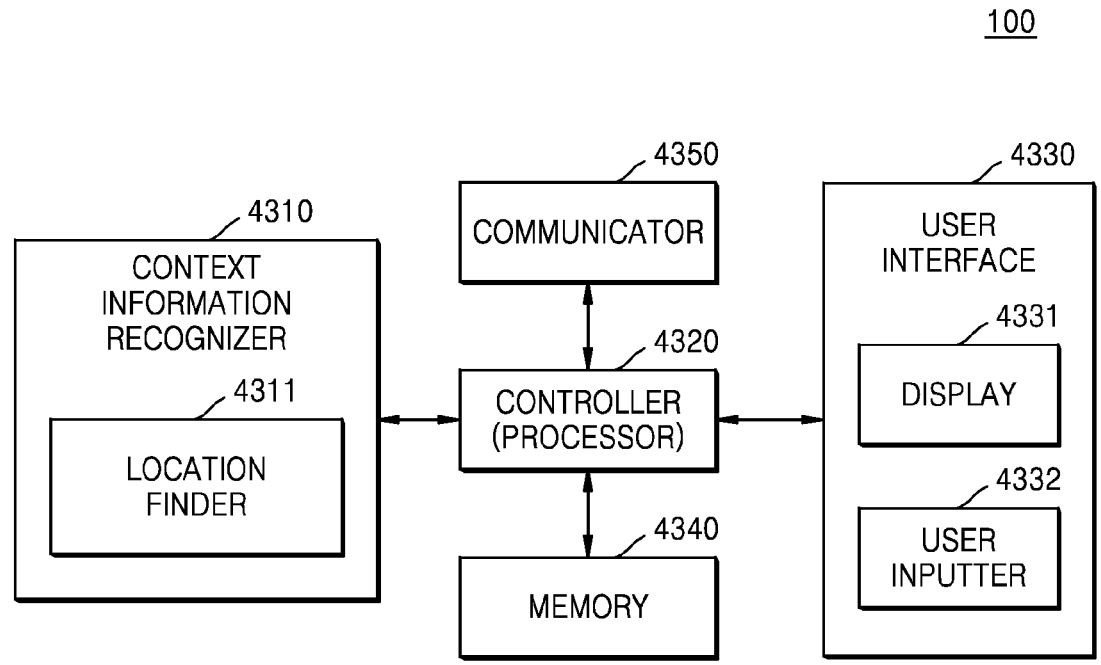
FIGS. 43 and 44 are functional block diagrams of a computing device according to one or more exemplary embodiments.

FIG. 43 is a functional block diagram of the computing device 100 used according to exemplary embodiments. Referring to FIG. 43, the computing device 100 may include a context information obtaining unit (e.g., context information obtainer) 4310, a controller 4320, a user interface unit (e.g., user interface) 4330, a memory 4340, and a communication unit (e.g., communicator) 4350.

Figure 44:
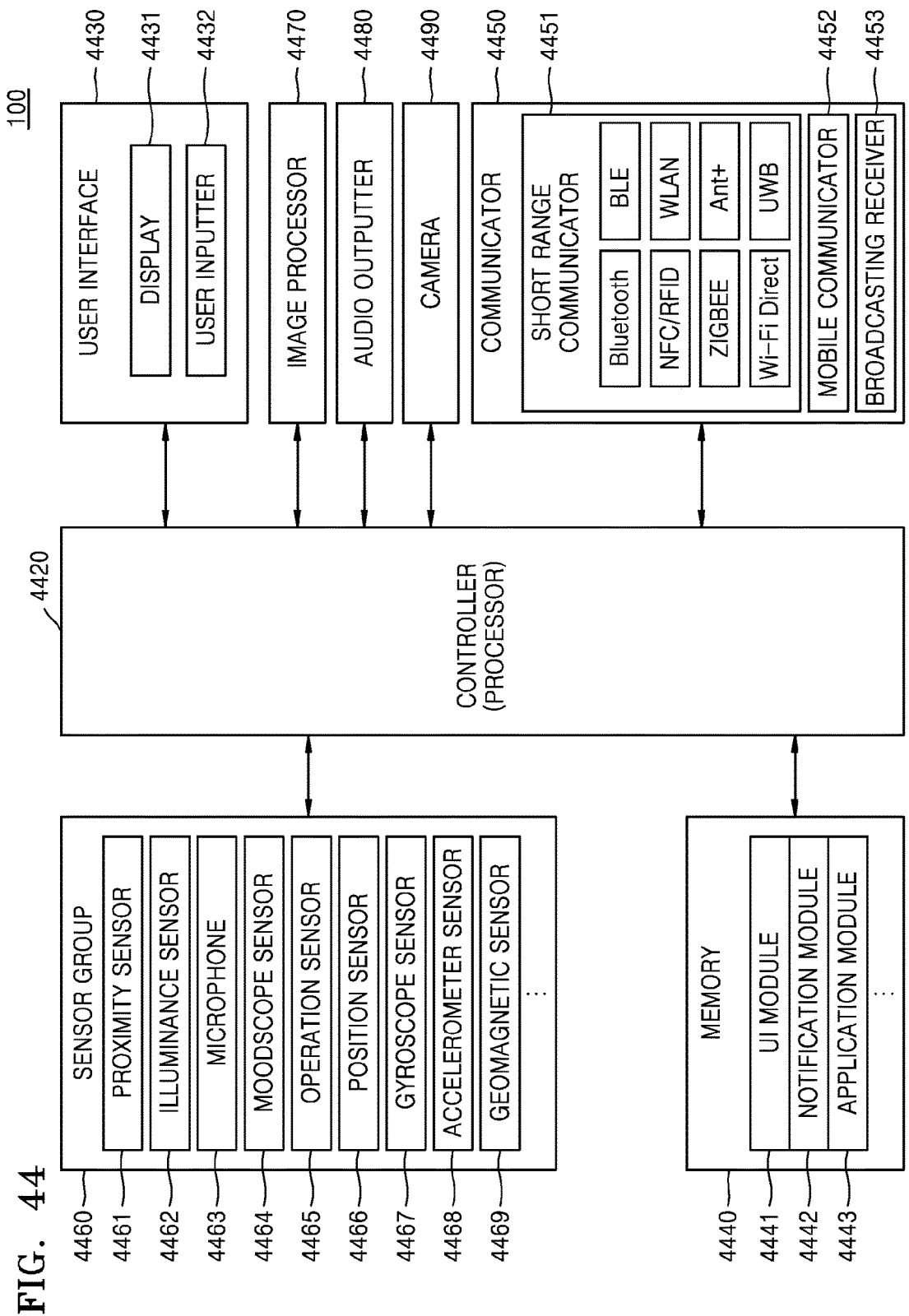

Not all of elements of the computing device 100 illustrated in FIG. 43 are necessary elements. The computing device 100 may include more or less elements than those illustrated in FIG. 43. For example, the computing device 100 may be configured as illustrated in FIG. 44 which will be described later. The computing device 100 may include a user location information obtaining unit (e.g., location finder, location tracker) 4311, a controller 4320, a user interface unit 4330, a memory 4340, and a communication unit 4350.

The context information obtaining unit 4310 may obtain at least one of user-based context information of the user of the computing device 100 described with reference to operation S2302 of FIG. 23 and geographical location-based context information described with reference to operation S3102 of FIG. 31. Obtaining geographical location-based context information may be expressed as receiving geographical location-based context information.

In order to obtain the user-based context information and the geographical location-based context information, the context information obtaining unit 4310 may include at least one element that is connected to at least one of sensors included in a sensor unit (e.g., sensor group) 4460, a camera 4490, and the communication unit 4350 illustrated in FIG. 44 so as to transmit or receive data.

In order to obtain the user-based context information and the geographical location-based context information, the context information obtaining unit 4310 may include an element obtaining the user-based context information (e.g., a first context information obtaining unit) and an element obtaining the geographical location-based context information (e.g., a second context information obtaining unit). The context information obtained by the context information obtaining unit 4310 is transmitted to the controller 4320.

Information about theme items included in the context information may include a theme item of content generated at a geographical location, the number of times a theme item is generated, and priority information of a theme item based on the number of times a theme item is generated, but is not limited thereto.

The information about theme items may include, for example, theme items and the number of times of generating a theme item, such as 10 times of theme A (e.g., dating) of content generated at place A (e.g., café), three times of theme B (e.g., gathering), one time of theme C (e.g., studying). The information about a theme item may include priority information of the theme items, such as first ranking theme A, a second ranking theme B, and a third ranking theme C.

The geographical location-based context information may be obtained from a geographical location information providing application (e.g., a map application) stored in the memory 4340. For example, the context information obtaining unit 4310 may request from the geographical location information providing application stored in the memory 4340 geographical location-based context information about point A, and may receive from the geographical location information providing application geographical location information about the point A. To this end, the context information obtaining unit 4310 may transmit or receive data directly to or from the memory 4340, but may also transmit or receive data to or from the memory 4340 via the controller 4320.

The controller 4320 may communicate with a geographical location information providing server (e.g., the map server or a location-based service (LBS) server 3504, etc.) connected via the communication unit 4350 to update the geographical location information providing application stored in the memory 4340.

The context information obtaining unit 4310 may receive geographical location-based context information from a location management server (e.g., a management server installed at place A). For example, if the computing device 100 is tagged at an NFC tag installed at place A, the context information obtaining unit 4310 may receive information about a geographical location regarding place A from the NFC tag via the communication unit 4350. To this end, the context information obtaining unit 4310 may include an element for accessing an NFC communication module included in the communication unit 4350. The NFC communication module may read information from an NFC tag and write information to the NFC tag.

The context information obtaining unit 4310 may receive geographical location context information from an external device (e.g., a computing device of another person) connected to the computing device 100 via the communication unit 4350. For example, the context information obtaining unit 4310 may receive geographical location-based context information stored in computing device of another person who is connected to the computing device 100, based on Bluetooth communication by using the communication unit 4350.

The context information obtaining unit 4310 may obtain context information based on geographical location-based on a user input received from a user input unit 4332. For example, the context information obtaining unit 4310 may receive information about a theme item that a user has directly input via the user input unit 4332 at place A as context information based on a geographical location regarding place A.

The context information obtaining unit 4310 may obtain user-based context information by receiving information about a user (e.g., life log information of a user), stored in the memory 4340, and/or information about a user from an external device (e.g., an SNS server, a wearable device such as a smart watch, a user information management server, a user information database, etc.) connected to the computing device via the communication unit 4350. However, the method of obtaining user-based context information is not limited thereto.

The context information obtaining unit 4310 may include a user location information obtaining unit 4311. The user location information obtaining unit 4311 may sense whether the user of the computing device 100 has moved, and may obtain physical location information.

The user location information obtaining unit 4311 may obtain user location information by using at least one of a value sensed by at least one sensor included in the computing device 100, a GPS satellite signal, and/or network location information.

The user location information obtaining unit 4311 may include at least one sensor (e.g., a motion sensing sensor, an illuminance sensor, an accelerometer sensor, a geomagnetic sensor, a gyroscope, a position sensor, etc.) included in the sensor unit (e.g., sensor group) 4460 illustrated in FIG. 44 which will be described later, a camera 4490, and/or at least one elements that is able to transmit or receive data to or from at least one communicator included in a communication unit 4450.

The user location information obtained by using the user location information obtaining unit 4311 is transmitted to the controller 4320.

The controller 4320 may sense whether a user's location has moved based on the user location information provided from the user location information obtaining unit 4311. When sensing whether the user's location is moved, the controller 4320 may track the user's location. When tracking the user's location, the controller 4320 may variably control an interval of measuring the user's location by the user location information obtaining unit 4311.

The controller 4320 may detect a moving speed, a movement time, and/or a moved distance of the user of the computing device 100 based on information received from the user location information obtaining unit 4311.

The controller 4320 may variably control an interval of measuring the user's location by the user location information obtaining unit 4311 according to at least one of the detected moving speed, movement time, and moved distance of the user of the computing device 100 based on information received from the user location information obtaining unit 4311. The controller 4320 may obtain information about an initial route of the user based on the user location information obtained from the user location information obtaining unit 4311.

The controller 4320 may detect information indicating the predicted route of the user based on information about a user's initial route from user location history information. The user location history information may be stored in the memory 4340 but may also be received from an external device via the communication unit 4350. The external device may include the server 700 of FIG. 7, but is not limited thereto.

When information indicating the predicted route of the user is detected, the controller 4320 may variably control an interval of measuring the user's location performed by the user location information obtaining unit 4311 according to at least one of the detected moving speed, movement time, and/or surrounding environment information of the user.

If the user's predicted route based on the user's initial route is not detected from the user location history information, the controller 4320 may variably control an interval of measuring the user's location by the user location information obtaining unit 4311 based on at least one of a movement speed and/or surrounding environment information of the user.

The controller 4320 may obtain information about a route based on user location information transmitted from the user location information obtaining unit 4311, and update the user location history information based on the obtained information about a route. If the user location history information is stored in the memory 4340, the controller 4320 may update the user location history information stored in the memory 4340. If the user location history information is stored in the server 70, the controller 4320 may transmit information about the obtained information about a user's route to the server 700 and request to update the user location history information.

The controller 4320 may perform an operation based on at least one of the operational flowchart of the computing device 100 according to one or more exemplary embodiments, as illustrated in FIGS. 2, 3, 4, 6, 7, 9, 10, 12, 15, 17-20, 23, 27, 29, 31-34, 36, 41, and 42.

The controller 4320 may be referred to as a processor that controls an operation of the computing device 100. The controller 4320 may detect at least one recommendation theme item based on context information received from the context information obtaining unit 4310. For example, if information about place A (10, 3, 1) and information about user A (10, 0, 0) are included in the received context information, the controller 4320 may detect a theme item with the number 10 in the information about place A and the information about user A information as a recommendation theme item.

The information about place A (10, 3, 1) may indicate that a theme item A of content generated at place A is generated ten times, and a theme item B of the content is generated three times, and a theme item C of the content is generated one time. The information about user A (10, 0, 0) may indicate that a theme item A of content generated by the user of the computing device 100 is generated ten times, and a theme item B of the content is generated zero time, and a theme item C of the content is generated zero time. If a theme item included in the information about place A and a theme item included in the information about user A are the same as described above, the controller 4320 may detect the theme item A as a recommendation theme item.

The controller 4320 may display the detected theme item via a display unit (e.g., display) 4331 included in the user interface unit (e.g., user interface) 4330. When a selection signal selecting the recommendation theme item displayed via the display unit 4331 is received via the user input unit (e.g., user inputter) 4332 included in the user interface unit 4330, the controller 4320 may provide a corresponding graphical user interface (GUI) via the display unit 4331. The corresponding GUI may be used to generate content regarding the selected recommendation theme item. The GUI used to generate content may be as illustrated in FIG. 26, but is not limited thereto.

When generation of content is completed according to a user input by using the GUI provided via the display unit 4331, the controller 4320 registers the generated content. The content may be registered in the memory 4340 of the computing device 100 or registered to the server 2900 illustrated in FIG. 29 or an external device (a user database or another computing device of the user).

The controller 4320 may detect a point of interest based on context information received from the context information obtaining unit 4310. For example, if context information about place A and context information about place B are included in the received context information, and context information about place A indicates place A (10, 3, 1)=place A (theme item A, theme item B, theme item C), and context information about place B indicates place B (0, 12, 2)=place B (theme item A, theme item B, and theme item C), and if user A (10, 0, 0) included in context information indicates user A (theme item A, theme item B, and theme item C), the controller 4320 detects place A as a point of interest about the user A.

The controller 4320 may provide a map including detected points of interest via the display unit 4331. When a selection signal selecting one of the points of interest displayed on the display unit 4331 is received via the user input unit 4332, the controller 4320 may provide information based on the selected point of interest via the display unit 4331. The information based on the selected point of interest may include, for example, a menu for selecting an additional service available based on the selected point of interest. The additional service may include the additional service described in operation S4208 of FIG. 42, but is not limited thereto.

The display unit 4331 is configured to display information being processed by the computing device 100. The display unit 4331 may display the screens as illustrated in FIGS. 1, 5, 8, 11, 13, 14, 16A, 16B, 16C, 21, 22, 24, 25, 26, 28A, 28B, 30, 37, 38, 39, and 40 described above.

When a touch pad and a display are configured in a layered structure as a touch screen, the display unit 4331 may be used as both an input device and an output device. The display unit 4331 may include at least one of a liquid crystal display, a thin film transistor-liquid crystal display, an organic light-emitting diode, a flexible display, a 3D display, and/or an electrophoretic display (EPD).

According to an implementation form of the computing device 100, the computing device 100 may include two or more display units 4331. The two or more display units 4331 may be disposed to face each other by using a hinge.

The user input unit 4332 may receive a user input based on a screen displayed on the display unit 4331. The user input unit 4332 may be mounted in the computing device 100 so that a user may input data for controlling the computing device 100.

The user input unit 4332 that may be mounted in the computing device 100 may include, for example, at least one of a key pad, a dome switch, a touch pad (e.g., capacitive overlay, resistive overlay, infrared beam, surface acoustic wave, integral strain gauge, and piezoelectric type touch pads), a jog wheel, and/or a jog switch, but is not limited thereto.

User input information that may be input via the user input unit 4332 may include at least one of touch-based input information, movement-based input information, vision-based input information, and/or user voice-based input information, but is not limited thereto.

For example, touch-based input information may include a tap (or touch), a long tap (long touch), a touch and hold, a touch and drag, a double tap, a drag, a panning, a flick, a drag and drop, and/or a sweep, but is not limited thereto.

Movement-based input information may include, for example, input information based on a user gesture (e.g., shaking a device, rotating a device, and lifting a device) based on a movement of the computing device 100, but is not limited thereto.

Vision-based input information may include information that is recognized by analyzing an input image obtained by using a camera included in the computing device 100 without a contact between the computing device 100 and a user.

The memory 4340 may store a program for processing and controlling by the controller 4320. A program stored in the memory 4340 may include an operating system (OS) program and various application programs. Various application programs may include, for example, a geographical location information providing application, a personalized information providing application, and/or a user location tracking application, but are not limited thereto.

The memory 4340 stores information managed by an application program. For example, the memory 4340 may store content generated according to an exemplary embodiment, information about the generated content, geographical location-based context information, user-based context information of the user of the computing device 100, and/or user location history information, but is not limited thereto.

The memory 4340 may include at least one type of storage medium selected from a flash memory type, a hard disk type, a multimedia card micro type, a card type memory (e.g., SD or XD memory), a random access memory (RAM), a static random access memory (SRAM), a read-only memory (ROM), an electrically erasable programmable read-only memory (EEPROM), a programmable read-only memory (PROM), a magnetic memory, a magnetic disk, and/or an optical disk.

The computing device 100 may be configured to use web storage or a cloud server that performs a storage function of the memory 4340 on the Internet. In this case, information about a screen displayed on the display unit 4331 may be provided by the web storage or the cloud server described above.

The communication unit 4350 may include at least one element for communication between the computing device 100 and at least one external device (e.g., a wearable device such as a smart watch, a service providing server, another computing device of the user, or a cloud server, etc.). For example, the communication unit 4350 may include at least one of a short range communicator 4451, a mobile communicator 4452, and/or a broadcasting receiver (e.g., GPS receiver) 4453 which are illustrated in FIG. 44 below, but the elements included in the communication unit 4350 are not limited thereto.

Referring to FIG. 44, the computing device 100 may include a controller 4420, a user interface unit (e.g., user interface) 4430, a memory 4440, a communication unit (e.g., communicator) 4450, a sensor unit (e.g., sensor group) 4460, an image processor 4470, an audio output unit (e.g., audio outputter) 4480, and a camera 4490.

The computing device 100 may include a battery. The battery may be included inside the computing device 100 or may be detachably connected to the computing device 100. The battery may be used to supply power to all elements included in the computing device 100. The computing device 100 may receive power from an external power device via the communication unit 4450. The computing device 100 may further include a connector that is connectable to the external power device.

The controller 4420, the user interface unit 4430, the memory 4440, and the communication unit 4450 illustrated in FIG. 44 may be respectively referred to as similar or identical elements as the controller 4320, the user interface unit 4330, the memory 4340, and the communication unit 4350 illustrated in FIG. 43.

The display unit (e.g., display) 4431 and the user input unit (e.g., user inputter) 4432 illustrated in FIG. 44 may be respectively referred to as the display unit 4331 and the user input unit 4332 illustrated in FIG. 43.

Programs stored in the memory 4440 may be classified as a plurality of modules according to respective functions. For example, programs stored in the memory 4440 may be classified as a UI module 4441, a notification module 4442, and an application module 4443, but are not limited thereto. For example, when the display unit 4431 is coupled to a touch panel layer, the plurality of modules may include a touch screen module.

The UI module 4441 may provide GUI information about the user's route described above with reference to exemplary embodiments and GUI information used to generate new content to the controller 4420. The UI module 4441 may provide the controller 4420 with UI or GUI or the like that are specialized in each application installed in the computing device 100.

The notification module 4442 may generate a signal notifying recommendation of a theme item by the computing device 100, but a notification generated by the notification module 4442 is not limited thereto.

The notification module 4442 may output a notification signal in the form of a video signal illustrated in FIGS. 28A and 28B via the display unit 4431, or may output a notification signal as an audio signal via the audio output unit 4480, but is not limited thereto. A notification signal in the form of an audio signal may include a notification signal related to the user's route illustrated in FIG. 1.

The application module 4443 may include various applications including a personalized information providing application installed in the computing device 100. A personalized information providing application according to an exemplary embodiment may operate in connection with other applications set to the computing device 100. For example, a personalized information providing application to perform an additional service described with reference to operation S4208 of FIG. 42 may operate in connection with other applications set to the computing device 100.

The communication unit 4450 may include at least one element for communication between the computing device 100 and at least one external device (e.g., a service providing server, a cloud server, a wearable device, or an appcessory). For example, the communication unit 4450 may include at least one of the short range communicator 4451, the mobile communicator 4452, and/or the broadcasting receiver 4453, but is not limited thereto.

Examples of the short range communicator 4451 may include, without limitation, a module whereby at least one communication among Bluetooth communication, Bluetooth Low Energy (BLE) communication, near field communication, Wi-Fi LAN (WLAN) communication, Zigbee communication, Ant+ communication, infrared Data Association (IrDA) communication, Wi-Fi Direct (WFD) communication, and/or Ultra WideBand (UWB) communication may be performed. For example, the short range communicator 4451 may include an IrDA communication module.

The mobile communicator 4452 transmits or receives a wireless signal to or from at least one of a base station, an external device, and/or a server via a mobile communication network. The wireless signal may include a voice call signal, a video call signal, or data in various forms according to transmission and reception of text/multimedia messages.

The broadcasting receiver 4453 receives a broadcast signal and/or information related to broadcasting via a broadcasting channel from the outside. Examples of a broadcasting channel may include, without limitation, a satellite channel, a terrestrial channel, and/or a radio channel.

The communication unit 4450 may transmit information about at least one piece of content generated by the computing device 100 according to an exemplary embodiment, to an external device or receive at least one of a recommendation theme item, geographical location-based context information, and/or user location history information, from the external device. Information, data, and signals transmitted or received via the communication unit 4450 are not limited to the above examples.

The sensor unit 4460 may include, for example, a proximity sensor 4461 for sensing whether a user has approached the computing device 100, an illuminance sensor 4462 (or an optical sensor or an LED sensor) for sensing illuminance of a surrounding environment of the computing device 100, a microphone 4463 for recognizing voice of the user of the computing device 100, a moodscope sensor 4464 for sensing a mood of the user of the computing device 100, a motion sensing sensor 4465 for sensing activity of the user, a position sensor 4466 (e.g., a GPS sensor) for sensing a location of the computing device 100, a gyroscope 4467 for measuring a bearing angle of the computing device 100, an accelerometer sensor 4468 for measuring an inclination and an acceleration of the computing device 100 with respect to a ground surface, and/or a geomagnetic sensor 4469 for sensing a bearing angle of the four cardinal points with respect to the computing device 100, but is not limited thereto.

For example, the sensing unit 4460 may include a gravity sensor, an altitude sensor, a chemical sensor (e.g., an odorant sensor), a temperature sensor, a humidity sensor, a barometer, a fine dust sensor, an ultraviolet sensor, an ozone sensor, a carbon dioxide ($CO_2$) sensor, an optical sensor, and/or a network sensor (e.g., a network based on Wi-Fi, Bluetooth, 3G (Generation), LTE (long term evolution), NFC).

The sensing unit 4460 may include, for example, a pressure sensor (e.g., a touch sensor, a piezoelectric sensor, or physical buttons), a state sensor (e.g., an earphone terminal or a DMB antenna), a standard terminal (e.g., a terminal capable of recognizing whether charging is conducted, a terminal capable of recognizing whether the computing device 110 is connected to a personal computer (PC), or a terminal capable of recognizing whether the computing device 110 is connected to a doc), a time sensor, and/or a health sensor (e.g., a biosensor, a heart rate sensor, a blood flow meter, a diabetes sensor, a blood pressure sensor, a stress sensor, etc.).

The microphone 4463 may receive an audio signal from the outside of the computing device 100 and convert the received audio signal to an electrical audio signal and transmit the same to the controller 4420. The microphone 4463 may be configured to perform an operation based on a noise removing algorithm for removing noise generated when receiving an external acoustic signal. The microphone 4463 may be referred to as an audio input unit.

A result of sensing sensed by the sensor unit 4460 is transmitted to the controller 4420.

The controller 4420 may track a location of the user of the computing device 100 based on a sensing value received from the sensor unit 4460 (e.g., the illuminance sensor 4462), detect an initial route based on the tracked user's location, and detect a user's predicted route based on the initial route from user location history information.

The controller 4420 may recommend a theme item. For example, the controller 4420 may recommend a theme item (e.g., happiness) based on location information (e.g., home) of the computing device 100 detected based on a sensing value received from the location sensor 4466 and emotion information (e.g., happiness) of the user of the computing device 100 detected based on a sensing value received from the moodscope sensor 4464.

The controller 4420 may control an overall operation of the computing device 100. For example, the controller 4420 may execute programs stored in the memory 4440 to control an overall operation of the sensor unit 4460, the memory 4440, the user interface unit 4430, the image processor 4470, the audio output unit 4480, the camera 4490, and/or the communication unit 4450.

The controller 4420 may perform an operation based on at least one of the operational flowchart of the computing device 100 according to one or more exemplary embodiments, as illustrated in FIGS. 2, 3, 4, 6, 7, 9, 10, 12, 15, 17-20, 23, 27, 29, 31-34, 36, 41, and 42.

The controller 4420 may include a plurality of processors according to an operation environment of the computing device 100. For example, the controller 4420 may include a processor operating in a low power mode of the computing device 100 and a processor operating in a normal mode of the computing device 100. The controller 4420 may include a plurality of processors classified according to elements included in the computing device 100.

The image processor 4470 processes image data received from the communication unit 4450 or stored in the memory 4440 such that the image data is displayable on the display unit 4431. For example, signal processing on image data may be performed such that a screen as illustrated in FIGS. 1, 5, 8, 11, 13, 14, 16A, 16B, 16C, 21, 22, 24, 25, 26, 28A, 28B, 30, 37, 38, 39, and 40 is displayed on the display unit 4431.

The audio output unit 4480 outputs audio data received from the communication unit 4450 or audio data stored in the memory 4440. Also, the audio output unit 4480 may output a sound signal (e.g., a notification sound) related to a function performed by the computing device 100. The audio output unit 4480 may output a notification sound with respect to at least one of notification details illustrated in FIGS. 28A and 28B. The audio output unit 4480 may include, for example, a speaker or a buzzer, but is not limited thereto.

The camera 4490 may obtain an image frame such as a still image or a video via an image sensor in a video call mode or a photographing mode. The camera 4490 may obtain a finger gesture image of the user of the computing device 100 and transmit the same to the controller 4420. The controller 4420 may use the finger gesture image of the user described above to determine whether a theme item is selected, whether generation of content is canceled, whether generation of content is completed, or whether generated content is registered or posted, but usage of the finger gesture image is not limited thereto. An image captured by using the image sensor may be processed via the controller 4420 or an additional image processor.

An image frame processed by the camera 4490 may be stored in the memory 4440 or transmitted to the outside via the communication unit 4450. The computing device 100 may include at least two cameras 4490 according to a configuration of the computing device 100.

Figure 45:
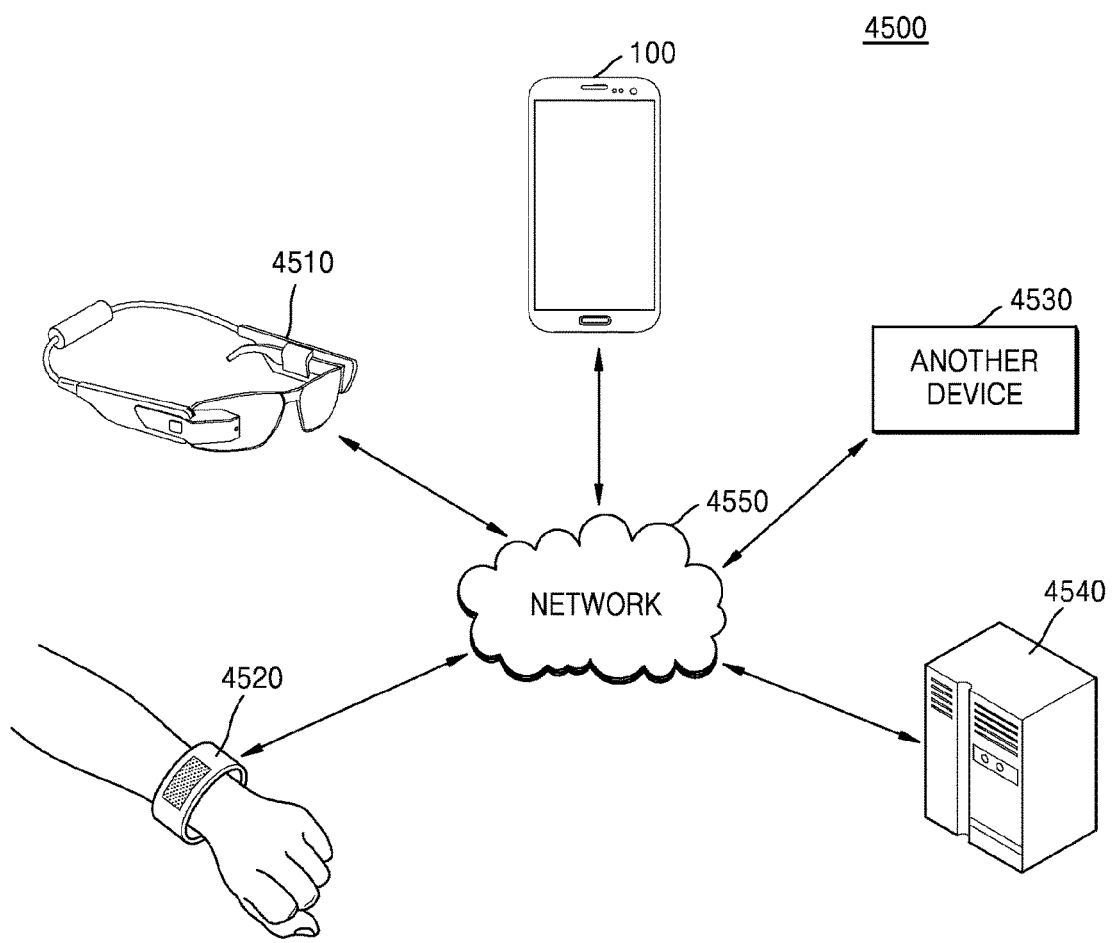
FIG. 45 is a structural diagram illustrating a system for providing personalized information according to an exemplary embodiment.

FIG. 45 is a structural diagram illustrating a system 4500 for providing personalized information according to an exemplary embodiment. Referring to FIG. 45, the system 4500 for providing personalized information may include a computing device 100, smart glasses 4510, a smart watch 4520, another device 4530, a server 4540, and a network 4550, but the configuration of the system 4500 for providing personalized information is not limited to this.

The smart glasses 4510, the smart watch 4520, and the other device 4530 may be devices owned by the user of the computing device 100. For example, when an AR-based image as shown in FIG. 40 is provided via the smart glasses 4510, content of a theme item selected by using the smart glasses 4510 may be generated by using the computing device 100.

Selection of a theme item by using the smart glasses 4510 may be performed, for example, by using an eye tracking method, but is not limited thereto. When one of theme items displayed by using the eye tracking method is selected, information about the selected theme item may be transmitted to the computing device 100. Thus, the computing device 100 may display a GUI screen as illustrated in FIG. 26.

When a theme item is selected by using the smart glasses 4510, the smart glasses 4510 may display the GUI screen as shown in FIG. 26. When the GUI screen as shown in FIG. 26 is displayed on the smart glasses 4510, the smart glasses 4510 may generate content according to a user input received by using a user input unit or a microphone of the smart glasses 4510.

For example, the smart glasses 4510 may perform operations such as moving selection information displayed on the smart glasses 4510 by a user's gesture to a desired theme item, displaying a GUI screen for generating new content as shown in FIG. 26 according to the number of times of blinking the eyes, returning to a previous screen, canceling an operation of generating content, or converting to another operational mode.

The smart glasses 4510 and the smart watch 4520 may transmit sensing values such as a condition or health information of the user to the computing device 100. A user's condition may include, for example, information about fatigue of the user obtained by using an image sensor included in the smart glasses 4510, but is not limited thereto. Health information may include, for example, a heart rate, blood sugar, and/or a body temperature obtained by using a bio sensor included in the smart watch 4520 described above, but is not limited thereto.

The computing device 100 may recommend a theme item by using a sensing value received from the smart glasses 4510 and/or the smart watch 4520 or provide information about a point of interest adjacent to a user's route.

When the other device 4530 is a desktop of the user, the other device 4530 may register and manage content transmitted by the computing device 100 based on a geographical location. Also, the other device 4530 may provide the computing device 100 with information about content registered to a geographical location according to a request of the computing device 100.

The other device 4530 may be a computing device of a user different from the user of the computing device 100 or include a wearable device of a user who is with the user of the computing device 100, but is not limited thereto. For example, the other device 4530 may include the car 1800 of FIG. 18 or the another computing devices 1900 and 2000 of FIGS. 19 and 20.

If the other device 4530 is a smart watch of a person who is with the user of the computing device 100, and health information of a person who is with the user of the computing device 100 is received from the smart watch, the computing device 100 may recommend a theme item based on the health information of the person who is with the user of the computing device 100.

For example, if the other device 4530 is a computing device (e.g., a smart phone, a desktop, etc.) of a person who is with the user of the computing device 100, the computing device 100 may receive from the other device 4530 geographical location-based context information (e.g., information about a theme item registered by the person who is with the user of the computing device 100 based on geographical location) of the person who is with the user of the computing device 100, and recommend a theme item by using information about the received theme item.

Usage of the other device 4530 is not limited to the above examples.

The server 4540 may include at least one of a cloud server of the user of the computing device 100, the server 700 illustrated in FIGS. 7, 9, 10, 12, 15, and 17, the server 2900 described with reference to FIG. 29, the server 3100 illustrated in FIGS. 31, 32, and 33, the server 4100 described with reference to FIGS. 41 and 42, and/or the SNS server 3300 described with reference to FIGS. 33 and 34, but is not limited thereto.

The network 4550 may be configured to transmit or receive data by using at least one of the communication methods described with reference to the communication unit 4450 illustrated in FIG. 44, but the configuration of the network 4550 is not limited thereto.

One or more exemplary embodiments can also be embodied as computer readable codes on a computer readable recording medium. The computer readable recording medium may be any data storage device that can store data which can be thereafter read by a computer system. Examples of the computer readable recording medium include read-only memory (ROM), random-access memory (RAM), CD-ROMs, magnetic tapes, floppy disks, optical data storage devices, etc. The computer readable recording medium can also be distributed over network coupled computer systems so that the computer readable code is stored and executed in a distributed fashion.

It should be understood that exemplary embodiments described herein should be considered in a descriptive sense only and not for purposes of limitation. Descriptions of features or aspects within each exemplary embodiment should typically be considered as available for similar features or aspects in other exemplary embodiments.

While one or more exemplary embodiments have been described with reference to the figures, it will be understood by those of ordinary skill in the art that various changes in form and details may be made therein without departing from the spirit and scope as defined by the following claims.

What is claimed is:

1. A device comprising:
   a location detector configured to detect location information of the device;
   a display;
   a processor configured to:
   determine whether a location of the device is changed based on the detected location information of the device,
   detect information related to an initial route of the device based on the detected location information of the device when the location of the device is changed,
   detect information related to a predicted route of the device based on the information related to the initial route of the device and past location information of the device, and
   display the detected predicted route and interest information based on the detected information related to the predicted route on the display, wherein the detected information related to the predicted route includes information regarding a user activity based on the device and a usage count of the predicted route; and
   a memory configured to store data read by the processor and at least one program executed by the processor, wherein the data comprises the past location information and the detected location information.

2. The device of claim 1, wherein the interest information comprises different interest information according to the usage count of the detected predicted route of the device.

3. The device of claim 1, wherein the processor is further configured to detect the interest information based on the detected predicted route of the device and preset distance information with respect to the detected predicted route.

4. The device of claim 1, wherein the processor is further configured to display regional information based on the detected predicted route along with the interest information on the display.

5. The device of claim 1, further comprising an input interface configured to receive an input,
   wherein the processor is further configured to receive a request for changing the interest information via the input interface, and change the interest information into other interest information in response to receiving the request for changing the interest information.

6. The device of claim 1, wherein the interest information is based on a designated point.

7. The device of claim 1, wherein the interest information is based on a designated point,
   wherein the processor is further configured to receive a request for changing the designated point via an input interface, and change the interest information related to the designated point into interest information related to the changed designated point in response to receiving the request for changing the designated point.

8. The device of claim 1, further comprising a communication interface configured to communication the device with other device,
   wherein the processor is further configured to receive a notification message from the other device via the communication interface,
   wherein the interest information relates to the notification message.

9. The device of claim 1, further comprising a communication interface configured to communication the device with other device,
   wherein the processor is further configured to receive information related to a predicted route of the other device via the communication interface, and display, on the display, the information related to the predicted route of the other device along with the information related to the predicted route of the device.

10. A method of providing route information by a device, the method comprising:
    detecting location information of the device by using a location detector of the device;
    determining, by the device, whether a location of the device is changed based on the detected location information of the device;
    detecting, by the device, information related to an initial route of the device based on the detected location information of the device when the location of the device is changed;
    detecting, by the device, information related to a predicted route of the device based on the information related to the initial route of the device and past location information of the device; and
    displaying the detected predicted route and interest information based on the detected information related to the predicted route on a display of the device, wherein the detected information related to the predicted route includes information regarding a user activity based on the device and a usage count of the predicted route.

11. The method of claim 10,
    wherein the interest information comprises different interest information according to the usage count of the detected predicted route of the device.

12. The method of claim 10, further comprising:
    detecting, by the device, the interest information based on the detected predicted route of the device and preset distance information with respect to the detected predicted route.

13. The method of claim 10, further comprising:
    displaying regional information based on the detected predicted route along with the interest information on the display.

14. The method of claim 10, further comprising:
    receiving, via an input interface of the device, a request for changing the interest information; and
    changing the interest information into other interest information in response to receiving the request for changing the interest information.

15. The method of claim 10, wherein the interest information is based on a designated point.

16. The method of claim 10, wherein the interest information is based on a designated point,
    wherein the method further comprises receiving a request for changing the designated point via an input interface of the device, and changing the interest information related to the designated point into interest information related to the changed designated point in response to receiving the request for changing the designated point.

17. The method of claim 10, further comprising receiving an notification message from other device via a communication interface of the device,
    wherein the interest information relates to the notification message.

18. The method of claim 10, further comprising receiving information related to a predicted route of other device via a communication interface of the device, and displaying, on the display, the information related to the predicted route of the other device along with the information related to the predicted route of the device.

19. A computer program product comprising one or more non-transitory computer readable storage media having program for executing a method of providing route information by a device, the method comprising:
- detecting location information of the device by using a location detector of the device;
- determining, by the device, whether a location of the device is changed based on the detected location information of the device;
- detecting, by the device, information related to an initial route of the device based on the detected location information of the device when the location of the device is changed;
- detecting, by the device, information related to a predicted route of the device based on the information related to the initial route of the device and past location information of the device; and
- displaying the detected predicted route and interest information based on the detected information related to the predicted route on a display of the device, wherein the detected information related to the predicted route includes information regarding a user activity based on the device and a usage count of the predicted route.

20. The computer program product of claim 19, wherein the interest information comprises different interest information according to the usage count of the detected predicted route of the device.

* * * * *